US011476609B2

(12) United States Patent
Pavlovic et al.

(10) Patent No.: US 11,476,609 B2
(45) Date of Patent: Oct. 18, 2022

(54) ELECTRICAL CONNECTOR SYSTEM WITH INTERNAL SPRING COMPONENT AND APPLICATIONS THEREOF

(71) Applicant: Royal Precision Products LLC, Carol Stream, IL (US)

(72) Inventors: Slobodan Pavlovic, Novi, MI (US); Mohamad Zeidan, Bloomfield, MI (US); James Dawson, Carol Stream, IL (US); Brantley Natter, Brighton, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/113,842

(22) Filed: Dec. 7, 2020

(65) Prior Publication Data

US 2021/0119365 A1   Apr. 22, 2021

Related U.S. Application Data

(63) Continuation of application No. PCT/US2019/036127, filed on Jun. 7, 2019.
(Continued)

(51) Int. Cl.
*H01R 13/187* (2006.01)
*H01R 13/24* (2006.01)
(Continued)

(52) U.S. Cl.
CPC ........... *H01R 13/187* (2013.01); *H01R 13/03* (2013.01); *H01R 13/055* (2013.01);
(Continued)

(58) Field of Classification Search
CPC ........ H01R 13/052–057; H01R 13/187; H01R 13/24; H01R 13/502; H01R 13/629;
(Continued)

(56) References Cited

U.S. PATENT DOCUMENTS 4,201,438 A * 5/1980 Shea .......................... H01J 5/50
439/611
4,416,504 A * 11/1983 Sochor ................... H01R 13/05
439/746
(Continued)

FOREIGN PATENT DOCUMENTS

CN          1722537 A      1/2006
CN        102714369 A     10/2012
(Continued)

OTHER PUBLICATIONS

International Search Report and Written Opinion issued in PCT/US21/43788, dated Dec. 23, 2021, 23 pages.
International Search Report and Written Opinion issued in PCT/US21/47180, dated Jan. 6, 2022, 18 pages.
(Continued)

*Primary Examiner* — Gary F Paumen
(74) *Attorney, Agent, or Firm* — Barnes & Thornburg LLP

(57) ABSTRACT

An electrical connector system for electrically and mechanically connecting with a component in a motor vehicle is disclosed. The connector system includes a motor vehicle component and a male connector assembly with a male housing that receives a male terminal. This terminal includes a receiver and side walls with a contact arm that extends across an aperture in the side wall. An internal spring member with at least one spring arm resides within the male terminal receiver. A female connector assembly includes a female terminal with a receptacle that receives both the male terminal and the spring member. A female housing receives the female terminal and an extent of the male connector assembly. When the connector system moves from the partially assembled state to a connected position for connection of the vehicle component, the male connector assembly is inserted into female housing, the contact arm is brought into sliding engagement with an angled internal (Continued)

segment of the female housing, and the contact arm is inwardly displaced as the contact arm slidingly engages with the angled internal segment.

34 Claims, 52 Drawing Sheets

Related U.S. Application Data

(60) Provisional application No. 62/681,973, filed on Jun. 7, 2018.

(51) Int. Cl.

| | | |
|---|---|---|
| H01R 13/502 | (2006.01) | |
| H01R 13/629 | (2006.01) | |
| H01R 13/641 | (2006.01) | |
| H01R 13/03 | (2006.01) | |
| H01R 13/05 | (2006.01) | |
| H01R 13/10 | (2006.01) | |
| H01R 13/15 | (2006.01) | |
| B60R 16/03 | (2006.01) | |
| H01R 13/50 | (2006.01) | |

(52) U.S. Cl.
CPC ........... *H01R 13/057* (2013.01); *H01R 13/10* (2013.01); *H01R 13/15* (2013.01); *H01R 13/24* (2013.01); *H01R 13/502* (2013.01); *H01R 13/629* (2013.01); *H01R 13/641* (2013.01); *B60R 16/03* (2013.01); *H01R 13/50* (2013.01); *H01R 2201/26* (2013.01)

(58) Field of Classification Search
CPC .... H01R 13/641; H01R 13/03; H01R 13/055; H01R 13/057; H01R 13/10; H01R 13/15; H01R 13/50; H01R 2201/26; B60R 16/03
USPC ......................................................... 439/825
See application file for complete search history.

(56) References Cited

U.S. PATENT DOCUMENTS

| | | | |
|---|---|---|---|
| 4,534,610 A | 8/1985 | Takihara | |
| 4,540,235 A | 9/1985 | Lolic | |
| 4,583,812 A | 4/1986 | Gross, Jr. | |
| 4,593,464 A | 6/1986 | Williams | |
| 4,632,483 A | 12/1986 | Verin | |
| 4,713,018 A | 12/1987 | Sutton | |
| 4,895,531 A | 1/1990 | Vignoli | |
| 4,902,244 A | 2/1990 | Endo | |
| 4,932,877 A | 6/1990 | Zinn | |
| 4,938,720 A | 7/1990 | Romak | |
| 4,975,066 A | 12/1990 | Sucheski | |
| 4,983,127 A | 1/1991 | Kawai | |
| 5,007,865 A | 4/1991 | Jakobeit | |
| 5,035,661 A | 7/1991 | Steinhardt | |
| 5,042,433 A | 8/1991 | Monnier | |
| 5,062,918 A | 11/1991 | Zodrow | |
| 5,094,636 A | 3/1992 | Zinn | |
| 5,102,752 A | 4/1992 | Hope | |
| 5,120,255 A | 6/1992 | Kouda | |
| 5,162,004 A | 11/1992 | Kuzuno | |
| 5,169,336 A | 12/1992 | Taguchi | |
| 5,188,545 A | 2/1993 | Hass | |
| 5,240,439 A | 8/1993 | Egenolf | |
| 5,273,766 A | 12/1993 | Long | |
| 5,288,252 A | 2/1994 | Steinhardt | |
| 5,295,873 A | 3/1994 | Walbrecht | |
| 5,334,058 A | 8/1994 | Hotea | |
| 5,338,229 A | 8/1994 | Egenolf | |
| 5,361,377 A | 11/1994 | Miller | |
| 5,362,262 A | 11/1994 | Hotea | |
| 5,391,097 A * | 2/1995 | Kerul | H01R 13/193 |
| | | | 439/825 |
| 5,415,571 A | 5/1995 | Lutsch | |
| 5,419,723 A | 5/1995 | Villiers | |
| 5,437,566 A | 8/1995 | Zinn | |
| 5,486,123 A | 1/1996 | Miyazaki | |
| 5,536,184 A | 7/1996 | Wright | |
| 5,551,897 A | 9/1996 | Alwine | |
| 5,562,506 A | 10/1996 | Wright | |
| 5,573,434 A | 11/1996 | Ittah | |
| 5,607,328 A | 3/1997 | Joly | |
| 5,624,283 A | 4/1997 | Hotea | |
| 5,664,972 A | 9/1997 | Zinn | |
| 5,716,245 A | 2/1998 | Kameyama | |
| 5,810,627 A | 9/1998 | Gierut | |
| 5,827,094 A | 10/1998 | Aizawa | |
| 5,863,225 A | 1/1999 | Liebich | |
| 5,868,590 A | 2/1999 | Dobbelaere | |
| 5,938,485 A | 8/1999 | Hotea | |
| 5,941,740 A | 8/1999 | Neuer | |
| 5,951,338 A | 9/1999 | Seko | |
| 5,954,548 A | 9/1999 | Stabroth | |
| 5,975,964 A | 11/1999 | Seko | |
| 5,980,336 A | 11/1999 | Hall | |
| 6,042,433 A | 3/2000 | Chen | |
| 6,062,918 A | 5/2000 | Myer | |
| 6,102,752 A | 8/2000 | Bommel | |
| 6,126,495 A | 10/2000 | Lolic | |
| 6,186,840 B1 | 2/2001 | Geltsch | |
| 6,257,931 B1 | 7/2001 | Sakurai | |
| 6,261,116 B1 | 7/2001 | Ceru | |
| 6,273,766 B1 | 8/2001 | Zennamo, Jr. | |
| 6,361,377 B1 | 3/2002 | Saka | |
| 6,371,813 B2 | 4/2002 | Ramey | |
| 6,390,830 B1 | 5/2002 | Onizuka | |
| 6,394,858 B1 | 5/2002 | Geltsch | |
| 6,402,571 B1 | 6/2002 | Muller | |
| 6,475,040 B1 | 11/2002 | Myer | |
| 6,514,098 B2 | 2/2003 | Marpoe, Jr. | |
| 6,561,841 B2 | 5/2003 | Norwood | |
| 6,565,396 B2 | 5/2003 | Saka | |
| 6,679,736 B2 | 1/2004 | Saka | |
| 6,695,644 B2 | 2/2004 | Zhao | |
| 6,722,926 B2 | 4/2004 | Chevassus-More | |
| 6,761,577 B1 | 7/2004 | Koehler | |
| 6,814,625 B2 | 11/2004 | Richmond | |
| 6,824,170 B2 | 11/2004 | Lee | |
| 6,872,103 B1 | 3/2005 | Flieger | |
| 6,921,283 B2 | 7/2005 | Zahlit | |
| 6,994,600 B2 | 2/2006 | Coulon | |
| 7,014,515 B2 | 3/2006 | Lutsch | |
| 7,150,660 B2 | 12/2006 | Allgood | |
| 7,175,488 B2 | 2/2007 | Pavlovic | |
| 7,192,318 B2 | 3/2007 | Hotea | |
| 7,278,891 B2 | 10/2007 | Cvasa | |
| 7,300,319 B2 | 11/2007 | Lutsch | |
| 7,314,377 B2 * | 1/2008 | Northey | H01R 12/777 |
| | | | 439/79 |
| 7,329,132 B1 | 2/2008 | Kamath | |
| 7,338,305 B2 | 3/2008 | Norwood | |
| 7,491,100 B2 | 2/2009 | Johannes | |
| 7,494,352 B2 | 2/2009 | Furio | |
| 7,497,723 B2 | 3/2009 | Brassell | |
| 7,503,776 B1 | 3/2009 | Pavlovic | |
| 7,520,773 B2 | 4/2009 | Siebens | |
| 7,563,133 B2 * | 7/2009 | Stein | H01R 13/6271 |
| | | | 439/248 |
| 7,568,921 B2 | 8/2009 | Pavlovic | |
| 7,595,715 B2 | 9/2009 | Pavlovic | |
| 7,613,003 B2 | 11/2009 | Pavlovic | |
| 7,647,954 B2 | 1/2010 | Garber | |
| 7,651,344 B2 | 1/2010 | Wu | |
| 7,682,180 B2 | 3/2010 | Brown | |
| 7,713,096 B2 | 5/2010 | Pavlovic | |
| 7,758,369 B2 | 7/2010 | Miller | |
| 7,766,706 B2 | 8/2010 | Kawamura | |
| 7,780,489 B2 | 8/2010 | Stuklek | |
| 7,837,519 B2 | 11/2010 | Copper | |
| 7,876,193 B2 | 1/2011 | Pavlovic | |

(56) References Cited

U.S. PATENT DOCUMENTS

| | | |
|---|---|---|
| 7,892,050 B2 | 2/2011 | Pavlovic |
| 7,927,127 B1 | 4/2011 | Glick |
| 7,942,682 B2 | 5/2011 | Copper |
| 7,942,683 B2 | 5/2011 | Copper |
| 7,963,782 B2 | 6/2011 | Hughes |
| 7,976,351 B2 | 7/2011 | Boemmel |
| 7,988,505 B2 | 8/2011 | Hotea |
| 8,111,052 B2 | 2/2012 | Glovinsky |
| 8,128,426 B2 | 3/2012 | Glick |
| 8,167,337 B2 | 5/2012 | Bruno |
| 8,202,124 B1 | 6/2012 | Natter |
| 8,206,175 B2 | 6/2012 | Boyd |
| 8,235,292 B2 | 8/2012 | Talboys |
| 8,242,874 B2 | 8/2012 | Pavlovic |
| 8,277,243 B1 | 10/2012 | Hernandez |
| 8,282,429 B2 | 10/2012 | Glick |
| 8,366,497 B2 | 2/2013 | Glick |
| 8,388,389 B2 | 3/2013 | Costello |
| 8,430,689 B2 | 4/2013 | Myer |
| 8,446,733 B2 | 5/2013 | Hampo |
| 8,449,338 B2 | 5/2013 | Gong |
| 8,475,220 B2 | 7/2013 | Glick |
| 8,651,892 B2 | 2/2014 | Arant |
| 8,662,935 B2 | 3/2014 | Jouas |
| 8,668,506 B2 | 3/2014 | Stack |
| 8,678,867 B2 | 3/2014 | Glick |
| 8,758,043 B2 | 6/2014 | Ohyama |
| 8,795,007 B2 | 8/2014 | Itou |
| 8,840,436 B2 | 9/2014 | Mott |
| 8,858,264 B2 | 10/2014 | Mott |
| 8,858,274 B2 | 10/2014 | Jakoplic |
| 8,941,731 B2 | 1/2015 | Barba |
| 8,944,844 B2 | 2/2015 | Myer |
| 8,956,190 B2 | 2/2015 | Natter |
| 8,968,021 B1 | 3/2015 | Kennedy |
| 8,974,244 B2 * | 3/2015 | Aihara ................ H01R 12/724 |
| | | 439/374 |
| 8,992,270 B2 | 3/2015 | Glick |
| 8,998,655 B2 | 4/2015 | Glick |
| 9,011,186 B2 | 4/2015 | Wirth |
| 9,048,552 B2 | 6/2015 | Eyles |
| 9,059,542 B2 | 6/2015 | Oh |
| 9,077,114 B2 | 7/2015 | Oh |
| 9,142,902 B2 | 9/2015 | Glick |
| 9,166,322 B2 | 10/2015 | Glick |
| 9,190,756 B2 | 11/2015 | Glick |
| 9,225,116 B2 | 12/2015 | McKibben |
| 9,236,682 B2 | 1/2016 | Glick |
| 9,257,804 B1 | 2/2016 | Beck |
| 9,293,852 B2 | 3/2016 | Glick |
| 9,300,069 B2 | 3/2016 | Morello |
| 9,353,894 B2 | 5/2016 | Richards |
| 9,356,394 B2 * | 5/2016 | Kennedy ............. H01R 13/641 |
| 9,368,904 B2 | 6/2016 | Natter |
| 9,379,470 B2 | 6/2016 | Glick |
| 9,431,740 B2 | 8/2016 | Glick |
| 9,437,974 B2 | 9/2016 | Glick |
| 9,444,168 B2 | 9/2016 | Horiuchi |
| 9,444,205 B2 | 9/2016 | Rangi |
| 9,455,516 B2 | 9/2016 | Gutenschwager |
| 9,502,783 B2 | 11/2016 | Bleicher |
| 9,525,254 B2 | 12/2016 | Chen |
| 9,537,241 B2 | 1/2017 | Rivera |
| 9,548,553 B2 | 1/2017 | Glick |
| 9,583,860 B1 | 2/2017 | Dewitte |
| 9,608,369 B1 | 3/2017 | Brandt |
| 9,620,869 B2 | 4/2017 | Listing |
| 9,653,859 B1 | 5/2017 | Moore |
| 9,680,256 B1 | 6/2017 | Lane |
| 9,705,229 B2 | 7/2017 | Itou |
| 9,705,254 B2 | 7/2017 | Lampert |
| 9,711,885 B2 | 7/2017 | Hamai |
| 9,748,693 B1 | 8/2017 | Exenberger |
| 9,841,454 B2 | 12/2017 | Gelonese |
| 9,847,591 B2 | 12/2017 | Glick |
| 9,876,317 B2 | 1/2018 | Glick |
| 9,905,950 B2 | 2/2018 | Marsh |
| 9,905,953 B1 | 2/2018 | Pavlovic |
| 9,948,044 B2 | 4/2018 | Harris, III |
| 10,014,614 B2 | 7/2018 | Davies |
| 10,014,631 B1 | 7/2018 | Chambly |
| 10,038,278 B2 | 7/2018 | Lane |
| 10,044,140 B1 | 8/2018 | Gianrossi |
| 10,122,117 B2 | 11/2018 | Miller |
| 10,135,168 B2 * | 11/2018 | Pavlovic ................ H01R 13/03 |
| 10,184,970 B2 | 1/2019 | Maalouf |
| 10,218,117 B1 | 2/2019 | Probert |
| 10,283,889 B2 | 5/2019 | Glick |
| 10,355,414 B1 | 7/2019 | Alvarado |
| 10,693,252 B2 | 6/2020 | Pavlovic |
| 11,069,999 B2 | 7/2021 | Fisher |
| 11,223,150 B2 | 1/2022 | Pavlovic |
| 2001/0019924 A1 | 9/2001 | Heimueller |
| 2001/0021602 A1 | 9/2001 | Zanten |
| 2002/0019156 A1 | 2/2002 | Fukamachi |
| 2002/0049005 A1 | 4/2002 | Leve |
| 2002/0081888 A1 | 6/2002 | Regnier |
| 2002/0180272 A1 | 12/2002 | Yuasa |
| 2004/0150224 A1 | 8/2004 | Lee |
| 2005/0134037 A1 | 6/2005 | Bruno |
| 2005/0211934 A1 | 9/2005 | Garber |
| 2006/0040555 A1 | 2/2006 | Chen |
| 2006/0172618 A1 | 8/2006 | Yamashita |
| 2007/0123093 A1 | 5/2007 | Lutsch |
| 2007/0149050 A1 | 6/2007 | Oka |
| 2009/0197457 A1 | 8/2009 | Lanni |
| 2011/0130023 A1 | 6/2011 | Kataoka |
| 2011/0168778 A1 | 7/2011 | Talboys |
| 2011/0171843 A1 | 7/2011 | Casses |
| 2012/0094551 A1 | 4/2012 | Corman |
| 2012/0129407 A1 | 5/2012 | Glick |
| 2012/0244756 A1 | 9/2012 | Jouas |
| 2013/0002102 A1 | 1/2013 | Chen |
| 2013/0004050 A1 | 1/2013 | Wu |
| 2013/0040505 A1 | 2/2013 | Hirakawa |
| 2013/0078874 A1 | 3/2013 | Itou |
| 2013/0109224 A1 | 5/2013 | Chin |
| 2013/0210292 A1 | 8/2013 | Schmidt |
| 2013/0215573 A1 | 8/2013 | Wagner |
| 2013/0337702 A1 | 12/2013 | Pavlovic |
| 2014/0087601 A1 | 3/2014 | Glick |
| 2014/0193995 A1 * | 7/2014 | Barthelmes ............ H01R 12/91 |
| | | 439/374 |
| 2014/0227915 A1 | 8/2014 | Glick |
| 2015/0038000 A1 | 2/2015 | Glick |
| 2015/0072207 A1 | 3/2015 | Soleski |
| 2015/0074996 A1 | 3/2015 | Glick |
| 2015/0079859 A1 | 3/2015 | Glick |
| 2015/0162706 A1 | 6/2015 | Kennedy |
| 2015/0255912 A1 | 9/2015 | Natter |
| 2015/0255924 A1 | 9/2015 | Glick |
| 2015/0280381 A1 | 10/2015 | Rangi |
| 2016/0028169 A1 | 1/2016 | Glick |
| 2016/0043505 A1 | 2/2016 | Wu |
| 2016/0336572 A1 | 11/2016 | Yoshida |
| 2017/0338600 A1 | 11/2017 | Tanaka |
| 2018/0090900 A1 | 3/2018 | Horiuchi |
| 2018/0191095 A1 | 7/2018 | Pavlovic |
| 2018/0219305 A1 | 8/2018 | Wavering |
| 2018/0351282 A1 | 12/2018 | Duan |
| 2019/0052025 A1 | 2/2019 | Buechli |
| 2019/0089083 A1 | 3/2019 | Pavlovic |
| 2019/0372262 A1 | 12/2019 | Christiano |
| 2020/0395700 A1 | 12/2020 | Pavlovic |
| 2021/0167538 A1 | 6/2021 | Pavlovic |
| 2022/0131299 A1 | 4/2022 | Pavlovic |

FOREIGN PATENT DOCUMENTS

| | | |
|---|---|---|
| CN | 103141000 | 6/2013 |
| CN | 203193080 | 9/2013 |
| CN | 104614564 | 5/2015 |

(56) References Cited

FOREIGN PATENT DOCUMENTS

| | | |
|---|---|---|
| CN | 2015100485492 | 5/2015 |
| CN | 105225040 | 1/2016 |
| CN | 206098831 U | 4/2017 |
| CN | 206962160 | 2/2018 |
| CN | 107863610 | 3/2018 |
| DE | 4215162 A1 | 12/1992 |
| DE | 4139100 C1 | 1/1993 |
| DE | 19817924 | 10/1999 |
| DE | 102013211208 | 12/2014 |
| EP | 1291979 | 12/2004 |
| JP | H1040995 | 2/1998 |
| JP | H1050376 | 2/1998 |
| JP | H1050377 | 2/1998 |
| JP | 2011049107 | 3/2011 |
| JP | 2012043739 | 3/2012 |
| JP | 2016529675 A | 9/2016 |
| JP | 2017010755 | 1/2017 |
| KR | 20160138442 | 12/2016 |
| WO | 2017195092 | 11/2017 |
| WO | 2019164536 | 8/2019 |
| WO | 2019229587 | 12/2019 |
| WO | 2019236976 | 12/2019 |
| WO | 2019237009 | 12/2019 |
| WO | 2019237046 | 12/2019 |

OTHER PUBLICATIONS

International Search Report and Written Opinion issued in PCT/US21/43686, dated Dec. 23, 2021, 28 pages.
International Search Report from PCT/US2018/019787 dated Nov. 26, 2018 (3 pages).
Written Opinion from PCT/US2018/019787 dated Nov. 26, 2018 (10 pages).
International Search Report and Written Opinion issued in PCT/US2019/036070, dated Sep. 27, 2019, 8 pages.
International Search Report and Written Opinion issued in PCT/US2019/036010, dated Sep. 30, 2019, 13 pages.
International Search Report and written Opinion issued in PCT/US2019/036127, dated Oct. 4, 2019, 11 pages.
International Search Report and written Opinion issued in PCT/US2020/049870, dated Dec. 10, 2020, 20 pages.
International Search Report and written Opinion issued in PCT/US20/013757, dated Dec. 10, 2020, 7 pages.
International Search Report and Written Opinion issued in PCT/US20/50016, dated Nov. 30, 2020, 14 pages.
International Search Report and Written Opinion issued in PCT/US20/50018, dated Nov. 30, 2020, 14 pages.
International Search Report and Written Opinion issued in PCT/US20/14484, dated Mar. 31, 2020, 7 pages.
International Search Report and Written Opinion issued in PCT/US21/33446, dated Aug. 24, 2021, 17 pages.

\* cited by examiner

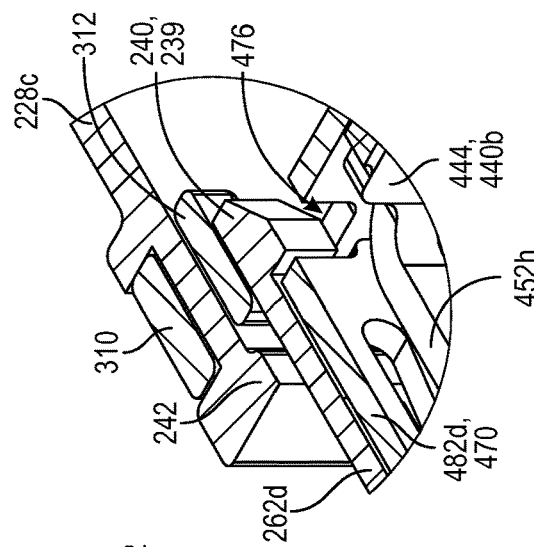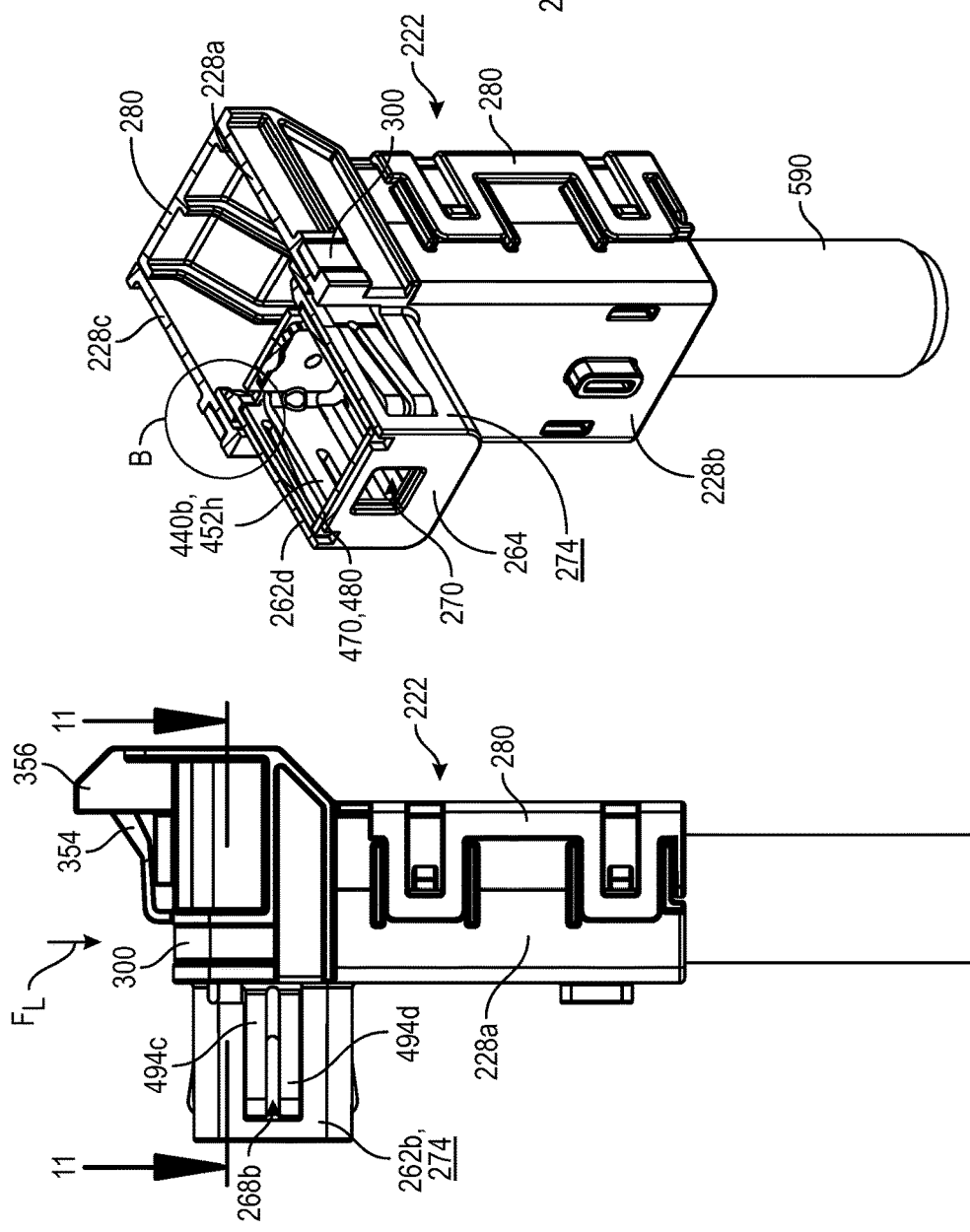

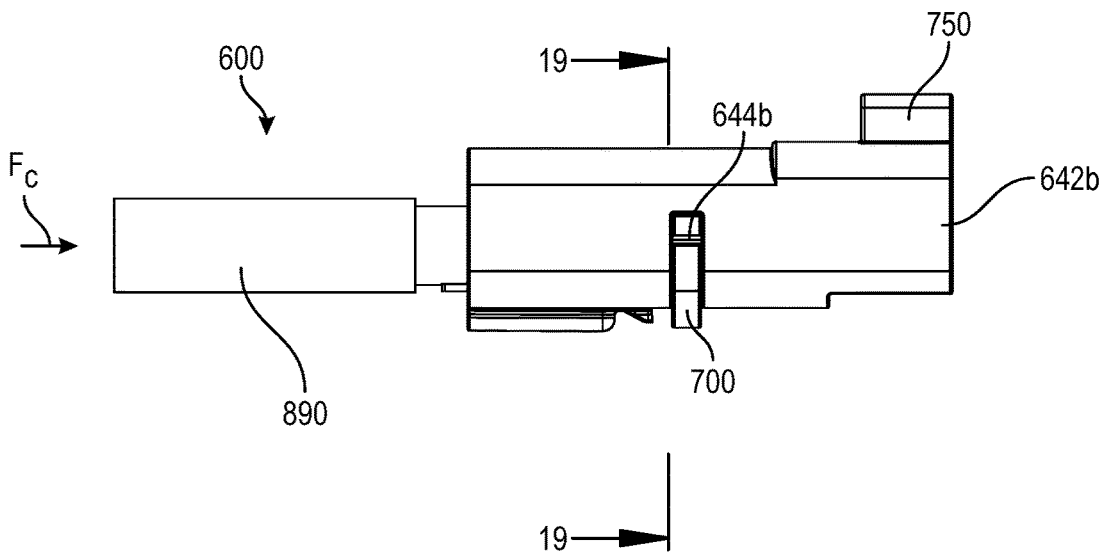
FIG. 18
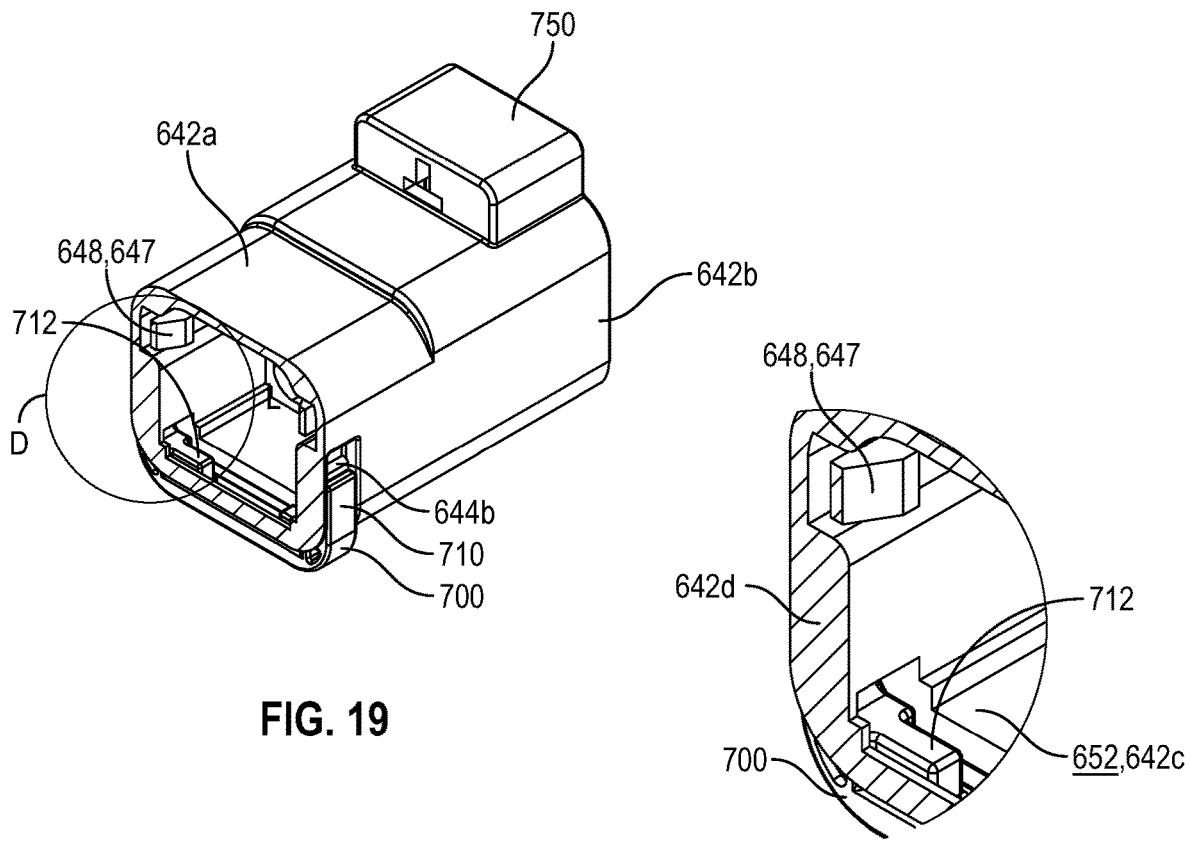
FIG. 19
FIG. 20

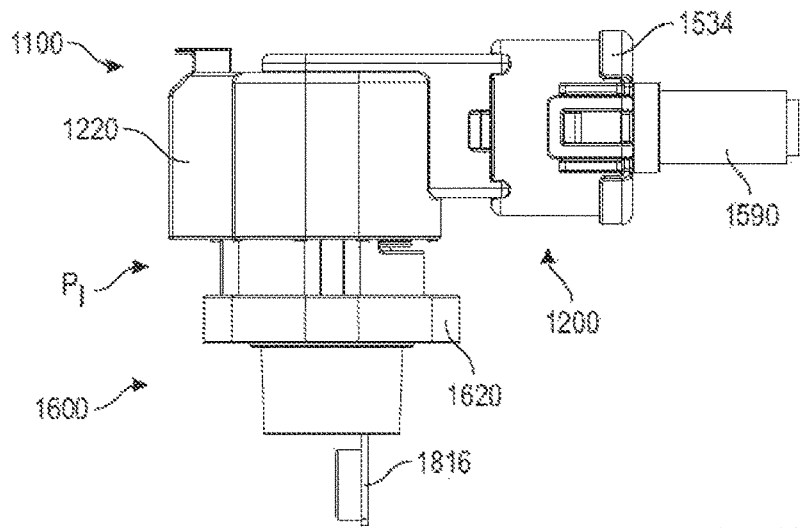
FIG. 85
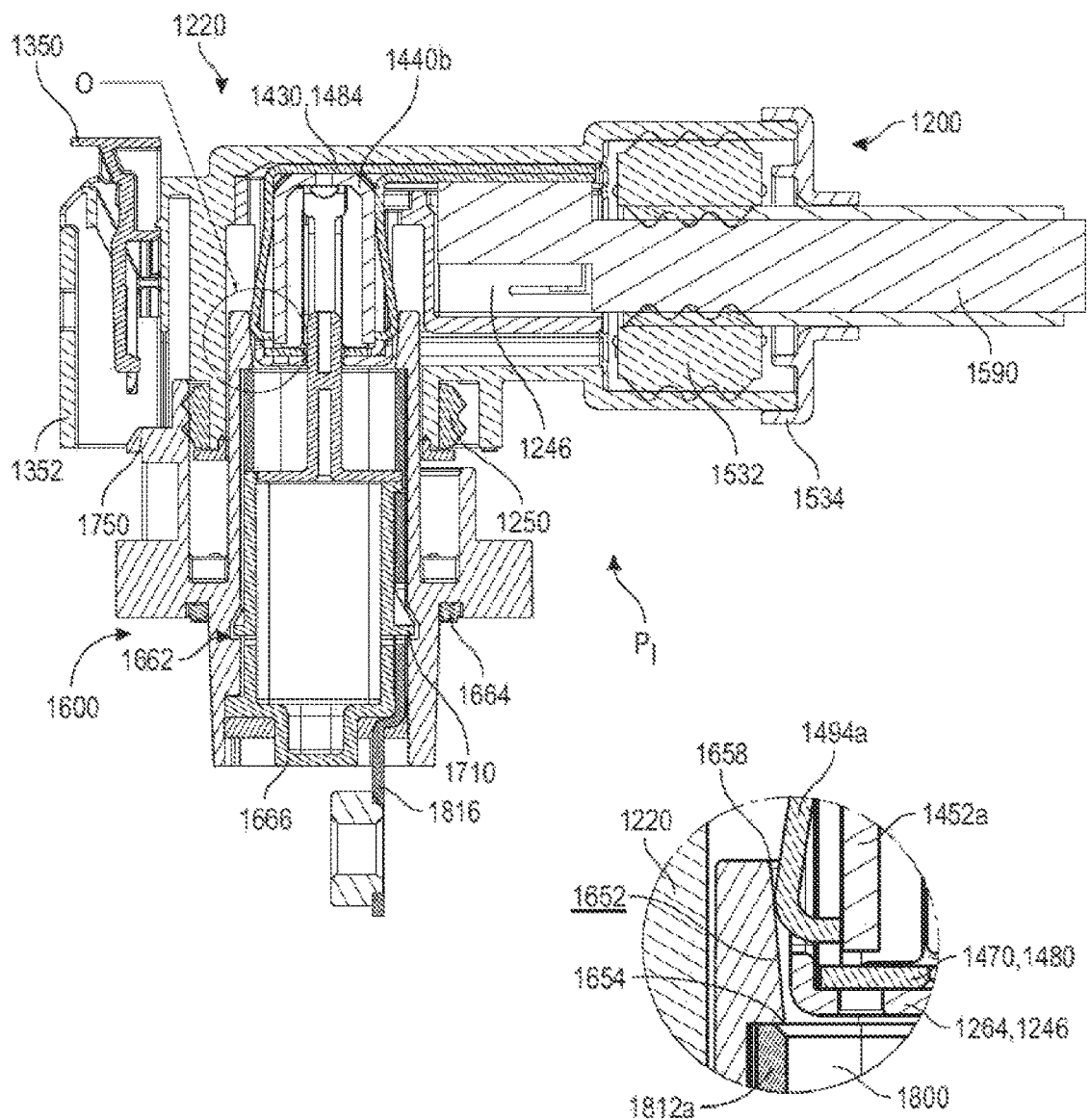
FIG. 86
FIG. 87

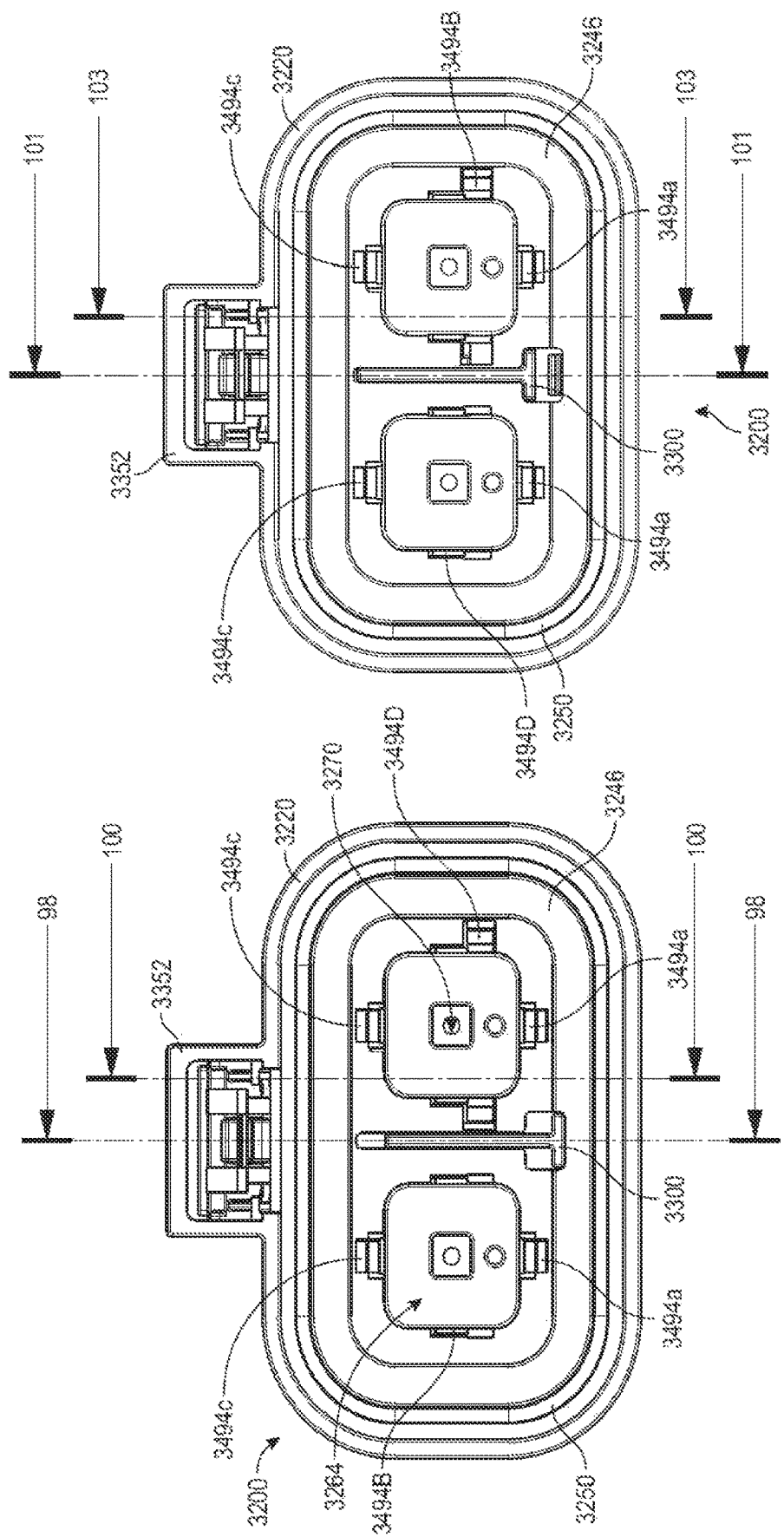

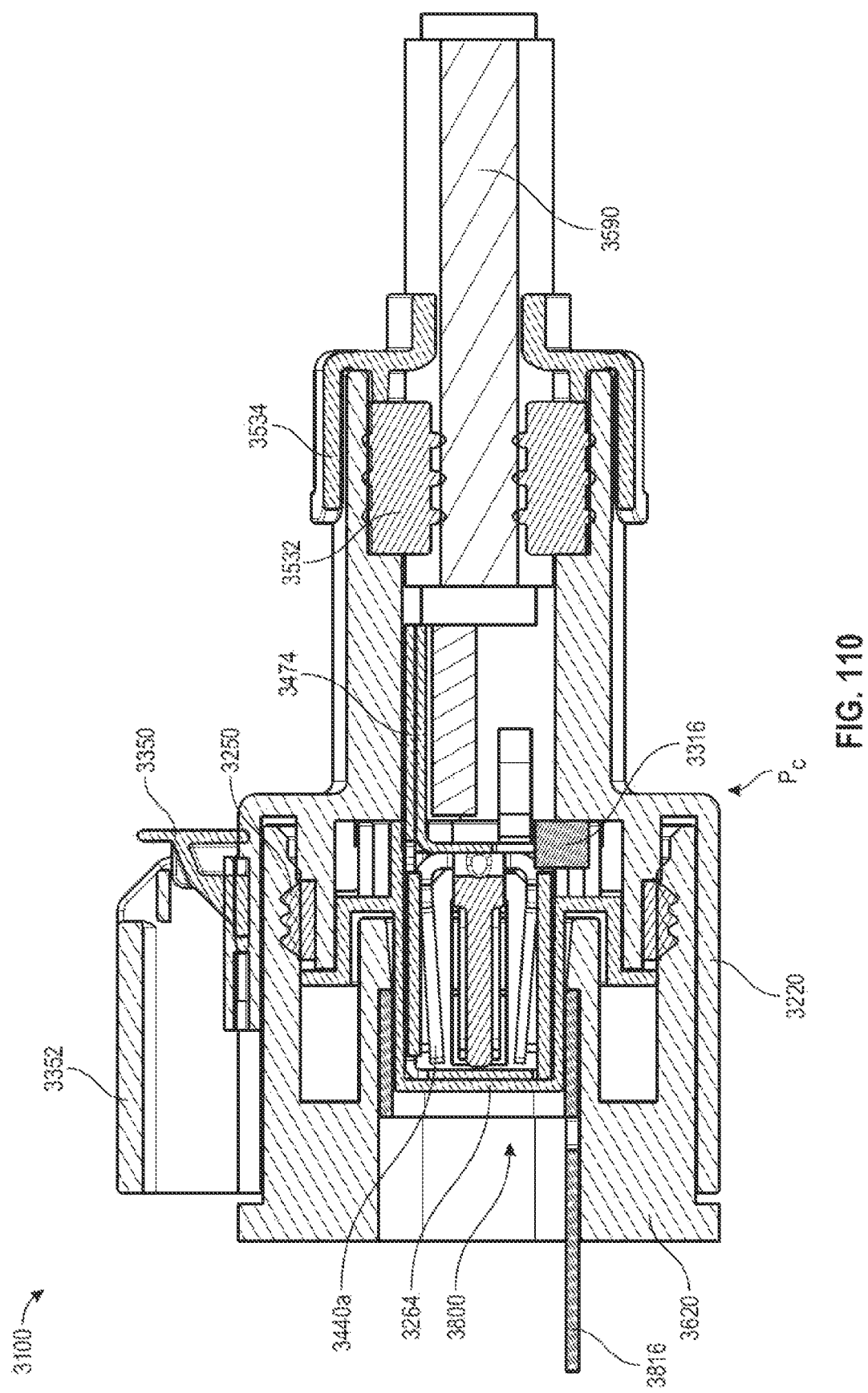

ELECTRICAL CONNECTOR SYSTEM WITH INTERNAL SPRING COMPONENT AND APPLICATIONS THEREOF

CROSS-REFERENCE TO RELATED APPLICATIONS

This Application is a Continuation of International Patent Application No. PCT/US2019/036127, filed Jun. 7, 2019, which claims the benefit of U.S. Provisional Patent Application No. 62/681,973, filed on Jun. 7, 2018. The disclosures set forth in the referenced applications are incorporated herein by reference in their entireties.

FIELD OF DISCLOSURE

The present disclosure relates to electrical connectors, and, in particular, to an electrical connector system having a spring actuated electrical connector assembly and their applications thereof. Specifically, the present disclosure relates to an electrical connector system for use in motor vehicles, including passenger and commercial vehicles, in high-power, high-current and/or high-voltage applications where connector assemblies are essential to provide mechanical and electrical connectivity while meeting strict industry standards and production requirements.

BACKGROUND

Over the past several decades, the number of electrical components used in automobiles, and other on-road and off-road vehicles such as pick-up trucks, commercial trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creature comforts to the occupants of the motor vehicles. These electrical components are mechanically and electrically connected within the motor vehicle by conventional connector assemblies, which consist of an eyelet and a threaded fastener. Considerable time, resources, and energy have been expended to develop connector assemblies that meet the varied needs and complexities of the motor vehicles market; however, conventional connector assemblies suffer from a variety of shortcomings.

Motor vehicles are challenging electrical environments for both the electrical components and the connector assemblies due to a number of conditions, including but not limited to, space constraints that make initial installation difficult, harsh weather conditions, vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes lead to significant repair and warranty costs. For example, the combined annual accrual for warranty by all of the automotive manufacturers and their direct suppliers is estimated at between $50 billion and $150 billion, worldwide.

A more appropriate, a robust connector assembly must be impervious to harsh operating conditions, prolonged vibration and excessive heat, especially heat loads that accumulate "under the hood" of the vehicle. In order to create a robust solution, many companies have designed variations of spring-loaded connectors, which have a feature that retains the connector in place. Such spring-actuated connectors typically have some indication to show that they are fully inserted. Sometimes, the spring-actuated feature on the connector is made from plastic. Other times, the spring-actuated feature on the connector is fabricated from spring steel. Unfortunately, although the more recent connectors are an improvement over dated connectors using an eyelet and threaded connector, there are still far too many failures.

Part of the reason that spring-actuated connector assemblies fail in motor vehicle applications is because of the design of the assembly—namely that the spring element, such as a tab, is located on the periphery of the connector. By placing the spring tab on the exterior surface of the connector, manufacturers attempt to make engagement of the assembly's components obvious to the worker assembling the part in the factory. Unfortunately, for both plastic and metal, the increased temperatures of an automotive environment make a peripheral spring prone to premature failure. It is not uncommon for the engine compartment of a motor vehicle to reach or exceed 100° C., with individual components of a motor vehicle engine reaching or exceeding 180° C. At 100° C., most plastics start to plasticize, reducing the retention force of the peripheral spring-actuated element. At 100° C., the thermal expansion of the spring steel will reduce the retention force of a peripheral spring-actuated connector. Also, with respect to spring-actuated features formed from spring steel is the effect of residual material memory inherent in the spring steel as the spring steel is thermally cycled on a repeated basis between high and low temperatures. After many temperature cycles, the spring steel will begin to return to its original, pre-formed shape, which reduces the spring-actuated element's retention force with other components of the connector assembly. This behavior makes the conventional connector assembly susceptible to vibration and failure, each of which significantly reduce the performance and reliability of conventional connectors. For these and many other reasons, the motor vehicle industry needs a more reliable connector system that is low-cost, vibration-resistant, temperature-resistant, and better overall electrical and mechanical performance.

There is clearly a market demand for a mechanically simple, lightweight, inexpensive, vibration-resistant, temperature-resistant, and robust electrical connector system for vehicles. The description provided in the background section should not be assumed to be prior art merely because it is mentioned in or associated with the background section. The background section may include information that describes one or more aspects of the subject technology.

SUMMARY

The present disclosure relates to a spring-actuated electrical connector system, which has a spring actuated electrical connector assembly residing within an external housing assembly. The electrical connector system is primarily intended for use in motor vehicles, including passenger and commercial vehicles, in high-power, and/or high-voltage applications where connector assemblies are essential to meet industry standards and production requirements. The electrical connector system can also be used in military vehicles, such as tanks, personnel carriers and trucks, and marine applications, such as pleasure boats and sailing yachts, or telecommunications hardware, such as server.

According to an aspect of the present disclosure, the system includes a male connector assembly and a female connector assembly. Both the male and female connector assemblies have a housing, which contains a terminal. The male terminal assembly is designed and configured to fit within the female terminal, which forms both a mechanical and electrical connection between these terminals. Specifically, the male terminal assembly includes an internal spring actuator or spring member, which is designed to interact with an extent of the male terminal to ensure that a proper connection is created between the male terminal and female terminal. More specifically, the female terminal forms a receiver that is configured to receive an extent of the male terminal assembly. The male terminal assembly has a male terminal body, which includes a plurality of contact arms. A spring member is nested inside the male terminal body. The spring member resists inward deflection and applies outwardly directed force on the contact arms thereby creating a positive connection and retention force. Unlike other prior art connection systems, the connection between the male terminal and the female terminal become stronger when the connector system experiences elevated temperatures and electrical power.

In one embodiment, the female terminal has a tubular configuration which is fabricated from a sheet of highly conductive copper. The highly conductive copper can be C151 or C110. One side of the sheet of highly conductive copper can be pre-plated with silver, tin, or top tin, such that the inner surface of the tubular member may be plated. The male terminal assembly includes a male terminal body and a spring member. The male terminal body has a plurality of contact arms. The four arms can be placed at 90° increments, meaning that each contact arm has one arm directly opposing side wall of the female terminal. Each contact arm has a thickness, a termination end, and a planar surface with a length and a width.

A spring member is configured to be nested inside the male terminal body. The spring member has spring arms, a middle section, and a rear wall or base. The spring arms are connected to middle or base section. The spring arms have a termination end, a thickness, and a planar surface with a length and width. In the illustrated embodiments, the spring member has the same number of spring arms as the contact element has contact arms. In the illustrated embodiment, the spring arms can be mapped, one-to-one, with the contact arms. The spring arms are dimensioned so that the termination end of the associated contact arm contacts the planar surface of the spring arm. The spring arms of the illustrated embodiments are even in number, symmetrical, and evenly spaced.

The male terminal fits inside the tubular member of the female terminal such that the contact arms contact the inner surface of the tubular member. The spring arms help ensure that the contact arms create an electrical connection with the tubular member. The termination end of the contact arm meets the planar surface of the spring arm, forcing the contact arm to form a substantially perpendicular or at least an obtuse angle with respect to the outer surface of the spring arm. In the illustrated embodiments of the present disclosure, although not required, the tubular member has a symmetrical cross-section.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 10 is a right side view of the male connector assembly shown in FIG. 3, wherein the male locking member is engaged with the male housing;

FIG. 11 is an isometric cross-sectional view of the male connector assembly shown in FIG. 10, taken along the 11-11 line of FIG. 10;

FIG. 12 is a zoomed in view of area B shown in FIG. 11;

FIG. 18 is a right side view of the female connector assembly shown in FIG. 13, wherein the female locking member is partially engaged with the female housing and the female terminal is not seated within the female housing;

FIG. 19 is an isometric cross-sectional view of the female connector assembly shown in FIG. 18, taken along the 19-19 line of FIG. 18;

FIG. 20 is a zoomed in view of area D shown in FIG. 19;

FIG. 85 is a side view of the connector assembly shown in FIGS. 64 and 65, wherein the connector system is in an intermediate position;

FIG. 86 is a cross-sectional view of the connector assembly shown in FIG. 85, taken along the 84-84 line of FIG. 82;

FIG. 87 is a zoomed in view of area 0 shown in FIG. 86;

FIG. 96 is a front view of the male connector assembly shown in FIG. 93, wherein the male locking member is disconnected;

FIG. 97 is a front view of the male connector assembly shown in FIG. 93, wherein the male locking member is connected;

FIG. 110 is a cross-sectional view of the connector system shown in FIG. 93, taken along the 110-110 line shown in FIG. 108.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure. Further, it should be understood components and/or features of one embodiment may be utilized in addition to or in replace of components and/or features contained within another embodiment without departing from the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various ways, all without departing from the scope of the present disclosure. Accordingly, the drawings and description are to be regarded as illustrative and not restrictive.

The Figures show a connector system 100, which is designed to mechanically and electrically couple a device (e.g., radiator fan, heated seat, power distribution component, or another current drawing component) to a power source (e.g., alternator, battery, or power distribution component). The connector system 100 may be used in an electrical system, which may be contained within an airplane, the motor vehicle, a military vehicle (e.g., tank, personnel carrier, heavy-duty truck, and troop transporter), a bus, a locomotive, a tractor, a boat, a submarine, a battery pack, a 24-48 volt system, in a high-power application, in a high-current application, in a high-voltage applications, or in another other application where connector assemblies are essential to meet industry standards and production requirements. Specific applications within the above general application arears include, but are not limited to, power distribution junction box, alternator, starter solenoid, motor (e.g., traction motor), starter generator, power electronics (e.g., inverter, DC-DC converter (e.g., 48 volts to 24 volts), power supply, battery charger), jumper cables, connections required for power cables, fuses, buss bars, grounds, relays, battery packs (e.g., 12 volts, 24 volts, 48 volts), on board chargers, charging ports, cooling systems, or any combination of these applications. In addition to the benefits described within PCT/US2019/036010 and PCT/US2019/036070, the benefits of using the connector system 100 in these applications include a reduction in: labor cost (e.g., does not require torqueing, checking, and re-torqueing), cost of the parts to make the connections with the environment, failures, replacement parts, size, weight, along with other reductions.

Figure 51:
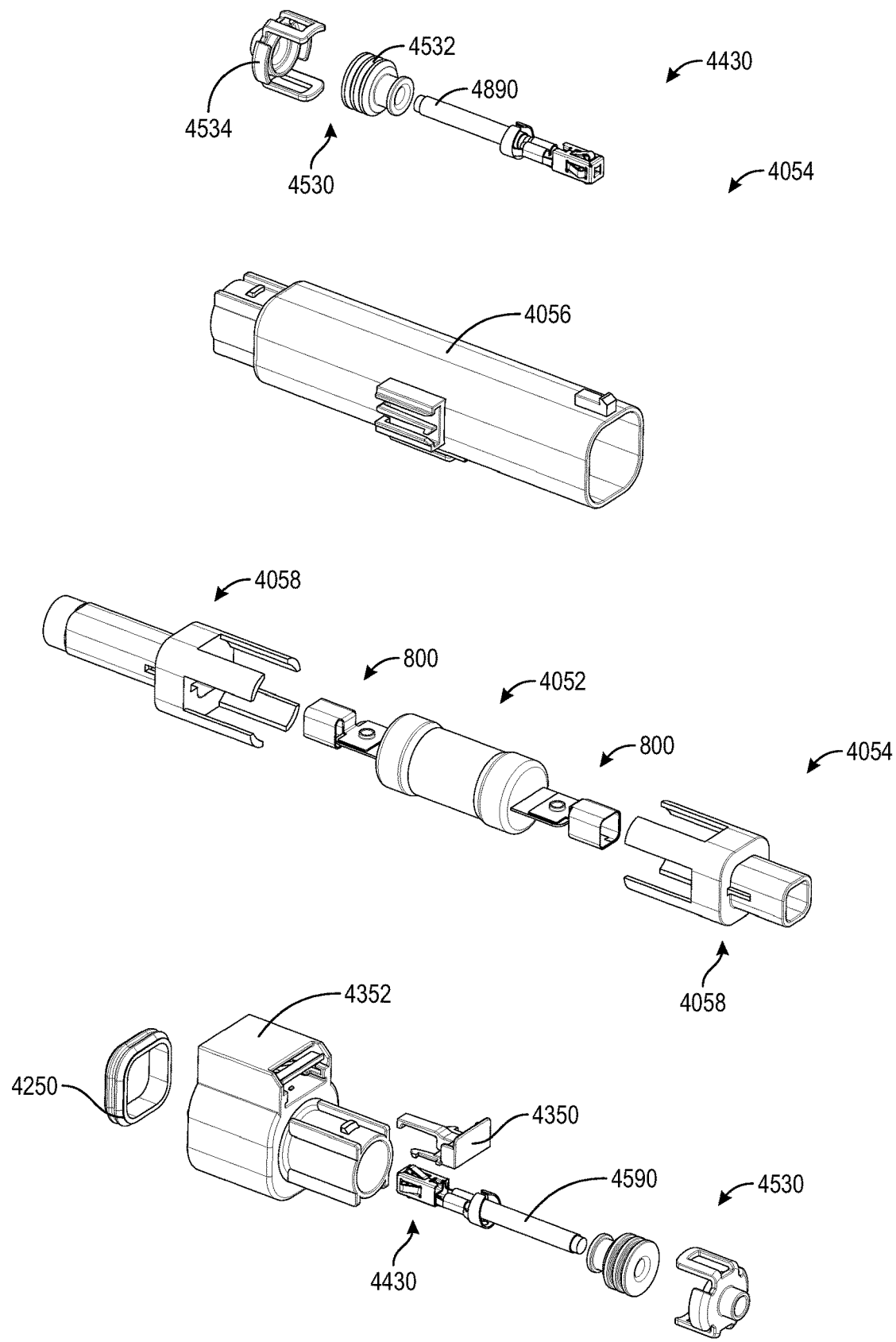
FIG. 51 is an exploded view of the in-line fuse application shown in FIG. 50.
Figure 52:
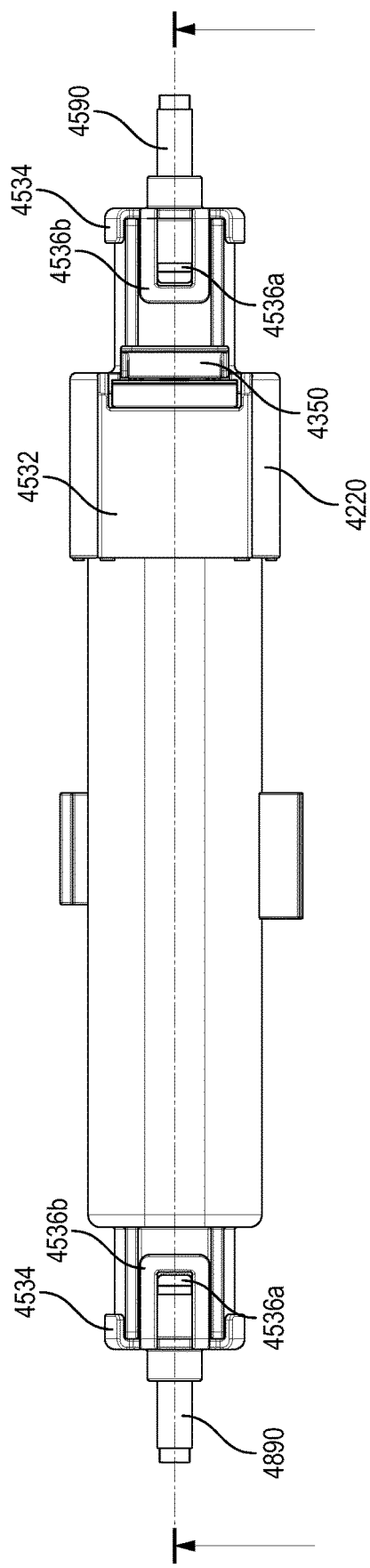
FIG. 52 is a top view of the in-line fuse application shown in FIG. 50.
Figure 53:
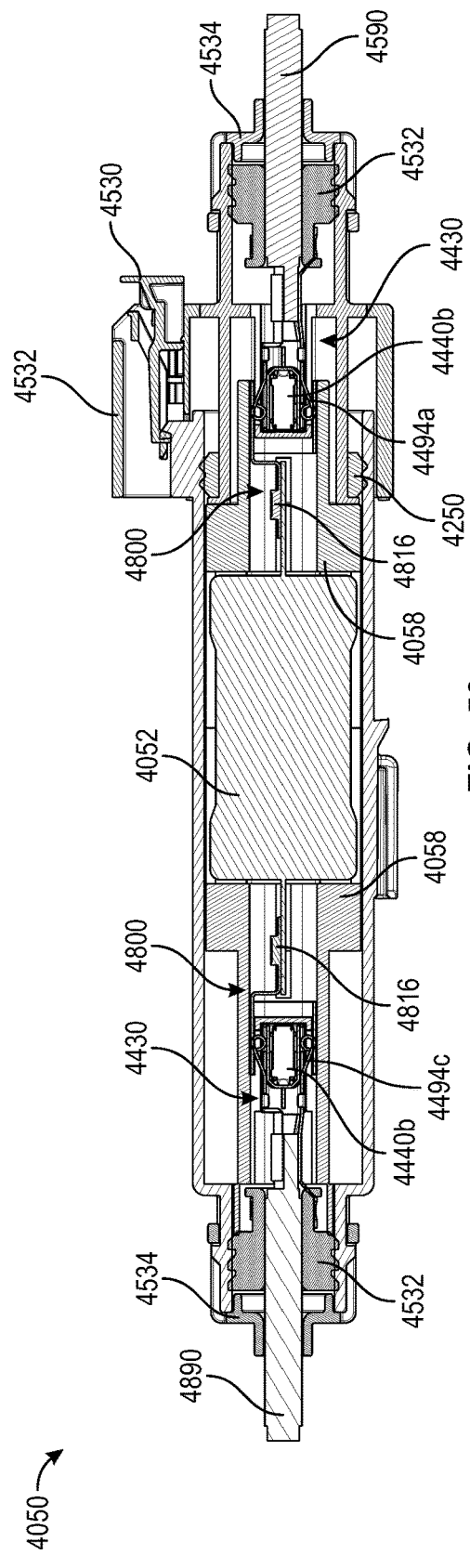
FIG. 53 is a cross-sectional view of the in-line fuse application shown in FIG. 50, taken along the 53-53 line of FIG. 52.
Figure 54:
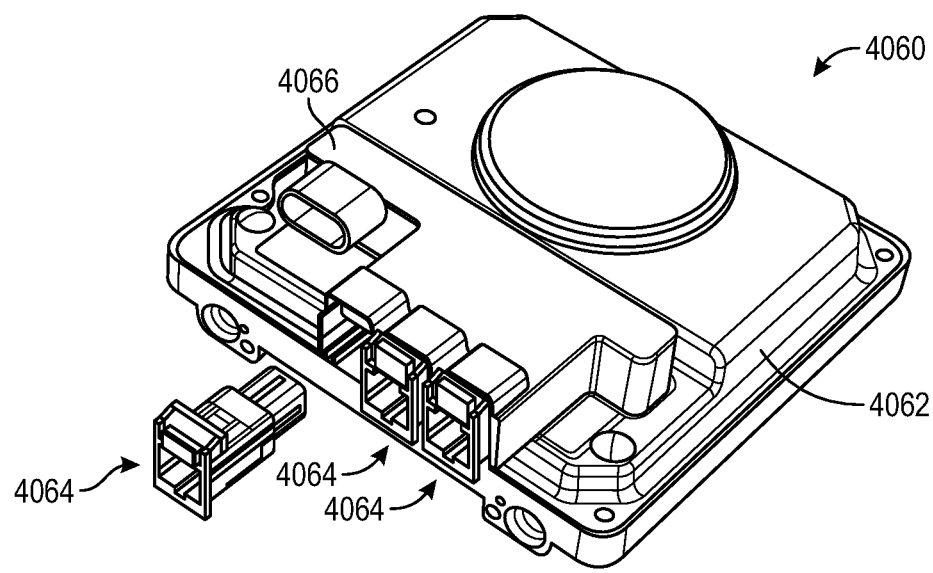
FIG. 54 is a isometric view of an isometric view of a first DC-DC converter application that includes a connector system having a male connector assembly and a female connector assembly.
Figure 55:
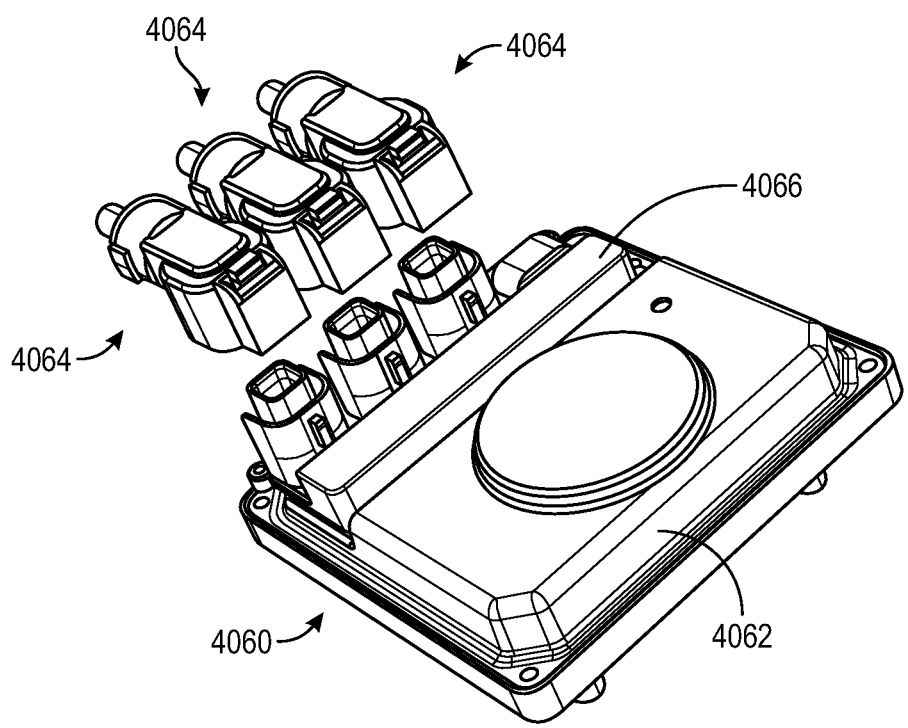
FIG. 55 is a isometric view of an isometric view of a second DC-DC converter application that includes a connector system having a male connector assembly and a female connector assembly.
Figure 56:
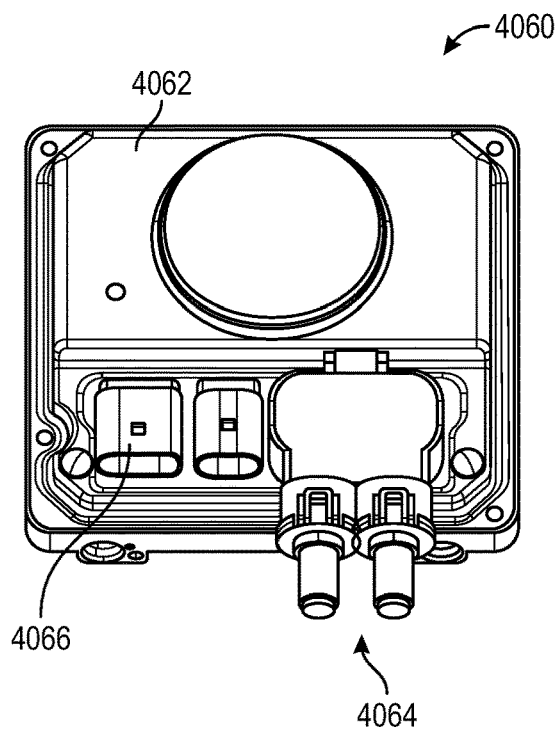
FIG. 56 is a isometric view of an isometric view of a third DC-DC converter application that includes a connector system having a male connector assembly and a female connector assembly.
Figure 57:
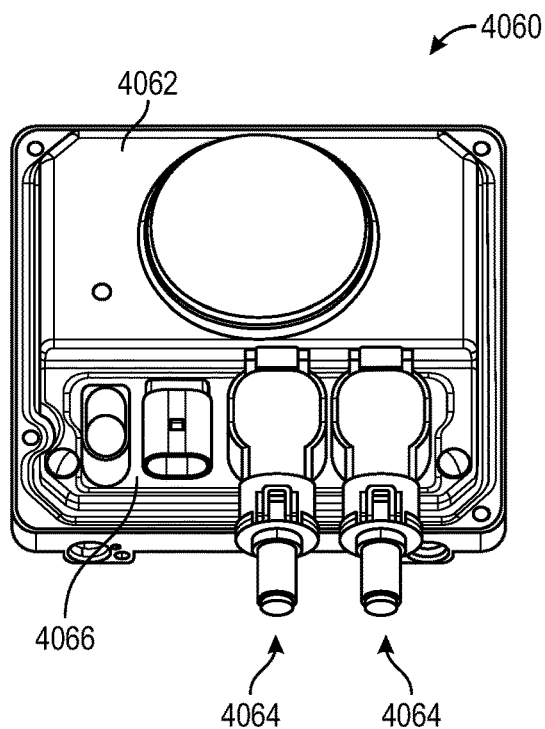
FIG. 57 is a isometric view of an isometric view of a fourth DC-DC converter application that includes a connector system having a male connector assembly and a female connector assembly.
Figure 58:
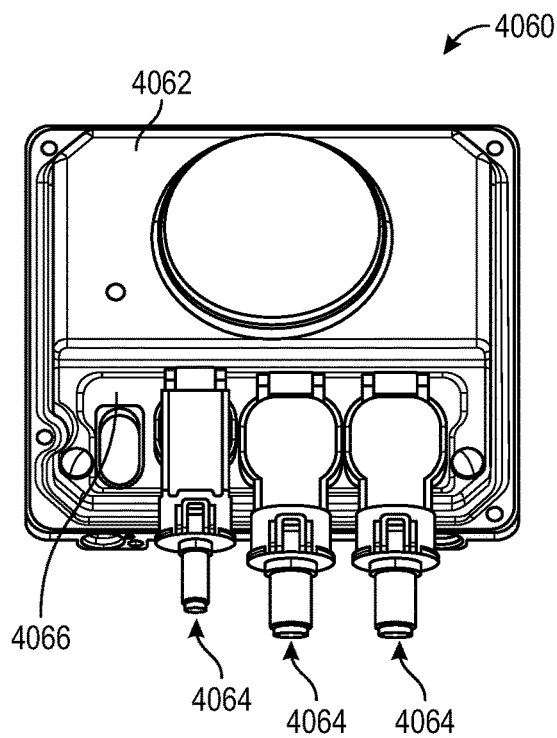
FIG. 58 is a isometric view of an isometric view of a fifth DC-DC converter application that includes a connector system having a male connector assembly and a female connector assembly.
Figure 59:
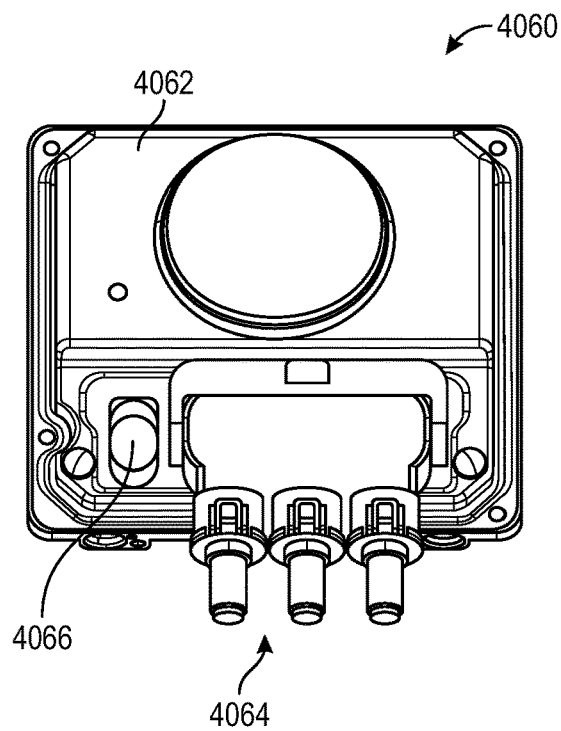
FIG. 59 is a isometric view of an isometric view of a sixth DC-DC converter application that includes a connector system having a male connector assembly and a female connector assembly.

Referring to the Figures, including a "90 degree" embodiment in FIGS. 1-49, the connector system 100 is comprised of a male connector assembly 200 and a female connector assembly 600. The male connector assembly 200 includes the male housing assembly 220 that encases at least a first substantial extent of a male terminal assembly 430. The female connector assembly 600 includes a female housing 620 with receptacle 653. The female housing 620 is configured to encase a first extent of the female terminal 800. The male housing assembly 220 is designed to: (i) facilitate the coupling of the male terminal assembly 430 with an extent of the female terminal 800, (ii) minimize the chance that male terminal assembly 430 accidentally makes electrical contact with another device or component (e.g., structures contained within the engine compartment of a vehicle, such as the frame or body of the vehicle), and (iii) meet industry standards, such as USCAR specifications. The male housing assembly 220 is typically formed from a material (e.g., polymer, such as plastic or nylon) that is non-conductive using an injection molding or over molding process. Thus, the housing 220 is capable of isolating electrical current that is configured to flow between the male terminal assembly 430 and other components or structures. It should be understood that the male housing assembly 220 does not fully encase the male terminal assembly 430 because at least a second extent of the male terminal assembly 430 must be capable of making contact with an extent of the female terminal 800 to enable current to flow between the male connector assembly 430 and the female terminal 800. As shown in FIG. 51, the male connector assembly 200 may also include a cable strain relief component 530, a connector position assurance (CPA) assembly that includes a CPA component 350, and/or a lead or wire 590. The CPA component 350 is described in greater detail below, but overall the CPA assembly is generally designed to enable the connector system 100 to meet USCAR Specifications, including USCAR-12, USCAR-25, and USCAR-2. The cable strain relief component 530, CPA assembly, and wire 590 may be omitted completely or replaced with different components. For example, the cable strain relief component 530 and the wire 590 may be replaced in an embodiment where the male terminal assembly 430 is directly coupled or integrally formed with a device. Also, in an alternative embodiment, just the cable strain relief component 530 may be omitted due to the configuration (e.g., length, rigidity, positioning, or etc.) of the wire 590.

As shown in the Figures, the female housing 620 is considerably larger than the male housing assembly 220 and is configured to receive a substantial extent of the male housing assembly 220. Like the male housing assembly 220, the female housing 620 is designed to: (i) facilitate the coupling of the male terminal assembly 430 with a female terminal 800, (ii) minimize the chance that female terminal 800 accidentally makes electrical contact with another device or structure, and (iii) meet industry standards, such as USCAR specifications. Accordingly, the female housing 620 is typically formed from a material (e.g., polymer, such as plastic or nylon) that is non-conductive using an injection molding or over molding process. Thus, the housing 620 is capable of isolating electrical current that is configured to flow through between the female terminal 800 and other structures. It should be understood that the female housing 620 does not fully encase the female terminal 800 because at least a second extent of the female terminal 800 must be capable of making contact with the male terminal assembly 620 to enable current to flow between the female connector assembly 600 and the male connector assembly 200. The female connector assembly 600 may also include a cable retainer 530 and a wire 100. The cable strain relief component 530 and wire 590 are optional components that may be omitted completely or replaced with different components. For example, the cable strain relief component 530 and the wire 590 may be completely replaced in an embodiment where the female terminal 800 is fixed to a device. Also, in an alternative embodiment, just the cable strain relief component 530 may be omitted due to the configuration (e.g., length, rigidity, positioning, or etc.) of the lead or wire 590.

FIGS. 1-12 and 30-49 provide various views of the male connector assembly 200. The male connector assembly 200 includes: (i) a male housing assembly 220, (ii) a male terminal assembly 430, (iii) a male locking member 300, and (iv) a lead or wire 590. The male housing assembly 220 includes the front male housing 224 and rear male housing 280. Both the front male housing 224 and the rear male housing 280 have complex geometries with a number of cooperatively positioned and dimensioned recesses, projections, and openings therethrough to allow for coupling of the housing 224, 280. In particular, the front male housing 224 has a body 226, a male CPA component 352, and a terminal receiver 260. The body 226 includes an arrangement of side walls 228a-228c and a top wall 236. The arrangement of side walls 228a-228c form a "U-shaped" receiver 230 that is configured to receive an extent of the male terminal assembly 230 and the wire 590 (see FIGS. 3, 7-12, and 30-47). Two of the side walls 228a, 228c of the front male housing 224 include a first part 232 of a housing coupling means 222, which in the exemplary embodiment is a plurality of integrally formed housing coupling projections 232. In particular, side walls 228a, 228c each include two formed housing coupling projections 232. However, in other embodiments, more (e.g., four or six) or fewer (e.g., one) formed housing coupling projections 232 may be utilized.

Side walls 228a, 228c also include a male locking means 256, which in this exemplary embodiment includes a plurality of locking member projections 234a, 234b that are configured to interact with an first extent 310 of the male locking member 300 to secure the male terminal assembly 340 within the male housing assembly 220. Each of the locking member projections 234a, 234b will be discussed in greater detail in connection with FIGS. 7-12. It should be understood that the male locking means 256 may include a different arrangement, combination, or number of components. For example, the side walls 228a, 228c may include a recess that interacts with a projection that is formed on the male locking member 300. In further embodiments, male locking means 256 may include structures that utilize magnetic forces, spring forces, material biasing forces or a combination of these forces.

Figure 7:
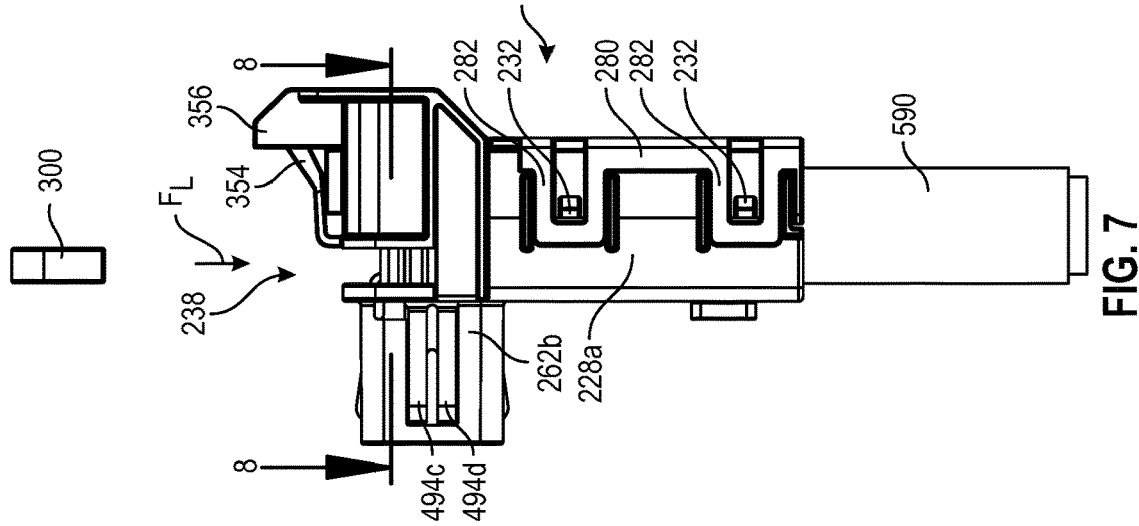
FIG. 7 is a right side view of the male connector assembly shown in FIG. 3, wherein the male locking member is separated from the male housing.
Figure 13:
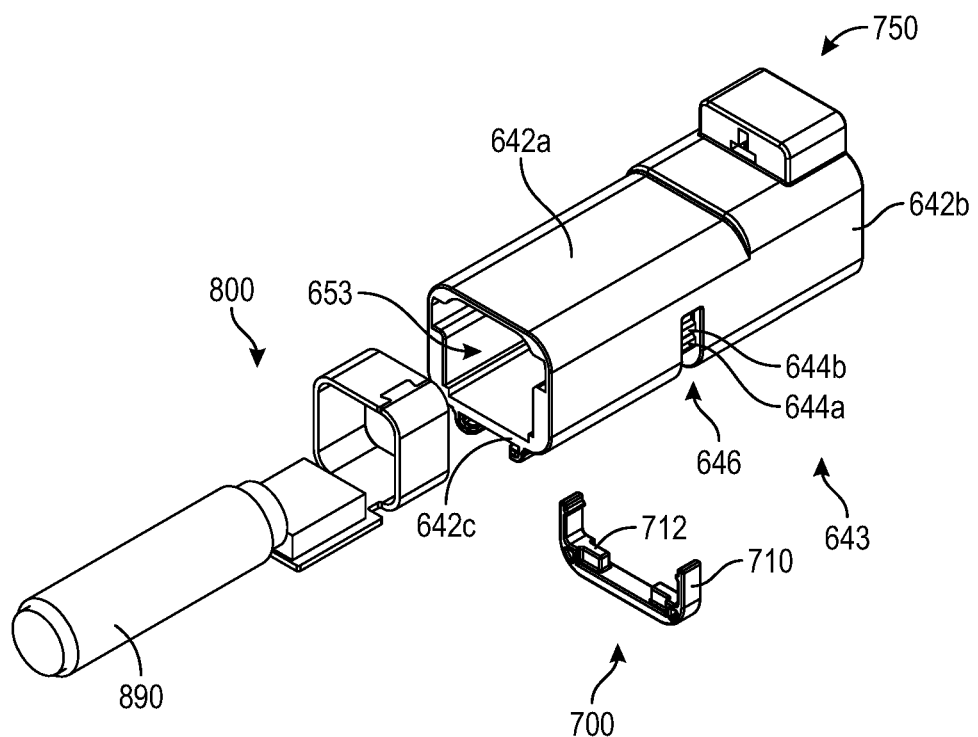
FIG. 13 is an exploded view of the female connector assembly shown in FIG. 2, wherein the female connector assembly has a female housing and a female terminal.
Figure 14:
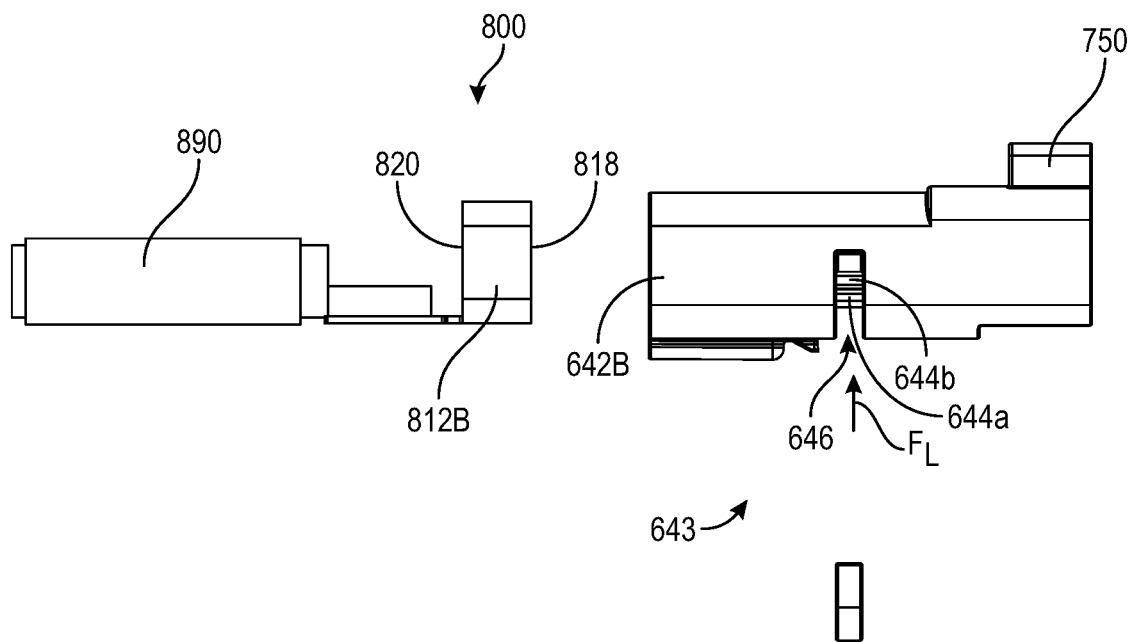
FIG. 14 is a right side view of the female connector assembly shown in FIG. 13, wherein the female locking member is separated from the female connector assembly.
Figure 15:
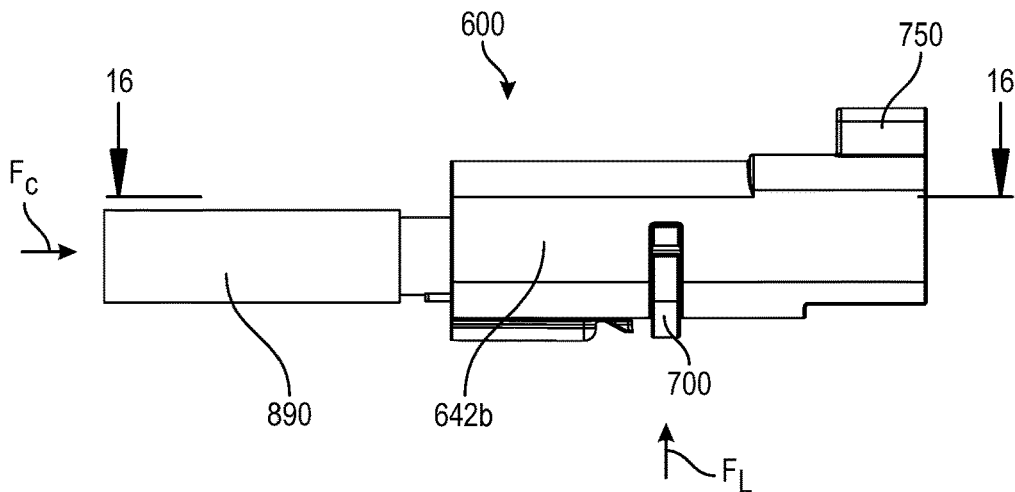
FIG. 15 is a right side view of the female connector assembly shown in FIG. 13, wherein the female locking member is partially engaged with the female housing and the female terminal is not seated within the female housing.
Figure 16:
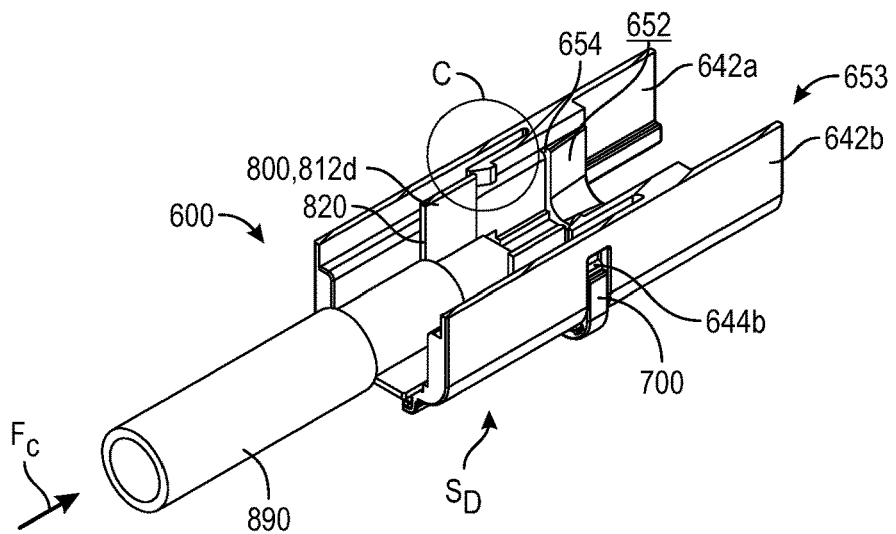
FIG. 16 is an isometric cross-sectional view of the female connector assembly shown in FIG. 15, taken along the 16-16 line of FIG. 15.
Figure 17:
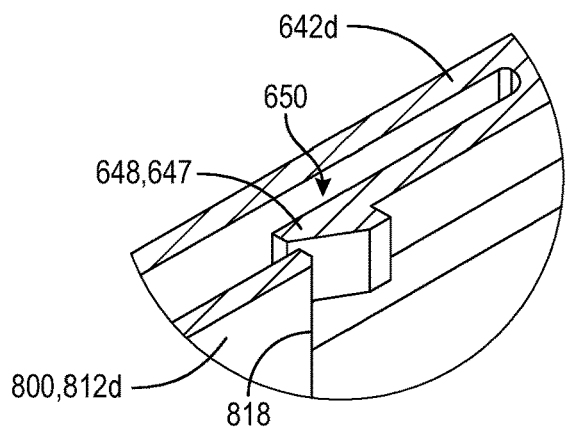
FIG. 17 is a zoomed in view of area C shown in FIG. 16.
Figure 21:
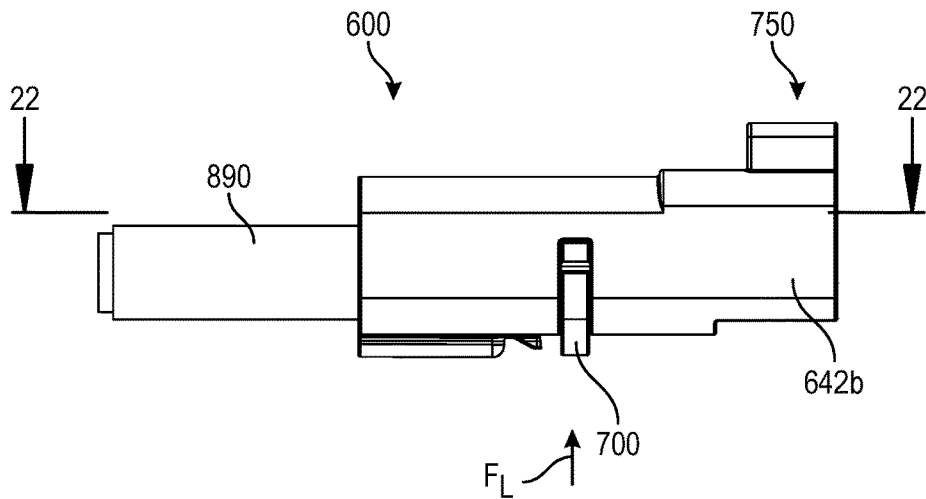
FIG. 21 is a right side view of the female connector assembly shown in FIG. 13, wherein the female locking member is partially engaged with the female housing and the female terminal is seated within the female housing.
Figure 22:
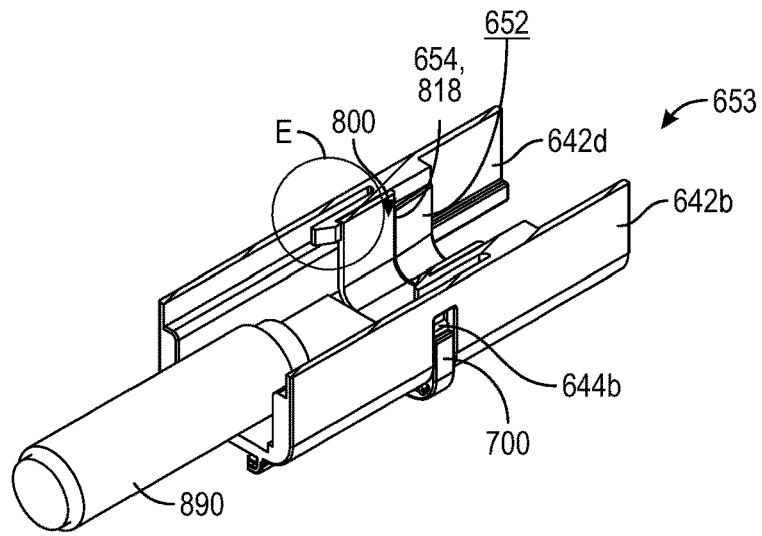
FIG. 22 is an isometric cross-sectional view of the female connector assembly shown in FIG. 21, taken along the 22-22 line of FIG. 21.
Figure 23:
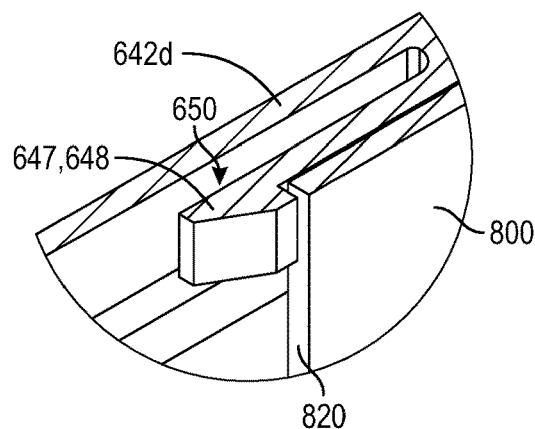
FIG. 23 is a zoomed in view of area E shown in FIG. 21.
Figure 24:
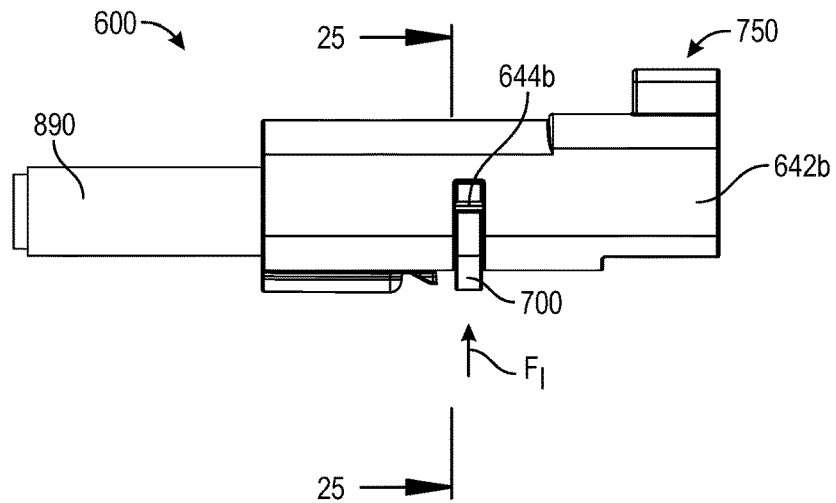
FIG. 24 is a right side view of the female connector assembly shown in FIG. 13, wherein the female locking member is partially engaged with the female housing and the female terminal is seated within the female housing.
Figure 25:
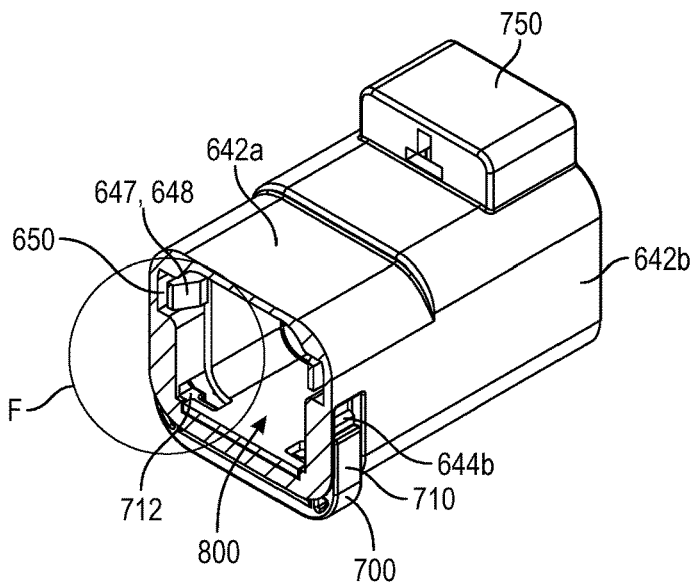
FIG. 25 is an isometric cross-sectional view of the female connector assembly shown in FIG. 24, taken along the 25-25 line of FIG. 24.
Figure 26:
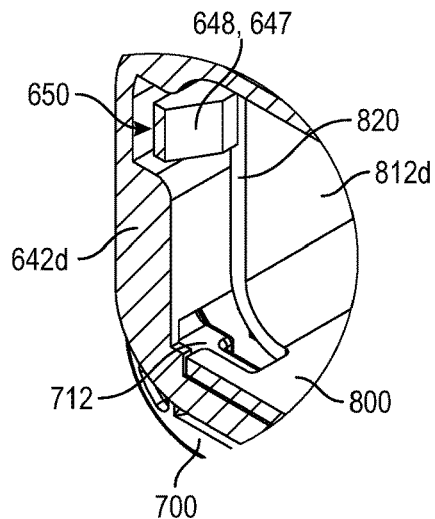
FIG. 26 is a zoomed in view of area F shown in FIG. 25.
Figure 27:
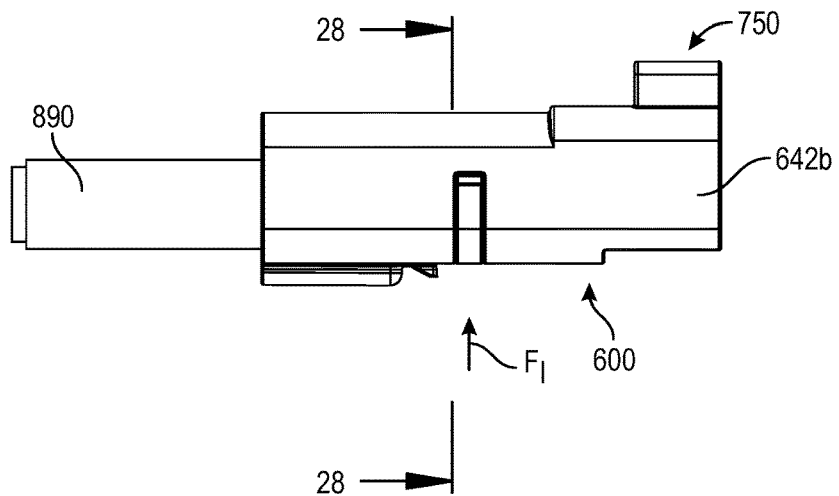
FIG. 27 is a right side view of the female connector assembly shown in FIG. 13, wherein the female locking member is engaged and the female terminal is seated within the female housing.
Figure 28:
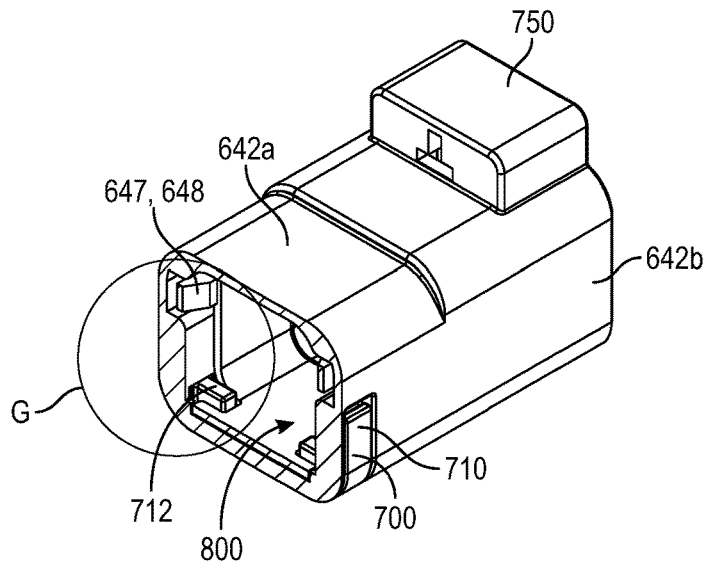
FIG. 28 is an isometric cross-sectional view of the female connector assembly shown in FIG. 27, taken along the 28-28 line of FIG. 27.
Figure 29:
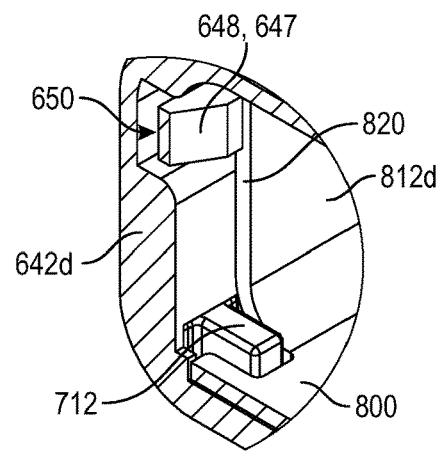
FIG. 29 is a zoomed in view of area G shown in FIG. 28.
Figure 30:
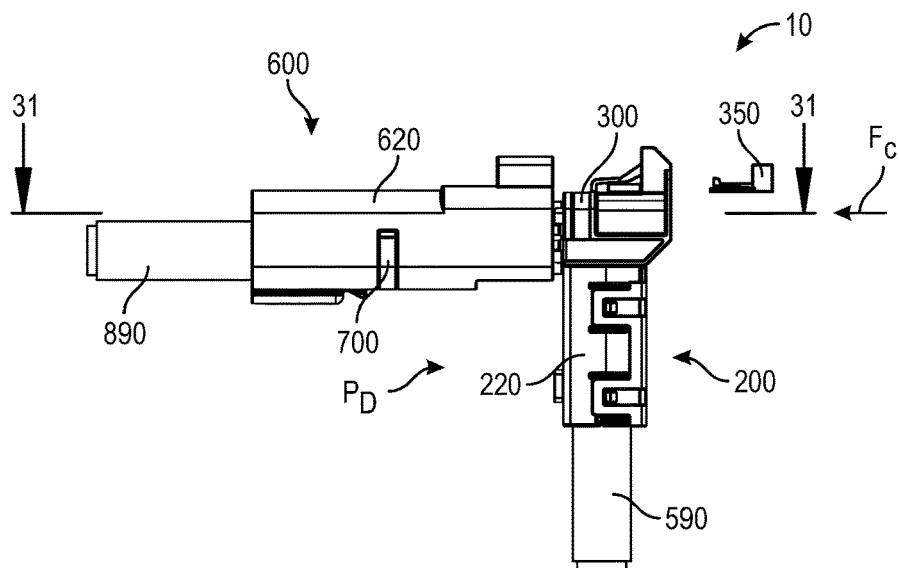
FIG. 30 is a right side view of the connector system shown in FIG. 1, wherein the male connector assembly is disconnected from the female connector assembly and the CPA is disengaged from the connector system.

Referring to 3-4 and 10, the top wall 236 of the front male housing 224 is integrally formed with the side walls 228a-228c. Specifically, the top wall 236 is connected to each of the side walls 228a-228c and resides substantially perpendicular to the side walls 228a-228c. The top wall 236 acts as a cap to the body 226 in order to close off the upper extent of the male housing assembly 220. As shown in FIG. 7, the top wall 236 includes a locking member opening 238 configured to receive an extent of the male locking member 300, when the male locking member 300 is secured to the male housing assembly 220. The top wall 236 also includes an integrally formed male CPA component 352. The male CPA component 352 includes (i) a elastically deformable CPA structure 354 and (ii) a elastically non-deformable CPA structure 356. The deformable CPA structure 354 and the non-deformable CPA structure 356 are discussed in greater detail in connection with FIGS. 39-47.

As shown in FIGS. 3, 4, and 7-12, the male terminal receiver 260 is formed from an arrangement of terminal receiver side walls 262a-262d and a terminal receiver front wall 264. The side walls 262a-262d in combination with the front wall 264 forms a bowl shaped receiver 266. The receiver 266 is configured to snugly receive a majority of the male terminal assembly 430 when it is seated within the male housing assembly 220. This configuration provides additional rigidity to the male terminal assembly 430 and limits the exposed amount of the male terminal assembly 430. However, the entire male terminal assembly 430 is not enclosed within the housing 224 because then the male terminal assembly 430 would then be prevented from contacting the female terminal 800. Thus, to facilitate the coupling of the male terminal 430 to the female terminal 800, the side walls 262a-262d each have male terminal openings 268a-268d therethrough. The male terminal openings 268a-268d are disposed through an intermediate portion of the side walls 262a-262d and are configured to permit an extent of the male terminal assembly 430 to extend through the side walls 262a-262d to enable the male terminal assembly 430 to contact the female terminal 800. The male terminal openings 268a-268d may be configured such that they are not large enough to accept insertion of an assembler's finger, a test probe, or another foreign body.

It should be understood that the further the extent of the male terminal assembly 430 extends past the outer surface 274, there is a greater chance that this extent will accidentally come into contact within a foreign body. Thus, the extent of the male terminal assembly 430 that extends past the outer surface 274 needs to balance the ability to form a proper connection with the female terminal 800. The design disclosed herein balances these factors and the extent of the male terminal assembly 430 extends beyond the outer surface 274 by less than 2 mm and preferably less than 0.5 mm. In comparison to the length of the male terminal openings 268a-268d, the extent of the male terminal assembly 430 extends beyond the outer surface 274 is less than 8% of the length and preferably less than 4% of the length.

In other embodiments, the configuration of the terminal receiver 260 and the male terminal openings 268a-268d may be different to accommodate a different male terminal assembly 430. For example, the terminal receiver 260 may have an elongated rectangular configuration to accept the male terminal assemblies described within FIGS. 59-68 of PCT patent application PCT/US2019/036010. Also, in this embodiment from PCT patent application PCT/US2019/036010, the terminal receiver 260 will not have male terminal openings positioned within an intermediate portion of side walls 262b, 262d because the side walls 3062b, 3062d do not have contact arms 494a-494h. Alternatively, the terminal receiver 260 may have a substantially circular configuration to accept the male terminal assemblies described within FIGS. 87-96 of PCT patent application PCT/US2019/036010. In further embodiments, the terminal receiver 260 may be triangular, hexagonal or type of polygonal.

Figure 1:
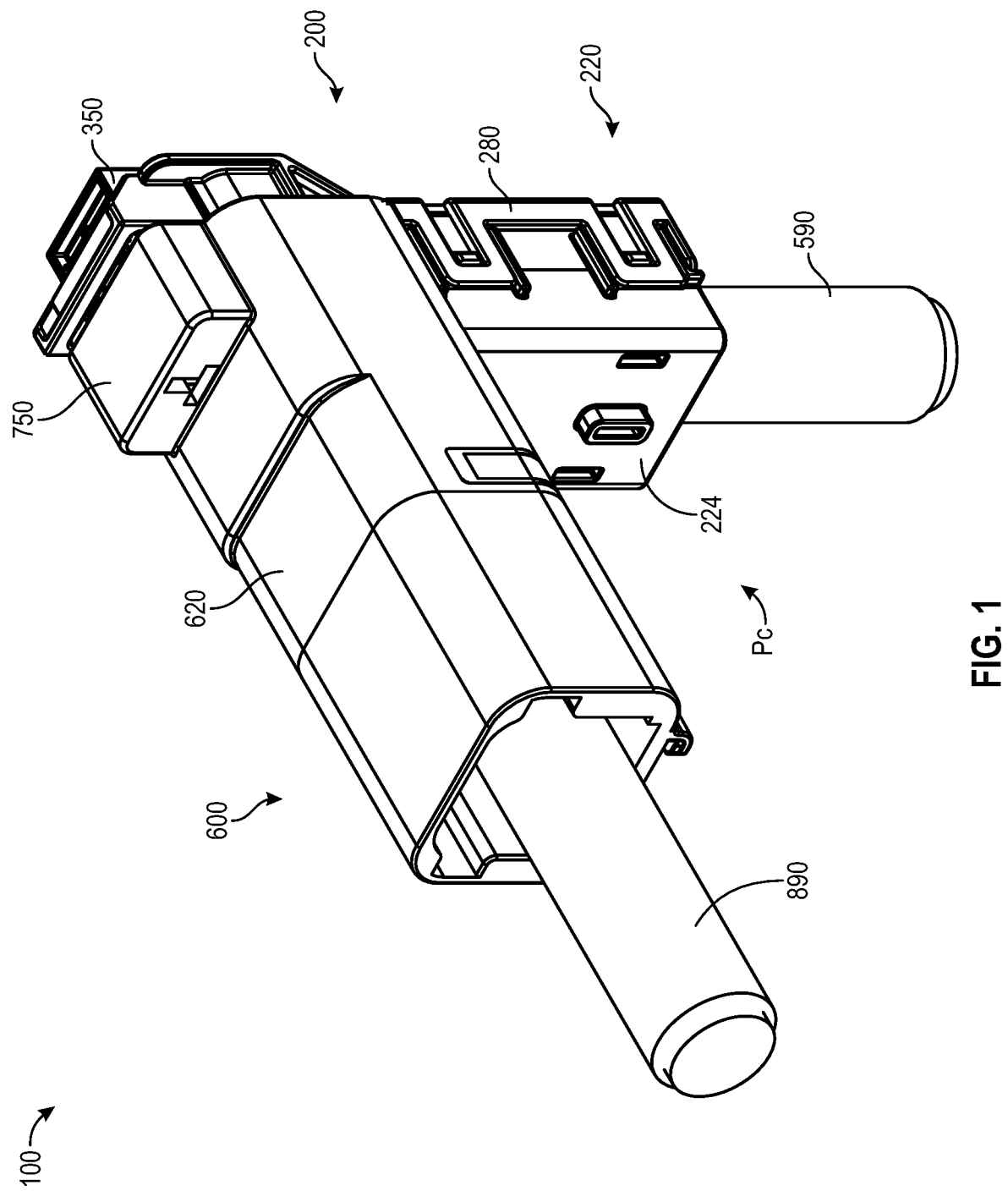
FIG. 1 is an isometric view of a first embodiment of a connector system having a male connector assembly and a female connector assembly.
Figure 2:
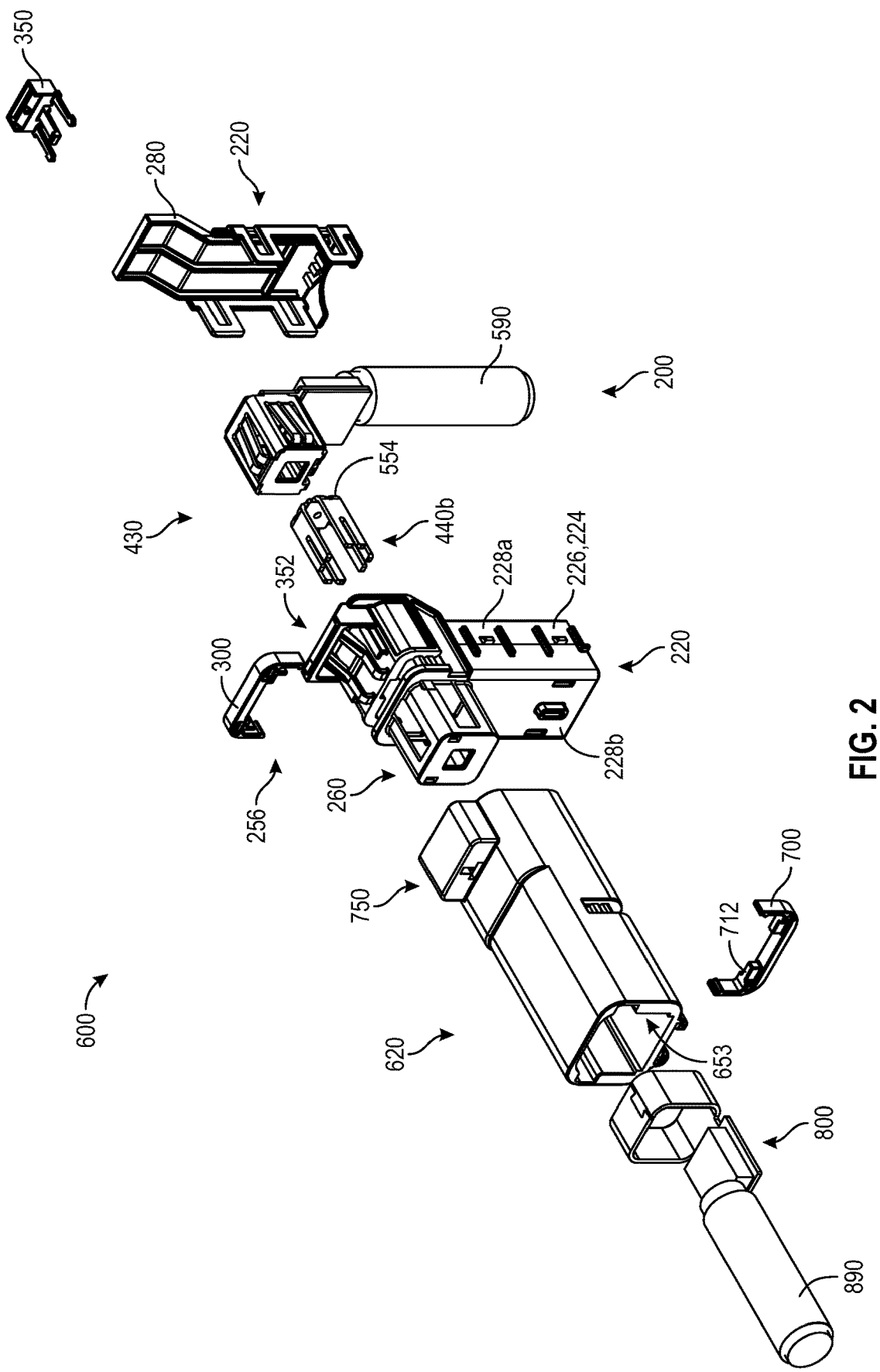
FIG. 2 is an exploded isometric view of the connector system shown in FIG. 1.
Figure 3:
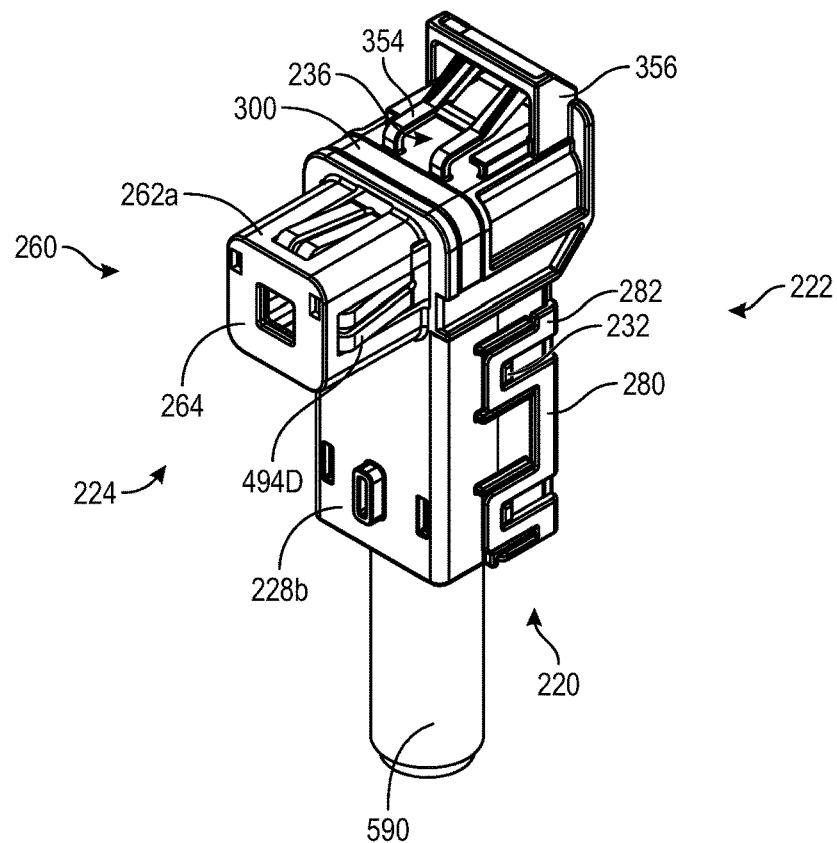
FIG. 3 is an isometric view of the male connector assembly shown in FIG. 1.
Figure 4:
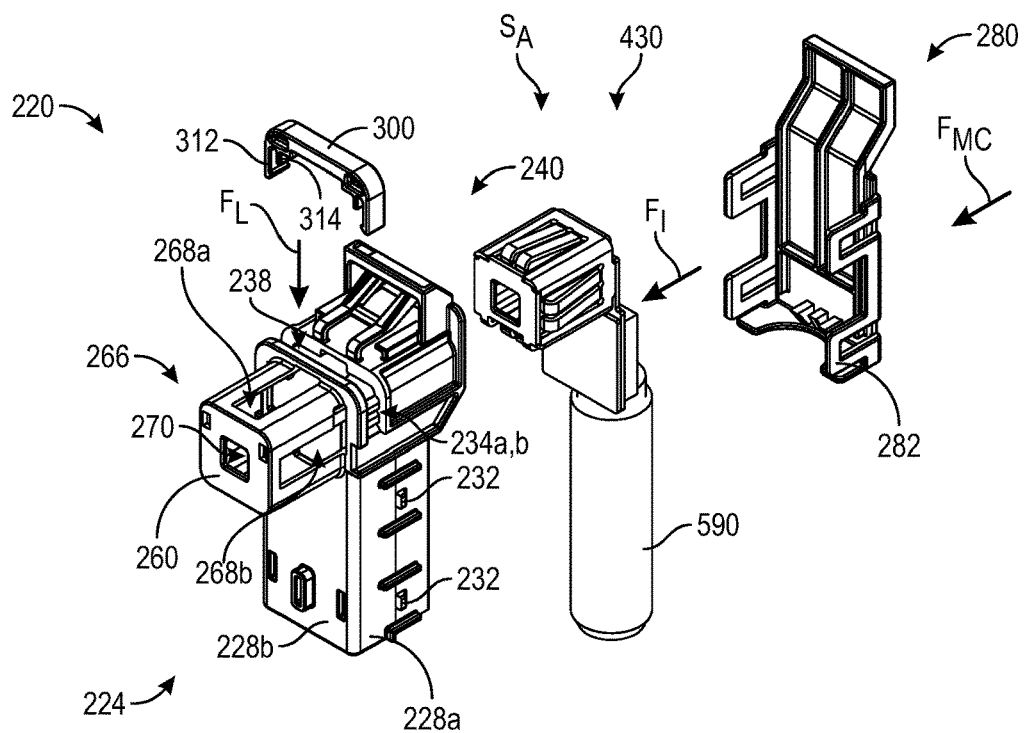
FIG. 4 is an exploded view of the male connector assembly shown in FIG. 2, wherein the male connector assembly has a male housing and a male terminal assembly.

As shown in FIGS. 2, and 4, the male housing assembly 220 is formed from multiple parts to enable the housing 220 to be disassembled for coupling of the wire to the male terminal 430, inspection and/or servicing. Disassembly is made possible by the housing connection means 222, which may be formed from two separate parts, where a first part or the housing coupling projections 232 is coupled to the front male housing 224 and a second part or a housing coupling receiver 282 is coupled to the rear male housing 280. The plurality of front male coupling projections 232 have a ramped, wedge, or triangular configuration. The housing coupling receiver 282 has a substantially "U-shaped" configuration. To couple the connection means 222, which in turn will couple the rear male housing 280 to the front male housing 224, the assembler will apply a male housing connection force, $F_{MC}$, on the rear male housing 280. This male housing connection force, $F_{MC}$, will cause an extent of at least one of the housing coupling receiver 282 to interact with the associated housing coupling projections 232. The interaction between these components will cause the rear male coupling receiver 282 to elastically deform in a manner that allows the rear male coupling receiver 282 to slide up the ramp of the front male coupling projection 232. Once the assembler has applied enough male housing connection force, $F_{MC}$, to move the rear male coupling receiver 282 past the front male coupling projection 232, the rear male coupling receiver 282 will return to its original or non-deformed state. At this point, at least an extent of the rear male housing 280 is coupled to the front male housing 224 (see FIGS. 3, 7-12, and 30-47). The assembler should then repeat this process for the other connection means 222 to fully connect the rear male housing 280 to the front male housing 224.

To disconnect the front male housing 224 from the rear male housing 280, the assembler will apply a male housing removal force that is orientated in a direction that is away from the front male housing 224 on the rear male coupling receiver 282. This force must be sufficient to elastically deform the rear male coupling receiver 282 enough to allow it to slide rearward past the front male coupling projections 232. In other embodiments, the connection means 222 may include a different arrangement, combination, or number of components. For example, the rear male housing 280 may include the projection that interacts with a receiver that is formed in the front male housing 224. In even further embodiments, the connection means 222 may include structures that utilize magnetic forces, spring forces, material biasing forces or a combination of these forces.

FIGS. 1-4, 7-12, and 30-49 show that the male connector assembly 200 has an "L-shaped" configuration. In other words, an extent of the male terminal assembly 430 is positioned substantially perpendicular to the wire 590. When coupling the male connector assembly 200 to the female connector assembly 600, the assembler will apply a coupling force, $F_C$, that is substantially perpendicular to the wire 590 and substantially parallel to an extent of the male terminal assembly 430. As discussed above, the male connector assembly 200 may have other configurations. For example, the overall shape of the male connector assembly 200 may be substantially linear, like the configuration of the female housing 620. In this embodiment, structures and features that are similar to the structures and features described below in connection with the female connector assembly 600 may be utilized and their utilization will allow for the use of a male housing assembly 220 that is not configured to be disassembled. In other embodiments, the overall shape of the male connector assembly 200 may be between linear and L-shaped.

FIGS. 2, 4-6, 8, 11, 31, 34-35, 37-38, 40-41, 43-44, 46-46a, 48-49, provide various views of the male terminal assembly 430. Specifically, the male terminal assembly 430 includes a spring member 440a, 440b and a male terminal 470. The male terminal 470 includes a male terminal body 472 and a male terminal connection member or plate 474. Said male terminal body 472 includes: (i) a first or front male terminal wall 480, (ii) an arrangement of male terminal side walls 482a-482d, and (iii) a second or rear male terminal wall 484. The combination of these walls 480, 482a-482d forms a male terminal receiver 486. The spring member 440a, 440b includes an arrangement of spring member side walls 442a-442d and a rear spring wall 444.

Figure 5:
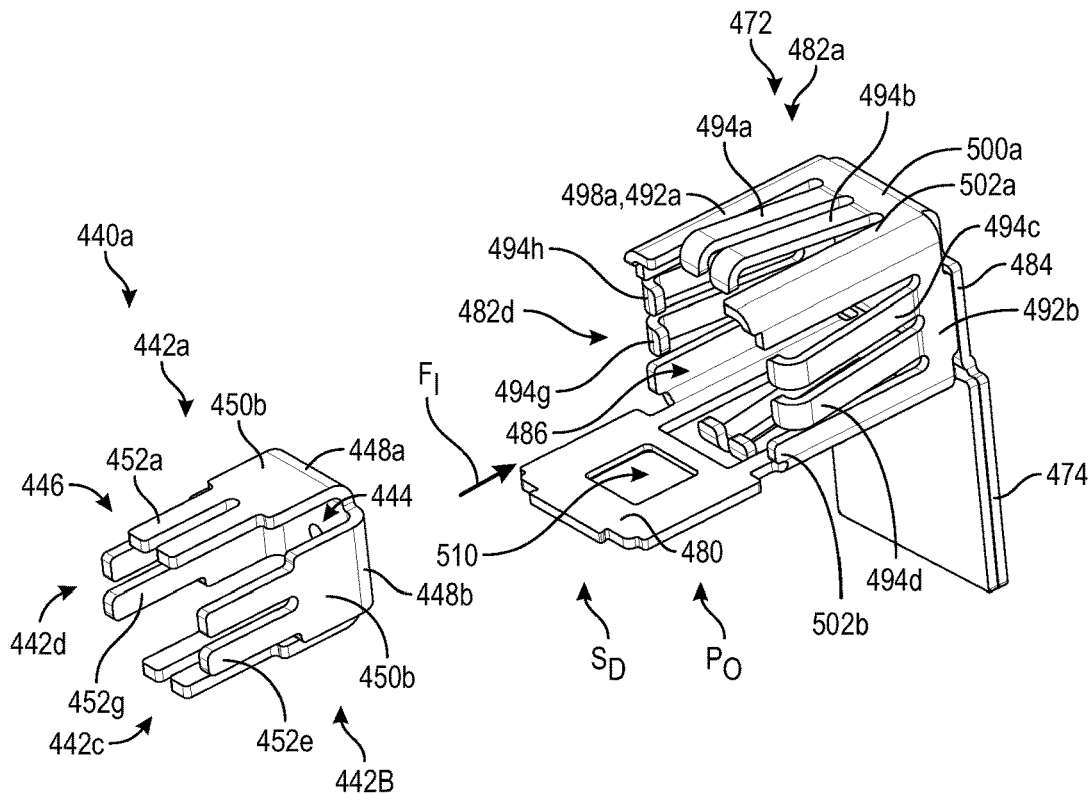
FIG. 5 is a frontal isometric view of the male terminal assembly shown in FIGS. 2 and 4, wherein a spring member is separated from a male terminal.
Figure 6:
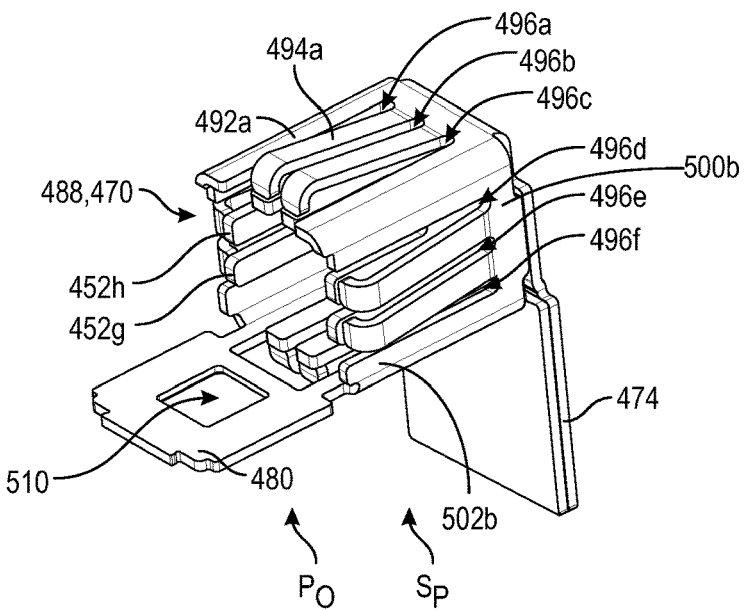
FIG. 6 is a frontal isometric view of the male terminal assembly shown in FIGS. 2 and 4, wherein the spring member is positioned within the male terminal receiver.
Figure 31:
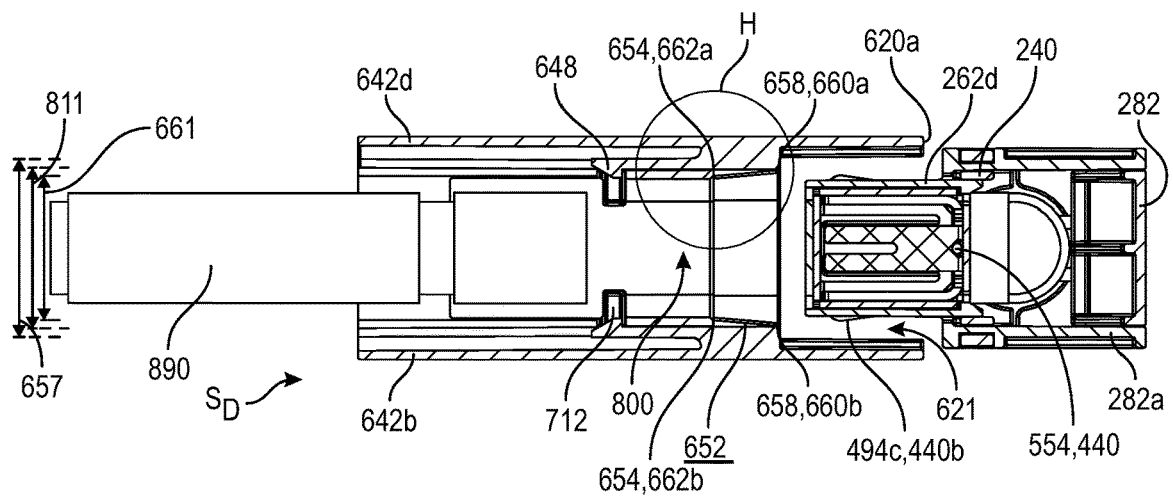
FIG. 31 is a cross-sectional view of the connector system shown in FIG. 30, taken along the 31-31 line of FIG. 30.
Figure 40:
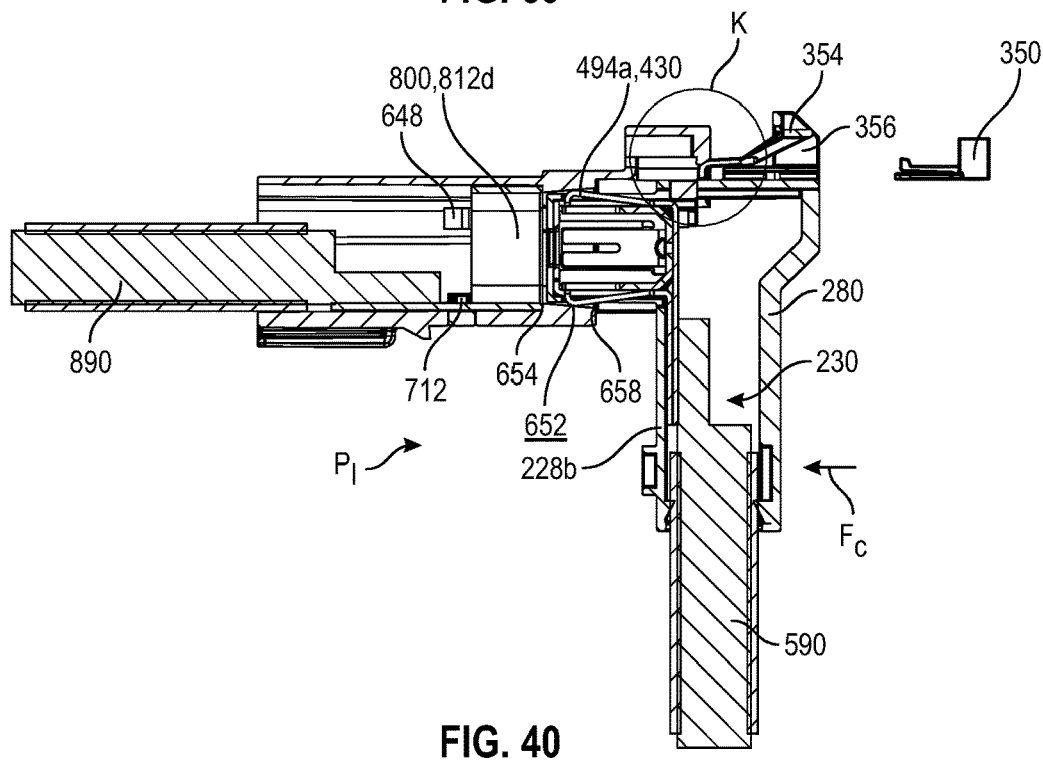
FIG. 40 is a cross-sectional view of the connector system shown in FIG. 39, taken along the 40-40 line of FIG. 39.

Coupling or positioning the spring member 440a, 440b within the male terminal assembly 430 occurs across multiple steps or stages. FIG. 5 provides the first embodiment of the male terminal assembly 430 in a disassembled state, $S_D$. FIG. 6 provides the first embodiment of the male terminal assembly 430 in a partially assembled state, $S_P$, and FIG. 31 or 40 provides the first embodiment of the male terminal assembly 430 in an assembled state, $S_A$. The first stage of assembling the male terminal assembly 430 is shown in FIG. 5, where the front male terminal wall 480 is in an open or flat position, $P_O$, and the spring member 440a is separated from the male terminal 470. In this open position, $P_O$, the front male terminal wall 480 is substantially co-planar with the male terminal side wall 482c. This configuration of the male terminal 470 exposes the male terminal receiver 486 and places the male terminal 470 in a state that is ready for receiving the spring member 440a, 440b. The second stage of assembling the male terminal assembly 430 is shown in FIG. 6, where the front male terminal wall 480 is in an open or horizontal position, $P_O$, and the spring member 440a, 440b is positioned within or inserted into the male terminal receiver 486. To reach the inserted state, an insertion force, $F_I$, has been applied to the spring member 440a, 440b to insert the spring member 440a, 440b into the male terminal receiver 486. The insertion force, $F_I$, is applied on the spring member 440a, 440b until the second or rear male terminal wall 484 is positioned adjacent to the rear spring wall 444, a free end 488 of the male terminal 470 is substantially aligned with a free end 446 of the spring member 440a, 440b, and a portion of the male terminal side walls 482a-482d are positioned adjacent a portion of the spring member side walls 442a-442d.

Figure 41:
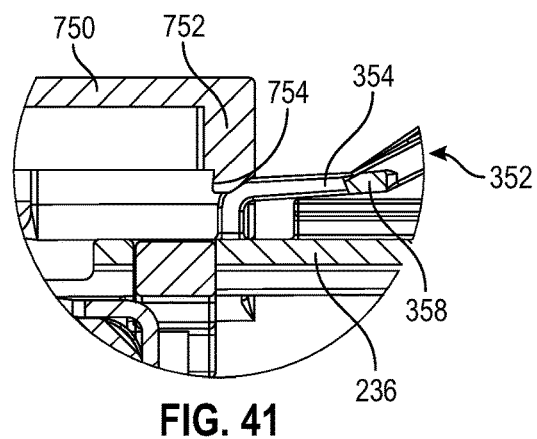
FIG. 41 is a zoomed in view of area K shown in FIG. 39.
Figure 42:
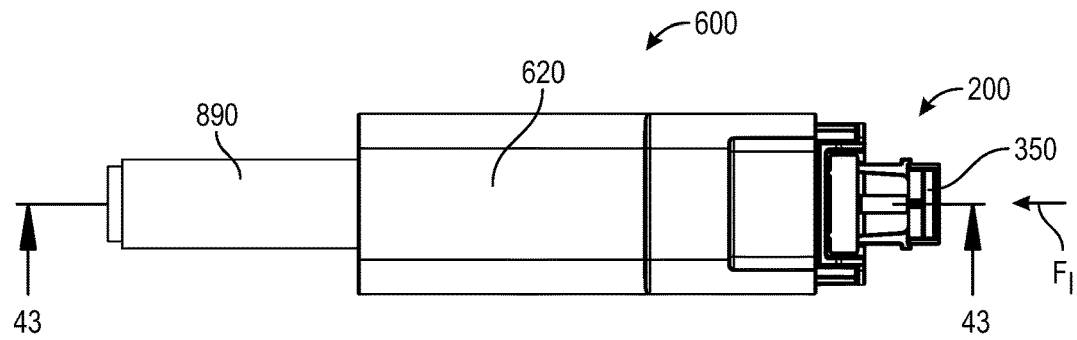
FIG. 42 is a top side view of the connector system shown in FIG. 1, wherein the male connector assembly is connected to the female connector assembly and the CPA is partially engaged with the connector system.
Figure 43:
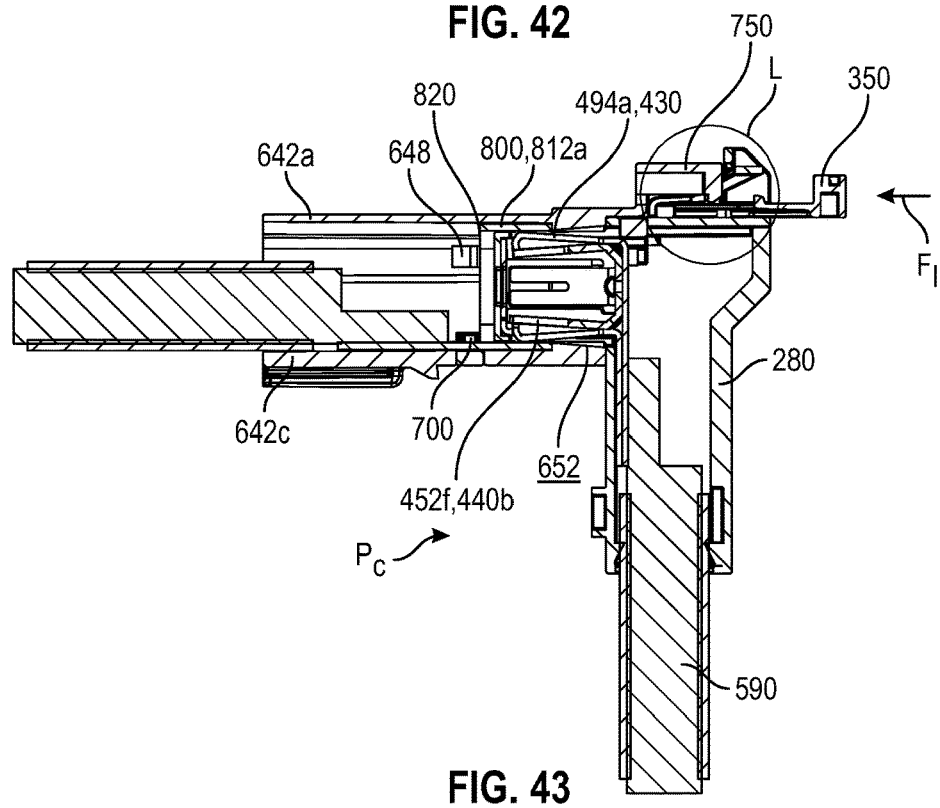
FIG. 43 is a cross-sectional view of the connector system shown in FIG. 42, taken along the 43-43 line of FIG. 42.
Figure 44:
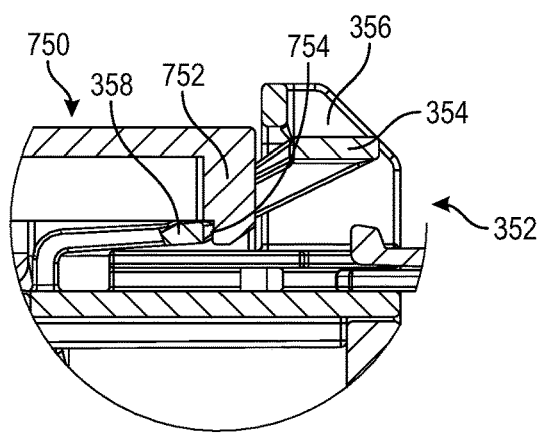
FIG. 44 is a zoomed in view of area L shown in FIG. 43.
Figure 45:
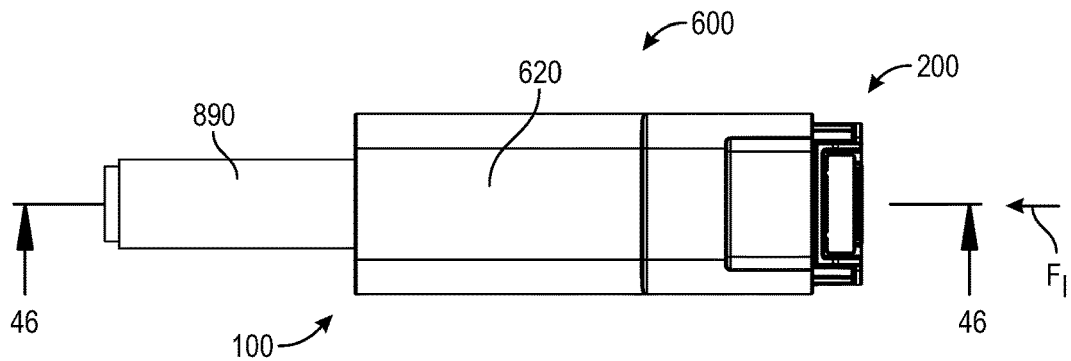
FIG. 45 is a top side view of the connector system shown in FIG. 1, wherein the male connector assembly is connected to the female connector assembly and the CPA is engaged with the connector system.
Figure 46:
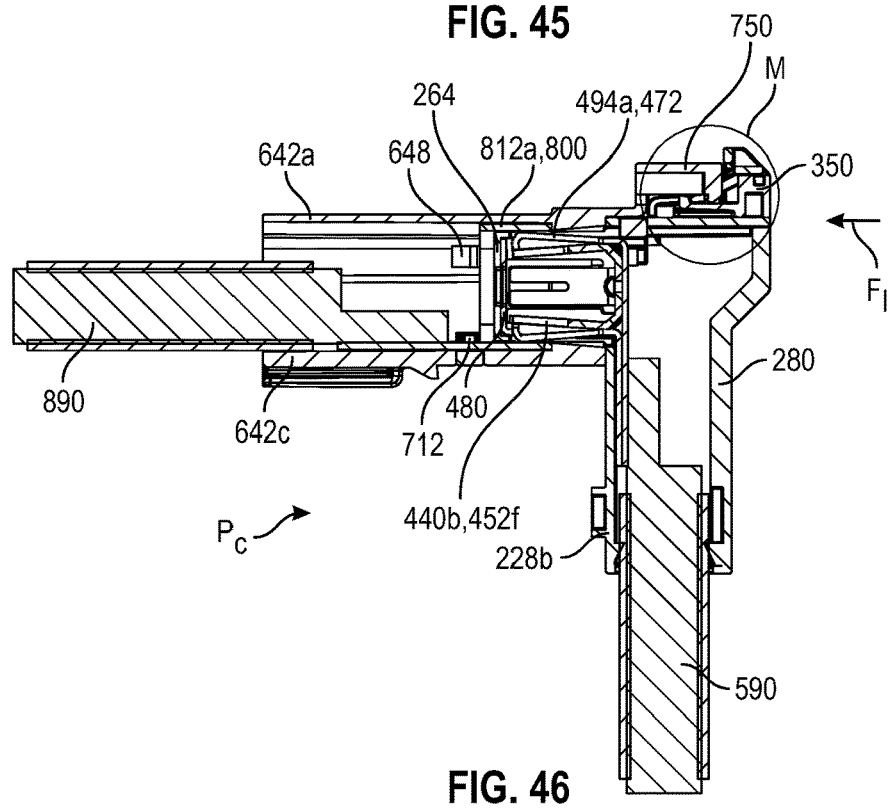
FIG. 46 is a cross-sectional view of the connector system shown in FIG. 42, taken along the 43-43 line of FIG. 42.
Figure 46A:
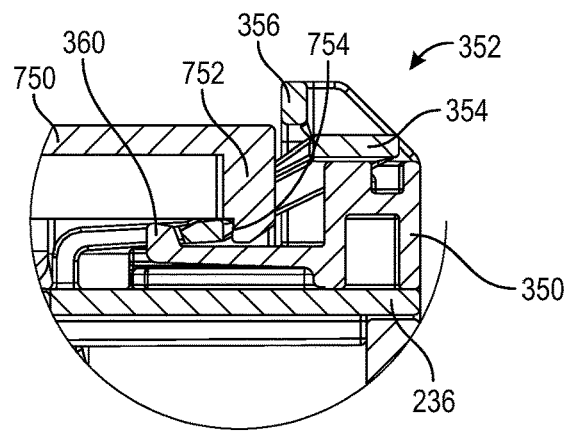
FIG. 46A is a zoomed in view of area M shown in FIG. 46.

The third stage of assembling the male terminal assembly 430 is shown in FIG. 31 or 41, where: (i) the front male terminal wall 480 is closed or vertical, $P_{CL}$, and (ii) the spring member 440a, 440b is positioned within the male terminal receiver 486. To close the front male terminal wall 480, an upward directed force is applied to the male terminal wall 480 to bend it about its seam to place it adjacent to the side walls 482a-482d. After the front male terminal wall 480 is in the proper position, the top edge is coupled (e.g., welded) to the side wall 480 of the male terminal body 472. Here, the closed or vertical, $P_{CL}$, of the front male terminal wall 480 ensures that the spring member 800 is retained within the male terminal 470. It should be understood that in other embodiments, the front male terminal wall 480 may be omitted, may not have an opening 510 there through, may not extend the entire way from side wall 482a-482d (e.g., partially extending from any side wall 482a-482d), or may be a separate piece that is coupled to both side walls 482a-482d.

FIG. 2, 4-6, 8, 11, 31, 34-35, 37-38, 40-41, 43-44, 46-49 show views of two different embodiments of the spring member 440a, 440b that are configured to function with the first embodiment of the male terminal 470. Specifically, FIGS. 5-6 show a first embodiment of the spring member 440a, while FIGS. 2, 4, 8, 11, 31, 34-35, 37-38, 40-41, 43-44, 46-49 show a second embodiment of the spring member 440b. The primary differences between the first and second embodiments include two alterations to the configuration of the spring members 440a, 440b, wherein these alterations include: (i) recess 554 and associated strengthening rib 556 and (ii) the width of the base spring sections 450a-450d. As discussed in PCT/US2019/036010, these changes to the configuration of the spring members 440a, 440b alter the forces that are associated with the spring member 440a, 440b. In particular, the spring biasing force, $S_{BF}$, is the amount of force that is applied by the spring member 440a, 440b to resist the inward deflection of the free end 446 of the spring member 440a, 440b when the male terminal assembly 430 is inserted within the female terminal 800. Specifically, this inward deflection occurs during insertion of the male terminal assembly 430 due to the fact that an extent of an outer surface of the male terminal body 472 is slightly larger than the interior of the female terminal 800. Thus, when the male terminal assembly 430 is inserted into the female terminal 800, the extent of the outer surface is forced towards the center 490 of the male terminal 470. This inward force on the outer surface displaces the free end 446 of the spring member 440a, 440b inward (i.e., towards the center 490). The spring member 440a, 440b resists this inward displacement by providing a spring biasing force, $S_{BF}$. Also, as discussed within PCT/US2019/036010, the first embodiment of the spring member 440a has a higher insertion force and thus a larger spring biasing force, $S_{BF}$, in comparison to the second embodiment of the spring member 440b.

As discussed above, the spring member 440a, 440b generally includes: (i) an arrangement of spring member side walls 442a-442d and a rear spring wall 444. More specifically, the arrangement of spring member side walls 442a-442d each are comprised of: (i) a first or arched spring section 448a-448d, (ii) a second spring section, a base spring section, or a middle spring section 450a-450d, and (iii) a third section or spring arm 452a-452h. The arched spring sections 448a-448d extend between the rear spring wall 444 and the base spring sections 450a-450d and position the base spring sections 450a-450d substantially perpendicular to the rear spring wall 444. In other words, the outer surface of the base spring sections 450a-450d is substantially perpendicular to the outer surface of the rear spring wall 444.

The base spring sections 450a-450d are positioned between the arched sections 448a-448d and the spring arms 452a-452h. As shown in FIG. 2, 4-6, 8, 11, 31, 34-35, 37-38, 40-41, 43-44, 46-49, the base spring sections 450a-450d are not connected to one another and thus middle section gaps are formed between the base spring sections 450a-450d of the spring member 440a, 440b. The gaps aid in omnidirectional expansion of the spring arms 452a-452h, which facilitates the mechanical coupling between the male terminal 470 and the female terminal 800. The spring arms 452a-452h extend from the base spring sections 450a-450d of the spring member 440a, 440b, away from the rear spring wall 444, and terminate at the free end 446. The spring arms 452a-452h are generally coplanar with the base spring sections 450a-450d and as such the outer surface of the spring arms 452a-452h are coplanar with the outer surface of the base spring sections 450a-450d. Unlike the spring arm 31 that is disclosed within FIGS. 4-8 of PCT/US2018/019787 the free end 446 of the spring arms 452a-452h do not have a curvilinear component. Instead, the spring arms 452a-452h have a substantially planar outer surface. This configuration is beneficial because it ensures that the forces associated with the spring 440a, 440b are applied substantially perpendicular to the free end 488 of the male terminal body 472. In contrast, the curvilinear components of the spring arm 31 that are disclosed within FIGS. 4-8 of PCT/US2018/019787 do not apply a force in this manner.

Like the base spring sections 450a-450d, the spring arms 452a-452h are not connected to one another. In other words, there are spring arm openings that extend between the spring arms 452a-452h. Due to the spring arm openings and the spring finger apertures, the individual spring fingers 452a-452h are not connected to one another or connected to a structure other than the base spring sections 450a-450d. This configuration allows for omnidirectional of the spring arms 452a-452h, which facilitates in the mechanical coupling between the male terminal 470 and the female terminal 800. In other embodiments, the spring arms 452a-452h may be coupled to other structures to restrict their omnidirectional expansion. The number and width of individual spring arms 452a-452h and openings may vary. In addition, the width of the individual spring arms 452a-452h is typically equal to one another; however, in other embodiments one of the spring arms 452a-452h may be wider than other spring arms.

The spring member 440a, 440b is typically formed from a single piece of material (e.g., metal). Therefore, the spring member 440a, 440b is a one-piece spring member 440a, 440b or has integrally formed features. In particular, the following features are integrally formed: (i) the rear spring wall 444, (ii) the curvilinear sections 448a-448d, (iii) the base spring sections 450a-450d, and (iii) the spring finger 452a-452h. To integrally form these features, the spring member 440a, 440b is typically formed using a die forming process. The die forming process mechanically forces the spring member 440a, 440b into shape. As discussed in greater detail below and in PCT/US2019/036010, when the spring member 440a, 440b is formed from a flat sheet of metal, installed within the male terminal 472 and connected to the female terminal 800, and is subjected to elevated temperatures, the spring member 440a, 440b applies an outwardly directed spring thermal force, $S_{TF}$, on the contact arms 494a-494h due in part to the fact that the spring member 440a, 440b attempts to return to a flat sheet. However, it should be understood that other types of forming the spring member 440a, 440b may be utilized, such as casting or using an additive manufacturing process (e.g., 3D printing). In other embodiments, the features of the spring member 440a, 440b may not be formed from a one-piece or be integrally formed, but instead formed from separate pieces that are welded together.

FIG. 2, 4-6, 8, 11, 31, 34-35, 37-38, 40-41, 43-44, 46-49 show the first embodiment of the male terminal 470. As discussed above, the first embodiment of the male terminal 470 includes the male terminal body 472 and a male terminal connection plate 474. Specifically, the male terminal connection plate 474 is coupled to the male terminal body 472 and is configured to receive an extent of a structure (e.g., lead or wire, as shown in FIG. 2) that connects the male terminal assembly 430 to a device (e.g., an alternator) outside of the connector system 100. The wire 590 is typically welded to the connection plate 474; however, other methods (e.g., forming the wire 590 as a part of the connection plate 474) of connecting the wire 590 to the connection plate 474 are contemplated by this disclosure.

The arrangement of male terminal side walls 482a-482d are coupled to one another and generally form a rectangular prism. The arrangement of male terminal side walls 482a-482d include: (i) a side wall portion 492a-492d, which generally has a "U-shaped" configuration, (ii) contact arms 494a-494h, and (iii) a plurality of contact arm openings 496a-496l. As best shown in FIGS. 2 and 5-6, the side wall portions 492a-492d are substantially planar and have a U-shaped configuration. The U-shaped configuration is formed from three substantially linear segments, wherein a second or intermediate segment 500a-500d is coupled on one end to a first or end segment 498a-498d and on the other end to a third or opposing end segment 502a-502d. The contact arms 494a-494h extend: (i) from an extent of the intermediate segment 500a-500d of the side wall portion 492a-492d, (ii) away from the rear male terminal wall 484, (iii) across an extent of the contact arm openings 496a-496l, and (iv) terminate just short of the front male terminal wall 480. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 470 can be installed in narrower, restrictive spaces, (ii) has a higher current carrying capacity, (iii) is easier to assemble, (iv) improved structural rigidity because the contact arms 494a-494h are positioned inside of the first male terminal side wall portion 492a-492d, (iv) benefits that are disclosed in connection with PCT/US2019/036070, and (v) benefits that are disclosed in connection with PCT/US2019/036010, and (v) other beneficial features that are disclosed herein or can be inferred by one of ordinary skill in the art from this disclosure.

The arrangement of contact arm openings 496a-496l are integrally formed with the intermediate portion 500a-500d of the male terminal side walls 482a-482d. The contact arm openings 496a-496l extend along the lateral length of the contact arms 494a-494h in order to create a configuration that permits the contact arms 494a-494h not to be laterally connected to: (i) another contact arm 494a-494h or (ii) a structure other than the extent of the male terminal side wall portion 492a-492d to which the contact arms 494a-494h are coupled thereto. Additionally, the contact arm openings 496a-496l are aligned with the spring arm openings. This configuration of openings forms the same number of spring arms 452a-452h as the number of contact arms 494a-494h. In other words, FIGS. 5-6 show eight spring arms 452a-452h and eight contact arms 494a-494h. Additionally, these figures show that the width of the spring arms 452a-452h substantially matches the width of the contact arms 494a-494h. It should be understood that in other embodiments, the number of spring arms 452a-452h may not match the number of contact arms 494a-494h. For example, there may be fewer one spring arms 452a-452h.

The contact arms 494a-494h extend away from the rear male terminal wall 484 at an outward angle. In particular, the outward angle may be between 0.1 degree and 16 degrees between the outer surface of the extent of the male terminal side wall 492a-492d and the outer surface of the first extent of the contact arms 494a-494h, preferably between 5 degrees and 12 degrees and most preferably between 7 degrees and 8 degrees. This outward angle is shown in multiple figures, but may be best visualized in connection with FIGS. 3-6, 8, 11, 33-34, and 37-38. This configuration allows the contact arms 494a-494h to be deflected or displaced inward and towards the center 490 of the male terminal 470 by the female terminal 800, when the male terminal assembly 430 is inserted into the female terminal 800. This inward deflection is best shown in FIGS. 37-38, 43-44, 46-47 and 49 and other figures contained within PCT/US2019/036010 and PCT/US2019/036070. This inward deflection helps ensure that a proper mechanical and electrical connection is created by ensuring that the contact arms 494a-494h are placed in contact with the female terminal 800.

As shown in FIGS. 6, 37-38, 40-41, 43, 46 and 49, the terminal ends of the contact arms 494a-494h are positioned: (i) within an aperture formed by the U-shaped side wall portions 492a-492d, (ii) within the receiver 486, (iii) substantially parallel to the male terminal side wall 492a-492d, and (iv) in contact the planar outer surface of the spring arms 452a-452h, when the spring member 440a, 440b is inserted into the male terminal receiver 486. This configuration is beneficial over the configuration shown in FIGS. 3-8 in PCT/US2018/019787 because the assembler of the male terminal assembly 430 does not have to apply a significant force in order to deform a majority of the contact arms 494a-494h outward to accept the spring member 440a, 440b. This required deformation can best be shown in FIG. 6 of PCT/US2018/019787 due to the slope of the contact arm 11 and the fact the outer surface of the spring arm 31 and the inner surface of the contact arm 11 are adjacent to one another without a gap formed therebetween. In contrast to FIGS. 3-8 in PCT/US2018/019787, FIGS. 6, 37-38, 40, 43, and 46 of the present application show a gap that is formed between the outer surfaces of the spring member 440a, 440b and the inner surface of the contact arms 494a-494h. Accordingly, very little force is required to insert the spring member 440a, 440b into the receiver 486 due to the fact the assembler does not have to force the contact arms 494a-494h to significantly deform during the insertion of the spring 440a, 440b.

The male terminal 470 is typically formed from a single piece of material (e.g., metal). Therefore, the male terminal 470 is a one-piece male terminal 470 and has integrally formed features. To integrally form these features, the male terminal 470 is typically formed using a die cutting process. However, it should be understood that other types of forming the male terminal 470 may be utilized, such as casting or using an additive manufacturing process (e.g., 3D printing). In other embodiments, the features of the male terminal 470 may not be formed from one-piece or be integrally formed, but instead formed from separate pieces that are welded together.

Figure 9:
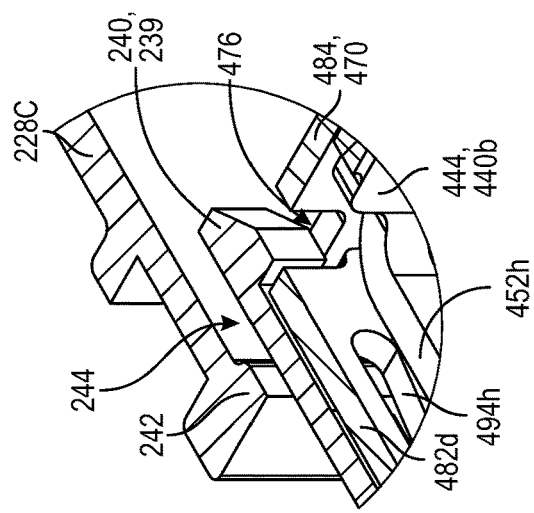
FIG. 9 is a zoomed in view of area A shown in FIG. 8.
Figure 8:
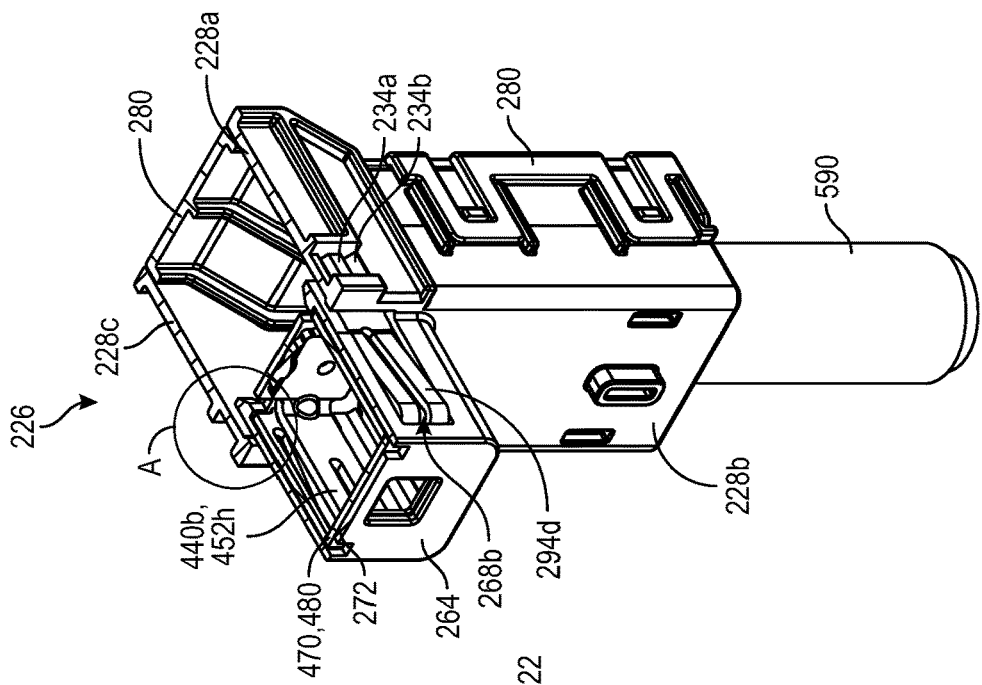
FIG. 8 is an isometric cross-sectional view of the male connector assembly shown in FIG. 7, taken along the 8-8 line of FIG. 7.

FIGS. 4 and 7-12 show the positioning of the male terminal assembly 430 within the male housing assembly 220. Coupling the male terminal assembly 430 within the male housing assembly 220 occurs across multiple steps or stages. The first step in this process starts with securing the male terminal assembly 430 within the male terminal receiver 260 using a male securing means 239. The securing means 239 in this exemplary embodiment includes a securing arm 240. A first insertion force, $F_I$, on the male terminal assembly 430 cause securing arms 240 to interact with the front male terminal wall 480 of the male terminal assembly 430. This interaction will cause the securing arms 240 to elastically deform outward and towards the side walls 228a, 228c of the front male housing body 226. Specifically, the securing arms 240 will elastically deform around a securing arm projection 242 that is formed within the side walls 228a and 228c (FIG. 9). The deformation around the securing arm projection 242 will cause an extent of the securing arms 240 to be positioned within securing arm gap 244. Positioning an extent of the securing arms 240 within the securing arm gap 244 will allow the male terminal assembly 430 to be inserted into the terminal receiver 260. It should be understood that the assembler must apply a sufficient amount of insertion force, to cause the securing arms 240 to elastically deform. Without applying a sufficient amount of insertion force, $F_I$, the assembler will not be able to cause the securing arms 240 to elastically deform; thus, the assembler will not be able to position the male terminal assembly 430 within the male housing assembly 220. Also, it should be understood that the width of the securing arm projection 242, the length the securing arm 240 extends past the securing arm projection 242, the thickness of the securing arm 240, and the material of the securing arm 240 will alter the amount of insertion force, $F_I$, that is necessary to couple the male terminal assembly 430 to the male housing assembly 220.

The next step in the process of positioning the male terminal assembly 430 within the male housing assembly 220 occurs when the assembler applies a second insertion force, $F_I$, on the male terminal assembly 430 to cause: (i) the front male terminal wall 480 to be positioned against the inner surface 272 of the front wall 264, (ii) the contact arms 494a-494h to be positioned within the male terminal openings 268a-268d. At this point, the securing arms 240 can return to their original or non-deformed state due to the fact the securing arms 240 can fit into a securing arm receiver 476 that is formed in the rear male terminal wall 484 of the male terminal 470. The return of the securing arms 240 may cause an audible sound (e.g., click) when it moves from the deformed state to the original or non-deformed state. This audible sound will inform the assembler that the male terminal assembly 430 is properly seated within the male housing assembly 220; thus meeting industry standards and/or requirements (e.g., USCAR).

The final step in the process of coupling the male terminal assembly 430 within the male housing assembly 220 occurs when the assembler applies a locking force, $F_L$, on the male locking member 300. The application of the locking force, $F_L$, on the male locking member 300 will cause a first extent 310 of the male locking member 300 to elastically deform outward in order to overcome the male locking member projections 234a, 234b. Meanwhile, the application of the locking force, $F_L$, on the male locking member 300 will not cause a second extent 312 of the male locking member 300 to elastically deform in the same manner as the first extent 310. The first extent 310 elastically deforms in a different manner then the second extent 312 due to the configuration of the male housing assembly 220. Specifically, the first extent 310 travels against the outside surface of the side walls 228a-228c and must pass over the locking member projections 234a, 234b, while the second extent 312 travels against the inside surface of the side walls 228a-228c and does not have to pass over any locking member projections 234a, 234b.

Once the male locking member 300 has overcome the second male locking member projection 234b, the first extent 310 of the male locking member 300 will return to its original or non-deformed state. The return of the first extent 310 of the male locking member 300 may cause an audible sound (e.g., click) when it moves from the deformed state to the non-deformed state. This audible sound will inform the assembler that the male locking member 300 is properly connected to the male housing assembly 220; thus meeting industry standards and/or requirements (e.g., USCAR). Additionally, when the male locking member 300 is properly connected to the male housing assembly 220 (see FIG. 12), the second extent 312 is positioned within the securing arm gap 244. Positioning the second extent 312 within the securing arm gap 244 ensures that the male terminal assembly 430 cannot be removed from the male housing assembly 220 without damaging the housing 220 because the securing arms 240 cannot be elastically deform into the securing arm gap 244 as the securing arm gap 244 is occupied by the second extent 312. At this point, the male terminal assembly 430 is properly coupled to the male housing assembly 220. The male locking member 300 may also position an extent (not shown) of the male locking member 300 behind the male terminal assembly 430, when the male locking member 300 is properly connected to the male housing assembly 220. The extent of the male locking member 300 may be similar to the secondary lock 712, which is shown and described in connection with FIGS. 2, 19-20 and 25-29. This additional secondary lock 712 may help further secure the male terminal assembly 430 to the male housing assembly 220 and may reduce vibrational forces that are experienced by the male terminal assembly 430. In further embodiments, additional locking features may be utilized to lock the male terminal 430 within the male terminal housing 220.

The final step in assembling the male connector assembly 200 requires the assembler to couple the rear male housing 280 to the front male housing 224. As described above, the assembler will apply a connection force, $F_{MC}$, on the rear male housing 280 to engage the connection means 222. Once the connection means 222 is engaged, the male housing assembly 220 is assembled; thus, finishing the assembly of the male connector assembly 200. It should be understood that all of the steps described above can be done in the reverse order to disassemble the male connector assembly 200. It should be understood that other structures, such as magnets, springs, alternative configurations of projections, alternative configurations of receivers, or a combination of these structures may be utilized.

Without being able to disconnect the male housing assembly 220 from the male terminal assembly 430, it would be difficult for the assembler to couple (e.g., weld) the wire 590 to the male terminal assembly 430 without potentially compromising the integrity of the male housing assembly 220. Nevertheless, there are alternative embodiments that allow void the need to be able to disassemble the male housing assembly 220. For example, the wire 590 or a stud (not shown) may be attached during the process of manufacturing the male connector assembly 200; thus, the assembler does not have to weld the male terminal assembly 430 to another structure (e.g., wire). In this example, the wire 590 may be coupled to the male terminal assembly 430 and then the housing may be formed around the male terminal assembly 430 using an injection molding or additive manufacturing process. In another example, the male housing assembly 220 may not need to be capable of being disassembled, if a different method (e.g., push in attachment method) of connecting the wire 590 to the male terminal assembly 430 was utilized.

Figure 32:
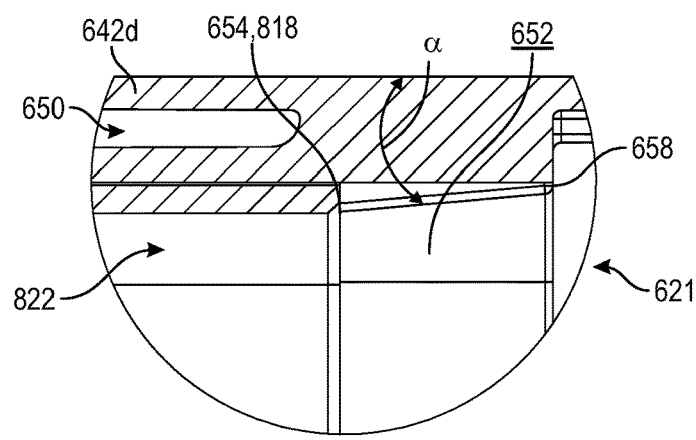
FIG. 32 is a zoomed in view of area H shown in FIG. 31.
Figure 33:
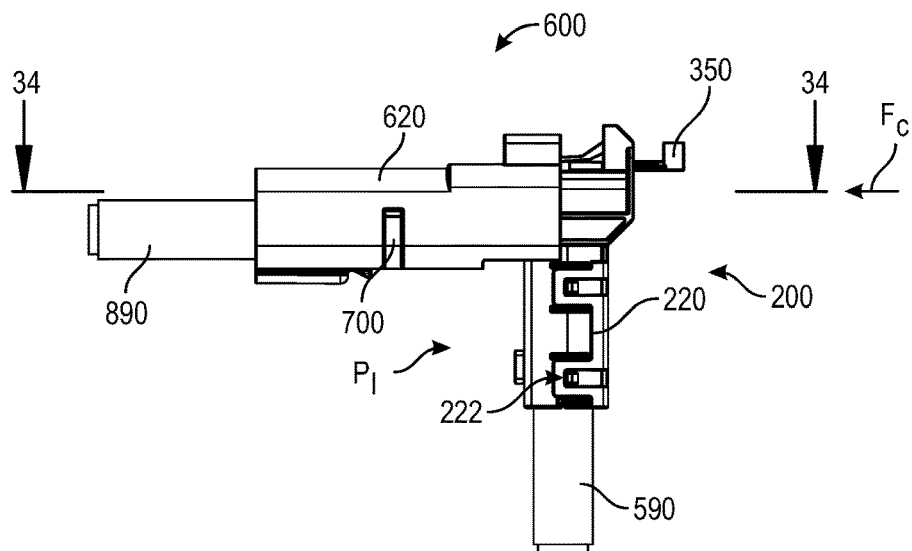
FIG. 33 is a right side view of the connector system shown in FIG. 1, wherein the connector system is in an intermediate position and the CPA is partially engaged with the connector system.
Figure 34:
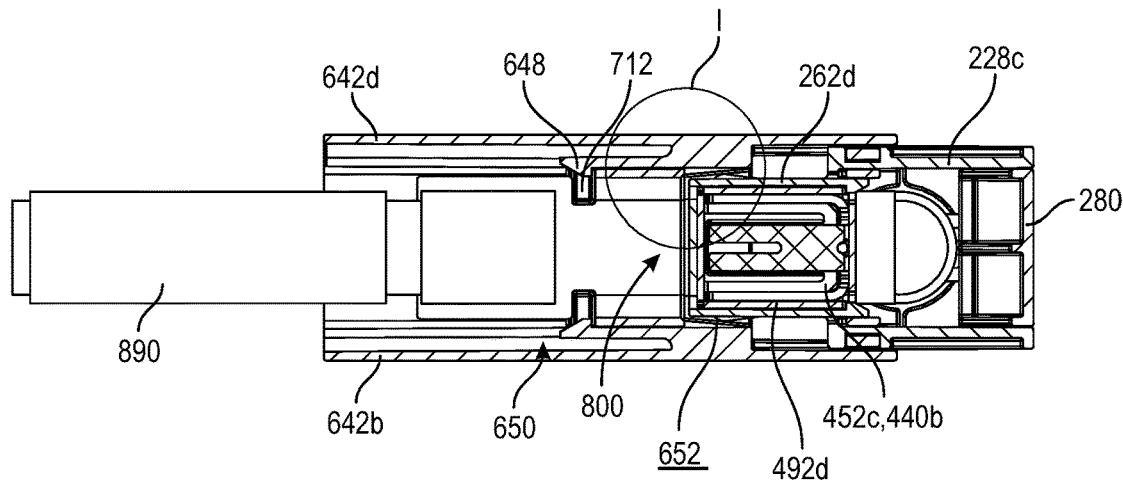
FIG. 34 is a cross-sectional view of the connector system shown in FIG. 33, taken along the 34-34 line of FIG. 33.
Figure 35:
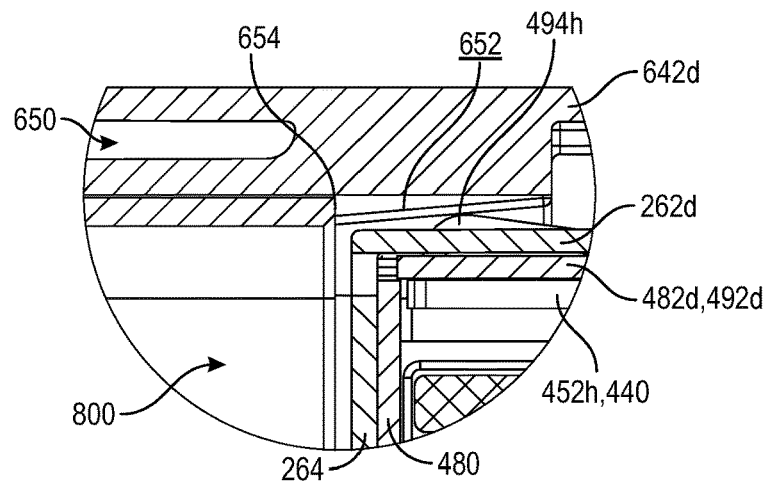
FIG. 35 is a zoomed in view of area I shown in FIG. 34.
Figure 36:
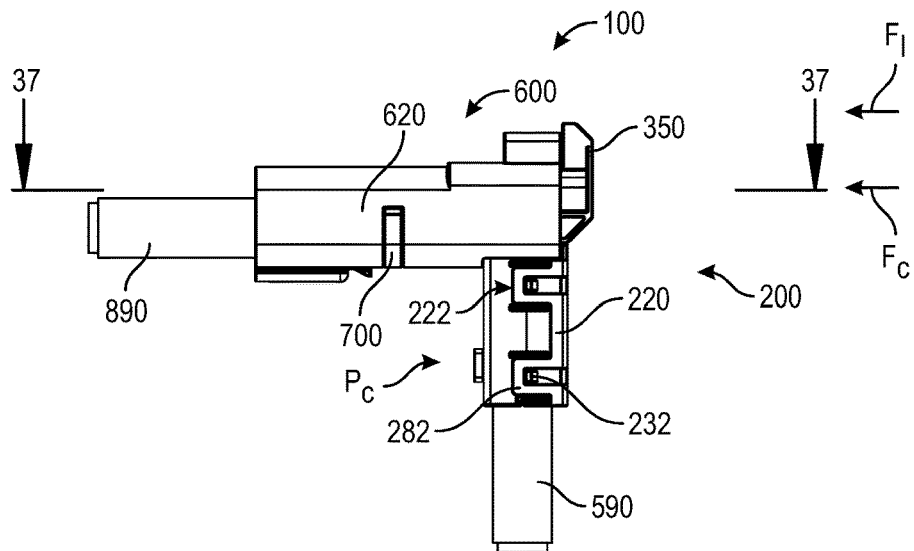
FIG. 36 is a right side view of the connector system shown in FIG. 1, wherein the male connector assembly is connected to the female connector assembly and the CPA is engaged with the connector system.
Figure 37:
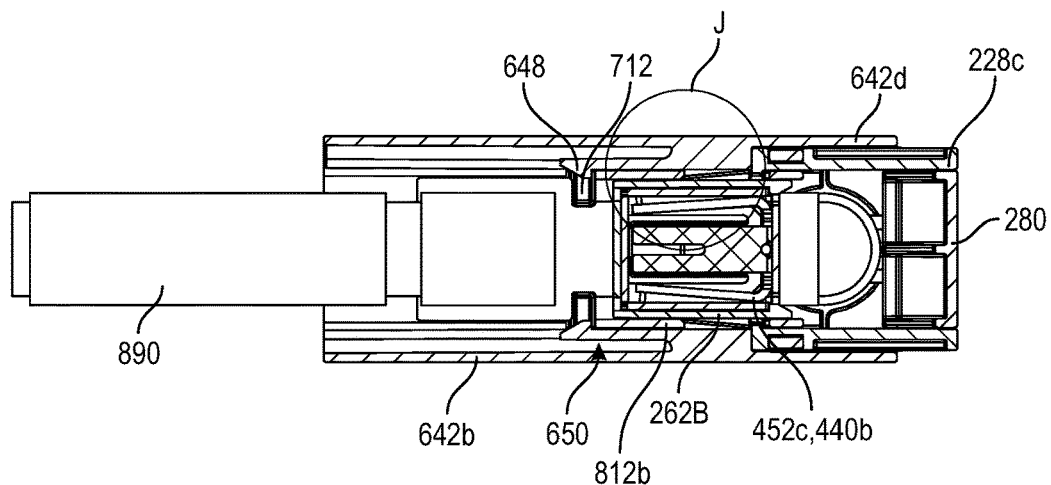
FIG. 37 is a cross-sectional view of the connector system shown in FIG. 36, taken along the 37-37 line of FIG. 36.
Figure 38:
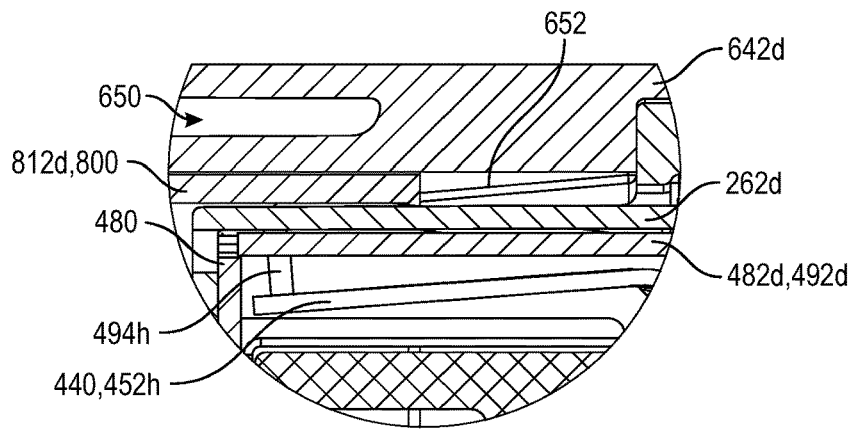
FIG. 38 is a zoomed in view of area J shown in FIG. 37.
Figure 39:
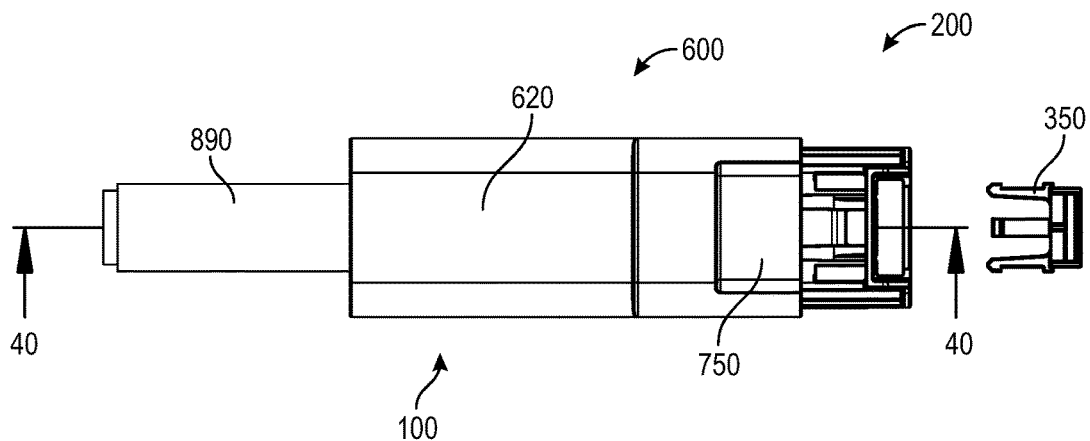
FIG. 39 is a top side view of the connector system shown in FIG. 1, wherein the connector system is in an intermediate position and the CPA is disengaged from the connector system.

FIGS. 1-2 and 13-46a provide various views of the female connector assembly 600. The female connector assembly 600 includes: (i) a female housing 620, (ii) a female terminal 800, (iii) a female locking member 700, and (iv) a wire 890. Like the male housing assembly 220, the female housing 620 has complex geometry with a number of recesses and projections. In particular, the female housing 620 has a body 640 and a female CPA component 750. The body 640 also includes an arrangement of side walls 642a-642d that form a substantially rectangular receptacle 653, which is configured to receive the female terminal assembly 800 and the wire 890 (see FIGS. 15-16, 18, 21-22, 24-46a). At least one of the side walls 642a-642d of the female housing 620 has means for displacing the contact arms 494a-494h during insertion of the male terminal 430. Referring specifically to FIGS. 31-32, the side walls 642a-642d of the female housing 620 an internal segment 651 designed to slidingly engage with an extent of the contact arms 494a-494h of the male terminal 430 during insertion of the male terminal assembly 200 into the receptacle 653 of the female housing 620, as detail below. The internal segment 651 is angled or sloped relative to the outer surface of the side walls 642a-642d at an internal angle, α. In this exemplary embodiment, the internal angle α is between 0.01 degrees and 15 degrees, preferably between 1 degree and 7 degrees and most preferably 5 degrees. Also, the internal angle α is substantially constant. This angled internal segment 651 is designed to gently compress contact arms 494a-494h inward as these two components slidingly engage while the operator (e.g., a worker or a robot) inserts the male connector assembly 200 into the receptacle 653 of the female connector assembly 600.

As best shown in FIG. 31, the angled internal segment 651 includes a leading, forwardmost extent 658 and a trailing, rearmost extent 654, which defines a length of the internal segment 651. The forwardmost extent 658 and the rearmost extent 654 are recessed from the leading edge 620a of the female housing 620. The rearmost extent 654 is positioned adjacent to the forwardmost edge 818 of the female terminal 800, when the female terminal is received by the female housing receptacle 653. Also, as shown in FIG. 31 and due to its angled configuration, the angled internal segment 651 has a forward width 657 that extends between the forwardmost extent 658 of a first edge 660a of the internal segment 651 and an opposing forwardmost extent 658 of a first edge 660b of the internal segment 651. The forward width 657 is approximately 1% to 15% larger than a rear width 661 of the internal segment 651 that extends between a rearmost extent 654 of a first edge 662a of the internal segment 651 and an opposing rearmost extent 654 of a first edge 662b of the internal segment 651. In other words, the forward internal segment width 657 is greater than the rear internal segment width 661, which facilitates in the inward compression of the contact arms 494a-494h as the male connector assembly 200 is slidingly inserted into the female housing receptacle 653 of the female connector assembly 600.

Again referring to FIGS. 31 and 32, the rearmost extent 654 of the internal angled segment 651 is at least positioned coplanar with the inside surface 822 of the female terminal 800 and preferably positioned inward of the inside surface 822. Stated another way, the rear internal segment width 661 is smaller than a front receiver width 811 that extends between the forwardmost extent 818 of the inner surface 822 of one side wall 812b and the opposed forwardmost extent 818 of the inner surface 822 of one side wall 812d. In this exemplary embodiment, the rear width 661 may be 0.6 mm smaller than the receiver width 811.

It should be understood that in other embodiments, the sloped or angled configuration of the internal segment 651 may not be constant, may not be recessed from the leading edge of the housing 620 (see the Figures showing embodiment three), the dimensions may be different, and the internal segment 651 may not be continuous within the housing 620, instead, it may be discontinuous and thus only be present in certain locations. It should also be understood that the internal segment 651 is typically formed from the same material that the rest of the female housing is formed from, such as polymer (e.g., nylon or plastic). Utilizing a polymer material is beneficial because there is less friction between the metal contact arms 494a-494h and the polymer material in comparison to the friction between the metal contact arms 494a-494h and the metal female terminal 800. In alternative embodiments, a coating, liner or other materials may be used to line or coat the internal surface 652 to reduce the friction with the contact arms 494a-494h.

Two of the side walls 642b, 642d of the female housing 620 include a female locking means 643, which in this exemplary embodiment include a plurality of locking member projections 644a, 644b that are configured to interact with an extent of a locking member 700. The side walls 642a, 642b, 642c also include a locking member opening 646. The locking member projections 644a, 644b and the locking member opening 646 are configured to interact with the female locking member 700 to secure the female terminal 800 within the female housing 620. Each of these locking member projections 644a, 644b, locking member opening 646, and other features of the female housing 620 will be discussed in greater detail in connection with FIGS. 15-46a. It should be understood that the female locking means 643 may include a different arrangement, combination, or number of components. For example, the side walls 642b, 642d may include a recess that interacts with a projection that is formed on the female locking member 700. In even further embodiments, the female locking means 643 may include structures that using magnetic forces, spring forces, require partial rotation, or require full rotation forces or a combination of these forces.

FIGS. 2, 13-46a depict various views of the female terminal 800. The female terminal 800 includes: (i) a female terminal body 810 and (ii) a female terminal connection plate 816. The connection plate 816 is directly connected to the female terminal body 810 and is configured to receive an extent of a structure (e.g., wire 890, as shown in FIG. 2) that connects the female terminal 800 to a structure (e.g., a radiator fan) outside of the connector system 100. The wire 890 is typically welded to the top connection plate 816 (shown in FIG. 2). However, other methods (e.g., forming the wire 890 as a part of the connection plate 816) of connecting the wire 890 to the connection plate 816 is contemplated by this disclosure.

The female terminal body 810 has a tubular configuration and is comprised of an arrangement of female terminal side walls 812a-812d that are coupled to one another to form a substantially rectangular shape. Specifically, one female terminal side wall 812a of the arrangement of female terminal side walls 812a-812d is: (i) substantially parallel with another one female terminal side wall 812c of the arrangement of female terminal side walls 812a-812d and (ii) substantially perpendicular to two female terminal side wall 812b, 812d of the arrangement of female terminal side walls 812a-812d. The female terminal body 810 defines a female terminal receiver 814. The female terminal receiver 814 is designed and configured to be coupled, both electrically and mechanically, to an extent of the male terminal 470, when the male terminal 470 is inserted into the female terminal receiver 814.

The female terminal 800 is typically formed for a single piece of material (e.g., metal). Therefore, the female terminal 800 is a one-piece female terminal 800 and has integrally formed features. In particular, the connection plate 816 is integrally formed with female terminal body 810 and specifically is integrally formed with the one female terminal side wall 812c. To integrally form these features, the female terminal 800 is typically formed using a die cutting process. However, it should be understood that other types of forming the female terminal 800 may be utilized, such as casting or using an additive manufacturing process (e.g., 3D printing). In other embodiments, the features of the female terminal 800 may not be formed from one-piece or be integrally formed, but instead formed from separate pieces that are welded together.

FIGS. 13-29 show the positioning and the coupling of the female terminal 800 within the female housing 620. Coupling the female terminal 800 within the female housing 620 occurs across multiple steps or stages. The first step in this process starts with securing the female terminal 800 within the female housing 620 using a female securing means 647. The securing means 239 in this exemplary embodiment includes a female securing arm 648. A first insertion force, $F_I$, causes the securing arms 648 to interact with a forwardmost extent 818 of the female terminal 800. This interact will cause the securing arms 648 to elastically deform outward and towards the side walls 642b, 642d. Specifically, the securing arms 648 will elastically deform into a securing arm gap 650. Positioning the securing arms 648 within the securing arm gap 650 will allow the female terminal 800 to be inserted into the female housing 620. It should be understood that the assembler must apply sufficient amount of insertion force, $F_I$, to cause the securing arms 648 to elastically deform. Without apply this sufficient amount of insertion force, $F_I$, the assembler will not be able to cause the securing arms 648 to elastically deform; thus, will not be able to position the female terminal 800 within the female housing 620. It further should be understood that the length of the securing arm 648, the thickness of the securing arm 648, and the material of the securing arm 648 will alter the amount of insertion force, $F_I$, that is necessary to couple the female terminal 800 to the female housing 620.

The next step in the process of coupling of the female terminal 800 within the female housing 620 occurs when the assembler applies a second insertion force, $F_I$, on the female terminal 800 to cause: (i) the forwardmost extent 818 of the female terminal 800 to be positioned against the rearmost extent 654 of the internal segment 651, (ii) the rearmost extent 820 of the female terminal 800 to be positioned against the securing arms 648. At this point, the securing arms 648 can return to their original or non-deformed state due to the fact the securing arm 648 can fit into a behind the rearmost extent 654 of the female terminal 800. The return of the securing arm 648 may cause an audible sound (e.g., click) when it moves from the deformed state to the non-deformed state. This audible sound will inform the assembler that the female terminal 800 is properly seated within the female housing 620; thus meeting industry standards and/or requirements (e.g., USCAR). Also, as shown in FIGS. 15-26, the female housing 620 can be properly seated within the female housing 620 while the female locking member 700 is only connected to the first locking member projection 644a. This is because the female locking member 700 does not extend upward past the inner surface 656 of the side wall 642c (see FIG. 20).

The final set in the process of coupling the female terminal 800 within the female housing 620 occurs when the assembler applies a locking force, $F_L$, on the female locking member 700. The application of the locking force, $F_L$, on the female locking member 700 will cause a first extent 710 of the male locking member 700 to elastically deform outward in order to overcome the female locking member projections 644a, 644b. Once the male locking member 700 has overcome the female locking member projections 644a, 644b, the first extent 710 of the female locking member 700 will return to its original or non-deformed state. The return of the first extent 710 of the female locking member 700 may cause an audible sound (e.g., click) when it moves from the deformed state to the non-deformed state. This audible sound will inform the assembler that the female locking member 700 is properly connected to the male housing 620; thus meeting industry standards and/or requirements (e.g., USCAR). Additionally, when the female locking member 700 is properly connected to the male housing 620, a secondary locking feature 712 is positioned behind the rearmost extent 820 of the female terminal 800. The securing arms 648 and the secondary locking feature 712 ensures that the female terminal 800 cannot be removed from the female housing 620 without damaging the housing 620. At this point, the female terminal 800 is properly coupled to male housing 620.

Without being able to disconnect the female housing 620 from the female terminal assembly 700, it would be difficult for the customer to couple (e.g., weld) the wire 890 to the female terminal 800 without potentially compromising the integrity of the male housing 620. Nevertheless, there are alternative embodiments that allow void the need to be able to disassemble the female housing 620. For example, the wire 890 or a stud (not shown) may be attached during the process of manufacturing the female connector assembly 600; thus, the assembler does not have to weld the female terminal 800 to another structure (e.g., wire). In this example, the wire 890 may be coupled to the female terminal 800 and then the housing 620 may be formed around the female terminal 800 using an injection molding or additive manufacturing process. In another example, the female housing 620 may be formed from multiple parts to enable the disassembly of the female housing 620. In other examples, the female housing 620 may have a different configuration if a different method (e.g., push in attachment method) of connecting the wire 890 to the female terminal 800 is utilized. The following disclosure describes one embodiment of how female terminal 800 may be inserted into and retained within the female housing 620. It should be understood that other structures, such as magnets, springs, alternative configurations of projections, alternative configurations of receivers, or a combination of these structures may be utilized. Examples of such configurations, as disclosed in connections within the other embodiments contained within this application.

FIGS. 30-46a show the coupling of the male connector assembly 200 with the female connector assembly 600. Specifically, FIGS. 30-33 show the male connector assembly 200 disengaged from the female connector assembly 600. In other words, the connector assemblies 200, 600 are not electrically or mechanically coupled to one another. In this configuration or position, the connector assemblies 200, 600 are in a separated or disengaged position, $P_D$. In the disengaged state, $P_D$, devices that the connector system 100 is coupled thereto are typically not in operation. From the disengaged state, $P_D$, the assembler applies a coupling force, $F_C$, on the male connector assembly 200 to force the male connector assembly 200 towards the female connector assembly 600. This force cause the connector assemblies 200, 600 to move into an intermediate position, $P_I$. In particular, this intermediate position, $P_I$, is shown in FIGS. 33-35 and 39-41. In this intermediate position, $P_I$: (i) the side walls 228a, 228c of the front male housing 224 are in contact with the side walls 642b, 642d of female housing 620 and (ii) the contact arms 494a-949h are placed in contact with the internal segment 651 of the female housing 620. However, in this intermediate position, $P_I$, the male connector assembly 200 is not mechanically or electrically coupled to the female connector assembly 600.

From the intermediate position, $P_I$, the assembler continues to apply a coupling force, $F_C$, on the male connector assembly 200 to force the male connector assembly 200 towards the female connector assembly 600. This force causes the connector assemblies 200, 600 to move into a connected position, $P_C$. In particular, this connected position, $P_C$, is shown in FIGS. 37-38 and 43-46a. Causing the connector assemblies 200, 600 to move from the intermediate position, $P_I$, to connected position, $P_C$, compresses the contact arms 494a-494h towards the center 490 of the male terminal 470 (compare FIGS. 34-35 with FIGS. 37-38). This inward compression of the contact arms 494a-494h in turn causes the spring arms 452a-452h to deform inward towards the center 490 of the male terminal 470. As discussed above, the spring member 440 resists this inward compression and applies an outwardly directed spring biasing force on the contact arms 494a-494h. In this connected position, $P_C$, the male connector assembly 200 is mechanically and electrically coupled to the female connector assembly 600.

Figure 47:
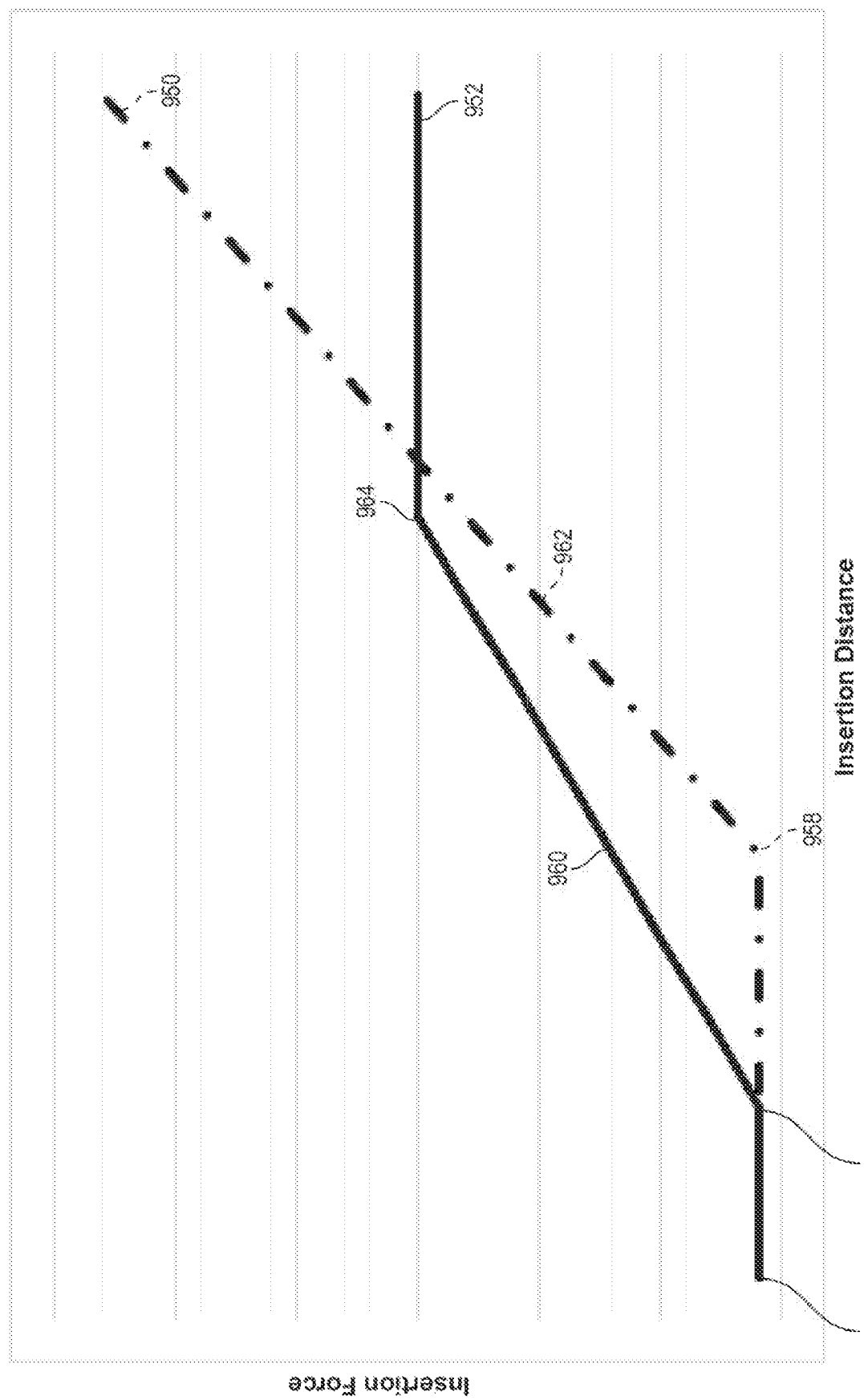
FIG. 47 is a graph showing the insertion forces associated with the connector assemblies disclosed herein and the connector assemblies disclosed within PCT/US2018/019787.
Figure 48:
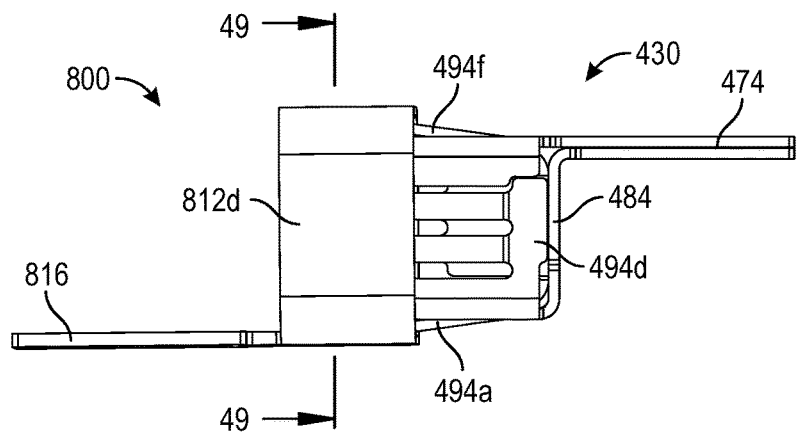
FIG. 48 is a left side view of the male terminal assembly and the female terminal shown in FIG. 2, wherein the male terminal assembly is connected to the female terminal.
Figure 49:
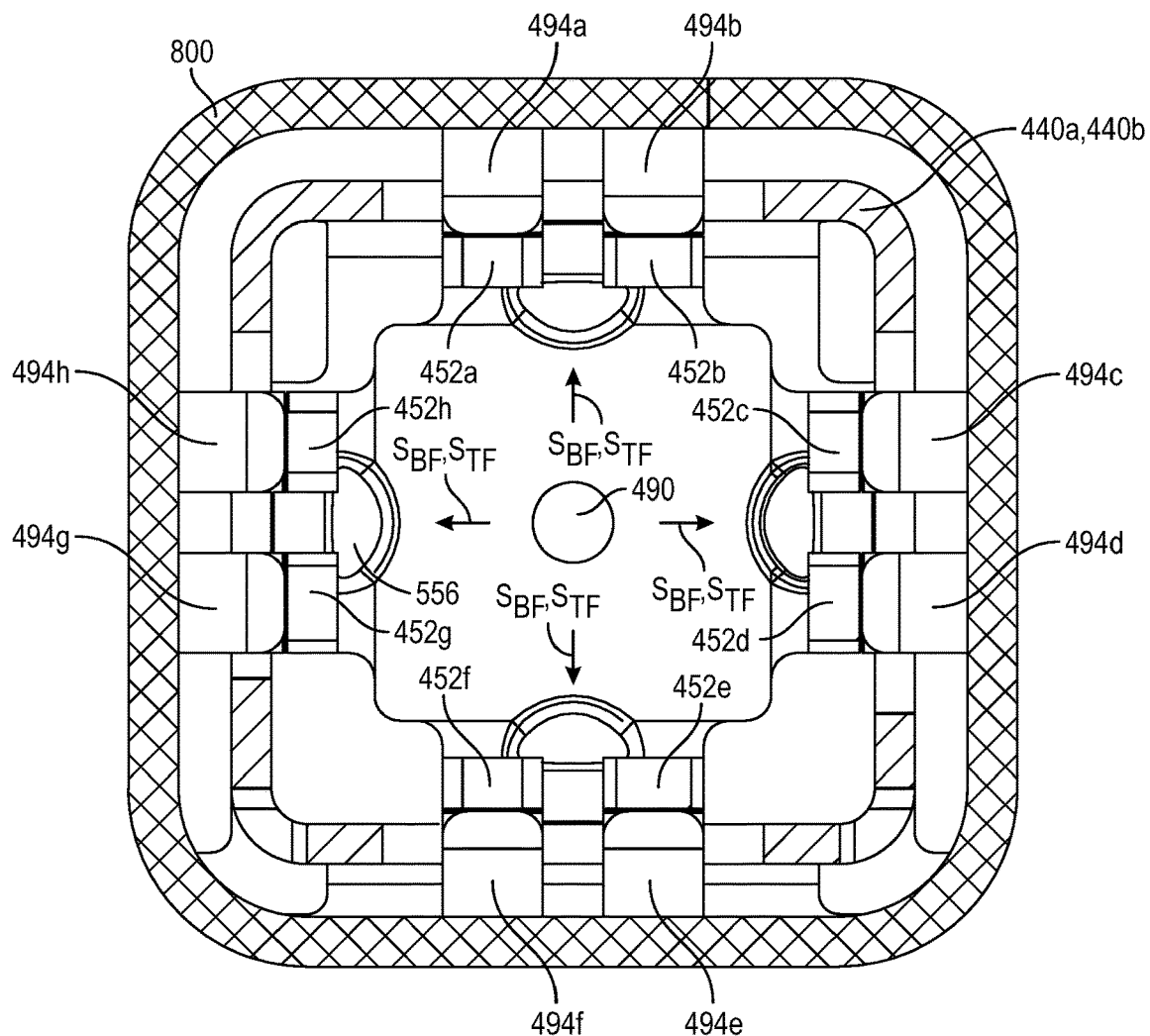
FIG. 49 is a cross-section view of the terminal assembly shown in FIG. 48, taken along the 49-49 line of FIG. 48.
Figure 50:
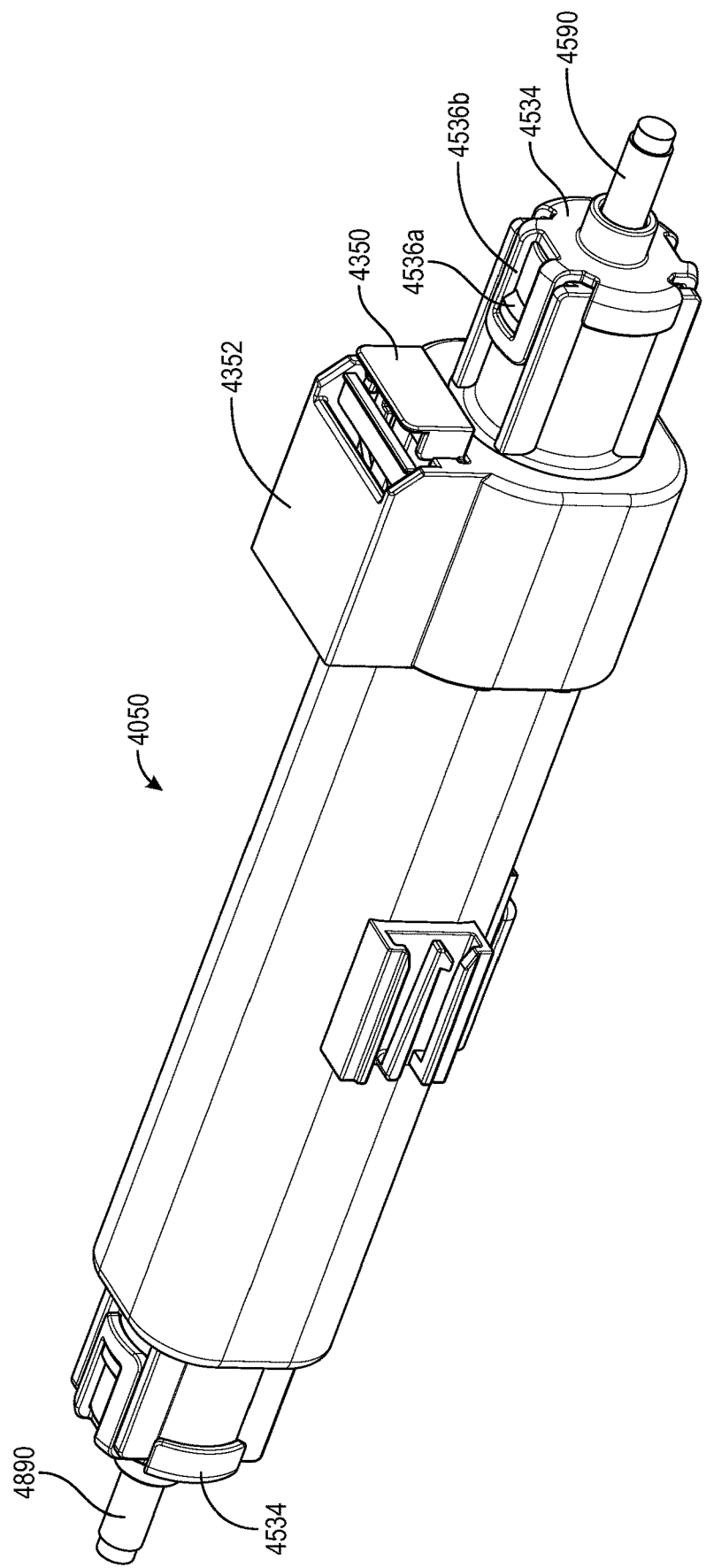
FIG. 50 is a isometric view of an in-line fuse application that includes a second embodiment of a connector system having a male connector assembly and a female connector assembly.

This configuration of the male connector assembly 200 and the female connector assembly 600 is beneficial over the connectors described in connection in PCT/US2018/019787 for the reasons described in the graph shown in FIG. 47. Specifically, the insertion force is graphed on the vertical axis and insertion distance is graphed on the horizontal axis. Also, the connector that is described in this application is shown by the solid line 950, while the connector that is described in PCT/US2018/019787 is shown in the dotted line 952. Lines for both connectors are equal between points 954 and 956 because these lines represent the connector moving from the disconnected position, $P_D$, to the intermediate position, $P_I$. At point 956, the insertion force for the connector disclosed herein starts to rise because the contact arms 494a-494h are being forced inward by internal segment 651. The insertion force for the connector disclosed within PCT/US2018/019787 does not start to rise at point 956 because the alternative configuration of the contact arms requires that the assembler insert the connecter a further distance before the contact arms come into contact with any structure contained within the connector. Therefore, at point 958, the insertion force for the connector disclosed within PCT/US2018/019787 finally starts to rise because the contact arms have come into contact with an internal structure of the connector. Based on this point alone, the connector system 100 described in this application is desirable over the connector system described within PCT/US2018/019787 because the distance the connector assemblies 200, 600 have to move before they move from the disconnected position, $P_D$, to the intermediate position, $P_I$, is less. In turn, this means that the connector system 100 described herein can be installed within a smaller space because it does not need this additional distance to form a connection.

Next, the lines 960 and 962 describe the insertion force that is required to move the connector from the intermediate position, $P_I$, towards the connected position, $P_C$. In particular, line 960 is associated with the connector described herein, while line 962 is the connector described within PCT/US2018/019787. The slope of the line 960 is less than the slope of the line 962. This means a more gradual amount of force is required by the connector assembles 200, 600 described herein in comparison to the connector assembly described within PCT/US2018/019787. This is because the contact arms 494a-494h described in this application are sliding along the polymer material surface of the internal segment 651, while the contact arms described within PCT/US2018/019787 are sliding along a metal surface. This is another benefit of the connector system 100 described herein over the connector system described within PCT/US2018/019787. In other words, the connector system 100 described herein can utilize a spring member 440 that has a larger biasing force while staying within the USCAR 25 specification in comparison to the connector system described within PCT/US2018/019787. This is beneficial because the use of a spring member that has a larger biasing force will ensure that the connector system 100 remains properly connected while receiving larger amounts of power.

Finally, after the contact arms 494a-494h described herein have cleared the rearmost edge 654 of the internal segment 651, the insertion force for the connection system 100 described herein levels off after point 964. This is because the contact arms 494a-494h, at this point, have been fully compressed and thus very little, if any, force is required to move the male terminal assembly 400 from the rearmost edge 654 of the internal segment 651 to the connected position. The leveling off of the insertion force at this point almost feels like the connector system 100 is pulling the male connector assembly 200 towards the female connector assembly 600. In contrast, the insertion force required for the connector system described within PCT/US2018/019787 only increases. This is because the contact arms described within PCT/US2018/019787 are not fully compressed until the male connector is coupled to the female connector. This is another benefit for why the connector system described herein is beneficial over the connector system described within PCT/US2018/019787.

FIGS. 39-46a show the CPA assembly, which details how the extent of the male CPA component 352 interacts with the extent of the female CPA component 750 when the male connector assembly 200 moves from the intermediate position, $P_I$, to the connected position, $P_C$. The CPA connector assembly 350, 352, 750 allow the connector system 100 to meet certain industry standards and/or requirements, such as USCAR 12, USCAR-25, USCAR-2. Specifically, the elastically deformable CPA structure 354 elastically deforms downward, towards the wire 590, due to a forward wall 752 of the female CPA component 750. Once the connector system 100 is in the connected position, $P_C$, (see FIGS. 42-44) a lateral bar 358 of the deformable CPA structure 354 is positioned passed the forward wall 752 of the female CPA component 750. This allows the deformable CPA structure 354 to return to its original or non-deformed state; thus, permitting the lateral bar 358 to be positioned within and adjacent to the innermost edge 754 of the forward wall 752. Finally, in the connected position, $P_C$, the assembler applies an insertion force, $F_I$, on the CPA component 350. This insertion force, $F_I$, causes a forward projection 360 of the CPA component 350 to deform downward, towards the wire 590, in order to fit under the forward wall 752 of the female CPA component 750. Once the insertion force, $F_I$, is sufficient to cause the forward projection 360 to be positioned past the lateral bar 358, the forward projection 360 can return to its original or non-deformed state. The return of the forward projection 360 may cause an audible sound (e.g., click) when it moves from the deformed state to the non-deformed state. This audible sound will inform the assembler that the CPA component 350 is properly seated; thus meeting industry standards and/or requirements (e.g., USCAR). The assembler can then apply a tug on the connector system 100 to ensure that the connector system 100 is properly coupled together. The assembler will apply similar forces in the reverse direction to disassemble the connector system 100.

It should be understood that the configuration of the CPA component 350, male CPA component 352 and the female CPA component 750 may help prevent the user from inadvertently connecting the male connector assembly 200 at an incorrect angle of rotation (e.g., 180 degrees). It should also be understood that the configuration of the CPA component 350, male CPA component 352, and the female CPA component 750 may include a different arrangement, combination, or number of components. For example, the combination of CPA component 350, male CPA component 352, and the female CPA component 750 may include structures that couple the CPA component 350 to an extent of the male CPA component 352 and the female CPA component 750 using magnetic forces, spring forces, require partial rotation, or require full rotation forces or a combination of these forces.

FIGS. 1, 36-38, 42-46a, and 48-49 and discussed within PCT/US2019/036010, depict various views of the first embodiment of the male terminal assembly 430 within the female terminal 800. As shown in the Figures, the combination of outer surfaces of the contact arms 494a-494h form a rectangle that has a width/height that is slightly larger (e.g., between 0.1% and 15%) than the width/height of the rectangle that is associated with the female terminal receiver 800. When the slightly larger male terminal assembly 430 is inserted into the slightly smaller female terminal receiver 800, the outer surface of the contact arms 494a-494h are forced towards the center 490 of the male terminal assembly 430. Because the outer surface of the contact arms 494a-494h are forced towards the center 490 of the male terminal assembly 430, the free ends 446 of the spring member 440a, 440b are also forced towards the center 490 of the male terminal assembly 430. The spring 440a, 440b resists this inward displacement by providing a spring biasing force, $S_{BF}$, (as depicted by the arrows labeled "$S_{BF}$" in FIG. 49). This spring biasing force, $S_{BF}$, is generally directed outward against the free ends 488 of the male terminal 470. In other words, this spring biasing force, $S_{BF}$, provides a wedging or shimmering effect against the contact arms 494a-494h thereby holding the outer surfaces of the contact arms 494a-494h in engagement with the female terminal 800.

The Figures show that the connector system 100 provides a connector that is 360° compliant, which meets the certain car or automotive specifications. As shown in this embodiment, the contact arms 494a-494h are symmetrical and evenly spaced. The connector system 100 is 360° compliant because the outer surface of the contact arms 494a-494h are in contact with each side wall 482a-482d of the female terminal 800 and the spring biasing force, $S_{BF}$, applies out a force that is generally directed outward from the center 490 in all four primary directions (e.g., up, down, left, and right). The 360° compliance attribute of the connector system 100 aids in maintaining mechanical and electrical connection under strenuous mechanical conditions, e.g., vibration. In a traditional blade or fork-shaped connectors, i.e., connection on only two opposing sides, vibration may develop a harmonic resonance that causes the connector to oscillate with greater amplitude at specific frequencies. For example, subjecting a fork-shaped connector to harmonic resonance may cause the fork-shaped connector to open. Opening of the fork-shaped connector during electrical conduction is undesirable because momentary mechanical separation of the fork-shaped connector from an associated terminal may result in electrical arcing. Arcing may have significant negative effects on the terminal as well as the entire electrical system of which the terminal is a component. However, the 360° compliance feature of the present disclosure may prevent catastrophic failures caused by strong vibration and electrical arcing.

The male terminal 470, including the contact arms 494a-494h, may be formed from a first material such as copper, a highly-conductive copper alloy (e.g., C151 or C110), aluminum, and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% of IACS. In certain operating environments or technical applications, it may be preferable to select C151 because it has anti-corrosive properties desirable for high-stress and/or harsh weather applications. The first material for the male terminal 470 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius). The spring member 400a, 400b may be formed from a second material such as spring steel, stainless steel (e.g., 301SS, ¼ hard), and/or another suitable material having greater stiffness (e.g., as measured by Young's modulus) and resilience than the first material of the male terminal 470. The second material preferably has an electrical conductivity that is less than the electrical conductivity of the first material. The second material also has a Young's modulus that may be approximately 193 GPa at room temperature and a coefficient of terminal expansion (CTE) of approximately 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 400a, 400b is greater than the Young's modulus and the CTE of the male terminal 470. Thus, when the male terminal 470 is used in a high power application that subjects the connector system 100 to repeated thermal cycling with elevated temperatures (e.g., approximately 150° Celsius) then: (i) the male terminal 470 become malleable and loses some mechanical resilience, i.e., the copper material in the male terminal 470 softens and (ii) the spring member 400a, 400b does not become as malleable or lose as much mechanical stiffness in comparison to the male terminal 470. Thus, when utilizing a spring member 440a, 440b that is mechanically cold forced into shape (e.g., utilizing a die forming process) and the spring member 440a, 440b is subjected to elevated temperatures, the spring member 440a, 440b will attempt to at least return to its uncompressed state, which occurs prior to insertion of the male terminals assembly 430 within the female terminal 800, and preferably to its original flat state, which occurs prior to the formation of the spring member 440a, 440b. In doing so, the spring member 400a, 400b will apply a generally outward directed thermal spring force, $S_{TF}$, (as depicted by the arrows labeled "$S_{TF}$" in FIG. 49) on the free ends 488 of the male terminal 470. This thermal spring force, $S_{TF}$, is dependent upon local temperature conditions, including high and/or low temperatures, in the environment where the system 100 is installed. Accordingly, the combination of the spring biasing force, $S_{BF}$, and the thermal spring force, $S_{TF}$, provides a resultant biasing force, $S_{RBF}$, that ensures that the outer surface of the contact arms 494a-494h are forced into contact with the inner surface of the female terminal 800 when the male terminal 470 is inserted into the female terminal 800 and during operation of the system 100 to ensure an electrical and mechanical connection. Additionally, with repeated thermal cycling events, the male terminal assembly 430 will develop an increase in the outwardly directed resultant spring forces, $S_{RBF}$, that are applied to the female terminal 800 during repeated operation of the system 100.

FIGS. 50-62 provide exemplary applications of the connector system 100 that can be used in a variety of vehicles and with a variety of vehicle components. In addition to these applications also include, but are not limited to, the following vehicle components: alternator, starter solenoid, motor (e.g., traction motor), starter generator, power electronics (e.g., inverter, power supply, battery charger), jumper cables, connections required for power cables, fuses, buss bars, grounds, relays, on board chargers, charging ports, cooling systems, high-power application, a high-current application, high-voltage applications, or any combination of these applications. Beyond these specific application, the connector system may generally be using within an airplane, the motor vehicle, a military vehicle (e.g., tank, personnel carrier, heavy-duty truck, and troop transporter), a bus, a locomotive, a tractor, a boat, a submarine, or in another other application where connector assemblies are essential to meet industry standards and production requirements.

FIGS. 50-53 provide a second application 4050 for the electrical connector system with an internal spring member 1440b. The second or in-line fuse application 4050 is designed to be a complete in-line solution for providing an in line fuse. The in-line fuse 4050 includes: (i) a fuse 4052, (ii) two terminal connector systems 4054 that each have a male terminal assembly 4430 and a female terminal 4800, and (iii) exterior housing 4056. The terminal connector systems 4054 include a male terminal assembly 4430 and a female terminal 4800. General details about the design and functionality of the male terminal assembly 4430 and the female terminal 4800 are described above in connection with FIGS. 1-49, but additional detail about these specific terminal assemblies 4430, 4800 are described in greater detail in PCT Patent Application No. PCT/US2019/036070 at FIGS. 69-78. The in-line fuse 4050 also includes: (i) fuse holders 4058 that are configured to receive secure the fuse 4050 and the terminal connector systems 4054 within the external housing 4056, (ii) a CPA 4350, (iii) a cable strain relief 4530.

FIGS. 54-59 and 61 provide third application 4060 for the electrical connector system with an internal spring member 1440b. The third or DC-DC power converter application 4060 is designed to be a complete solution for coupling the coupling a DC-DC power converter 4062 to another device (e.g., power source or power sink). The DC-DC power converter 4060 includes: (i) a DC-DC power converter 4062, and (ii) at least one terminal connector systems 4064 that have a male connector assembly 4200 and a female terminal 4600. General details about the design and functionality of the male connector assembly 4200 and the female terminal 4600 are described above in connection with FIGS. 1-49. Additional details about the male connector assembly 4200 and a female terminal 4600 shown in FIGS. 55, 57, 58 and 61 are described in greater detail in PCT Patent Application No. PCT/US2019/036070 at FIGS. 50-78. Further, additional detail about the terminal assemblies 4430, 4800 are described in greater detail in PCT Patent Application No. PCT/US2019/036010 at FIGS. 49-58. It should be understood that the terminal connection plates 4066 are interchangeable to meet the specific design requirements. For example, the first deign shown in FIG. 57 includes two separate terminal connector systems 4064, while FIG. 58 includes three separate terminal connector systems 4064, and FIG. 59 includes one terminal connector system 4064. Specifically, one terminal connector system 4064 may be used for a ground, a second terminal connector system may be used for 24 volts, and a third connector system may be used for 48 volts. Alternatively, each terminal connector system 4064 may have the same voltage and are simply powering different devices.

Figure 60:
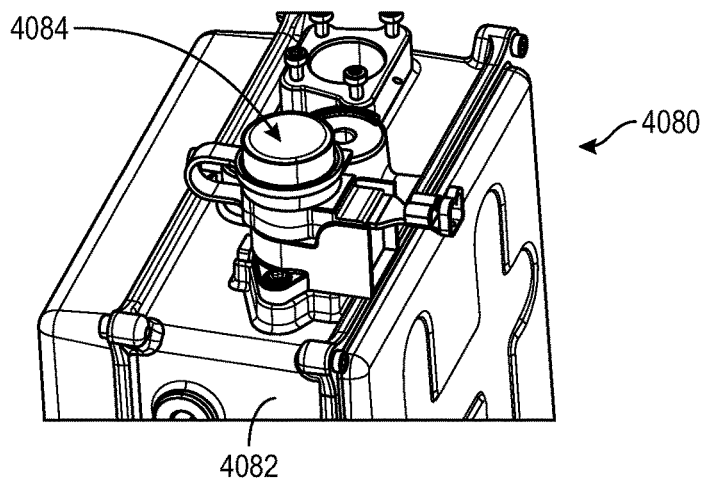
FIG. 60 is a isometric view of an isometric view of a battery pack application that includes a connector system having a male connector assembly and a female connector assembly.
Figure 61:
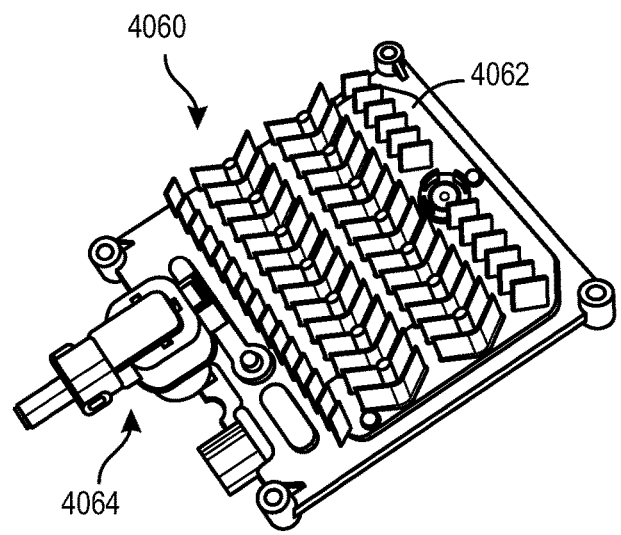
FIG. 61 is a isometric view of an isometric view of a DC-DC converter application that includes a connector system having a male connector assembly and a female connector assembly.

FIG. 60 provide fourth application 4080 for the electrical connector system with an internal spring member 1440b. The fourth or battery pack application 4080 is designed to be a complete solution for coupling the battery pack contained within a vehicle to another device (e.g., power source or power sink). The battery pack 4080 includes: (i) a battery pack 4082, and (ii) a terminal connector systems 4084 that has a male connector assembly 4200 and a female terminal 4600. General details about the design and functionality of the male connector assembly 4200 and the female terminal 4600 are described above in connection with FIGS. 1-49. Additional details about the male connector assembly 4200 and a female terminal 4600 are described in greater detail in PCT Patent Application No. PCT/US2019/036070 at FIGS. 50-78. Further, additional detail about the terminal assemblies 4430, 4800 are described in greater detail in PCT Patent Application No. PCT/US2019/036010 at FIGS. 49-58. In particular, the terminal connector systems 4084 is designed to directly replace the connector 4084 shown on the battery pack 4082 without modification.

Figure 62:
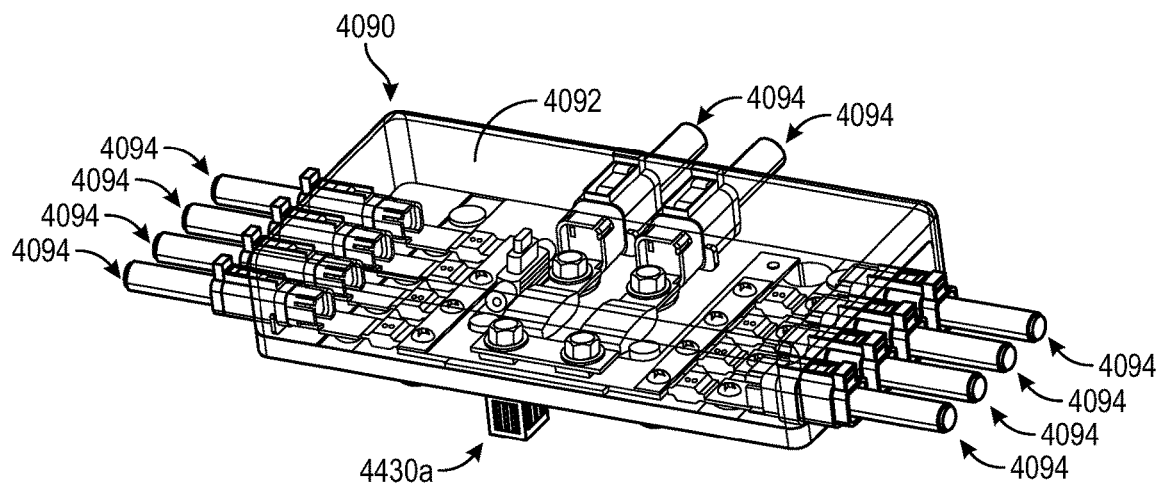
FIG. 62 is an isometric view of an isometric view of a fuse box application that includes a connector system having a male connector assembly and a female connector assembly.

FIG. 62 provide fifth application 4090 for the electrical connector system with an internal spring member 1440b. The fifth or fuse box application 4090 is designed to be a complete solution that can replace a fuse box in a vehicle. The fuse box 4090 includes: (i) a housing 4092, and (ii) at least one terminal connector systems 4094 that has a male connector assembly 4200 and a female terminal 4600. General details about the design and functionality of the male connector assembly 4200 and the female terminal 4600 are described above in connection with FIGS. 1-49. Additional details about the male connector assembly 4200 and a female terminal 4600 are described in greater detail in U.S. Provisional Patent Application No. 62/681,973 and within PCT Patent Application No. PCT/US2019/036070 at FIGS. 1-49. Further, additional details about the terminal assemblies 4430, 4800 are described in greater detail in PCT Patent Application No. PCT/US2019/036010 at FIGS. 49-58. In addition to distributing power using terminal connector systems 4094, this fuse box 4090 also utilizes a male terminal assembly 4430a to receive power from a device (e.g., battery pack). Additional details about this terminal are described in greater detail in PCT Patent Application No. PCT/US2019/036010 at FIGS. 39-48. Generally, it should be understood that the designer may selectively utilize various embodiments of the connector assemblies 4430, 4800 shown in PCT Patent Application No. PCT/US2019/036010 to meet the desired power requirements of the fuse box 4090. For example, the designer may select the connector assembly 4430, 4800 shown in FIGS. 1-38 to meet a 200 amp requirement, while using the connector assembly 4430, 4800 shown in FIGS. 69-78 to meet a 30 amp requirement. The ability to selectively utilize different connector assemblies 4430, 4800 in connection with different devices is beneficial because it saves installation time, space, materials, weight and reduces failures.

Figure 63:
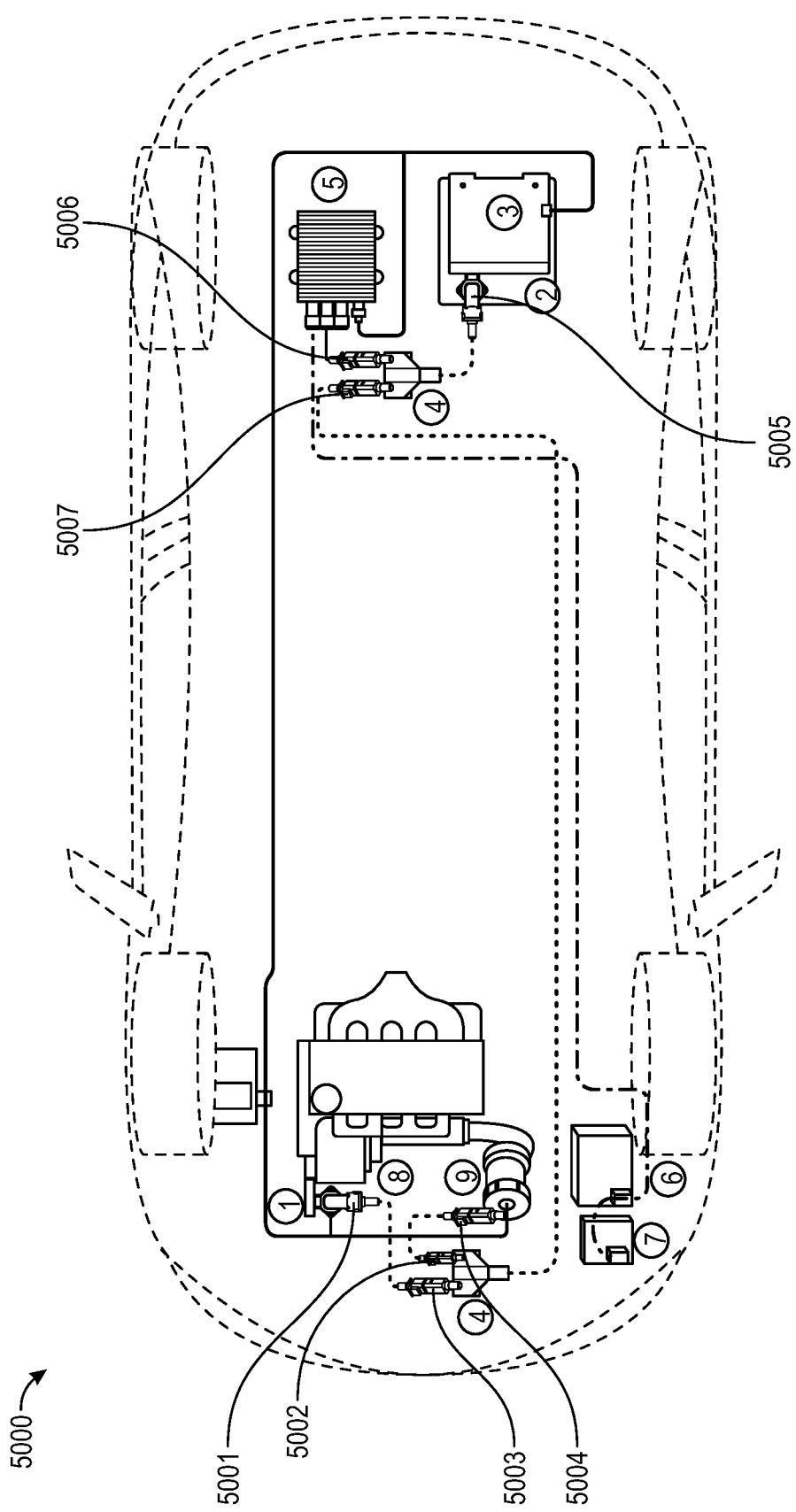
FIG. 63 is a simplified electrical wiring diagram of a motor vehicle that includes multiple connector systems.
Figure 64:
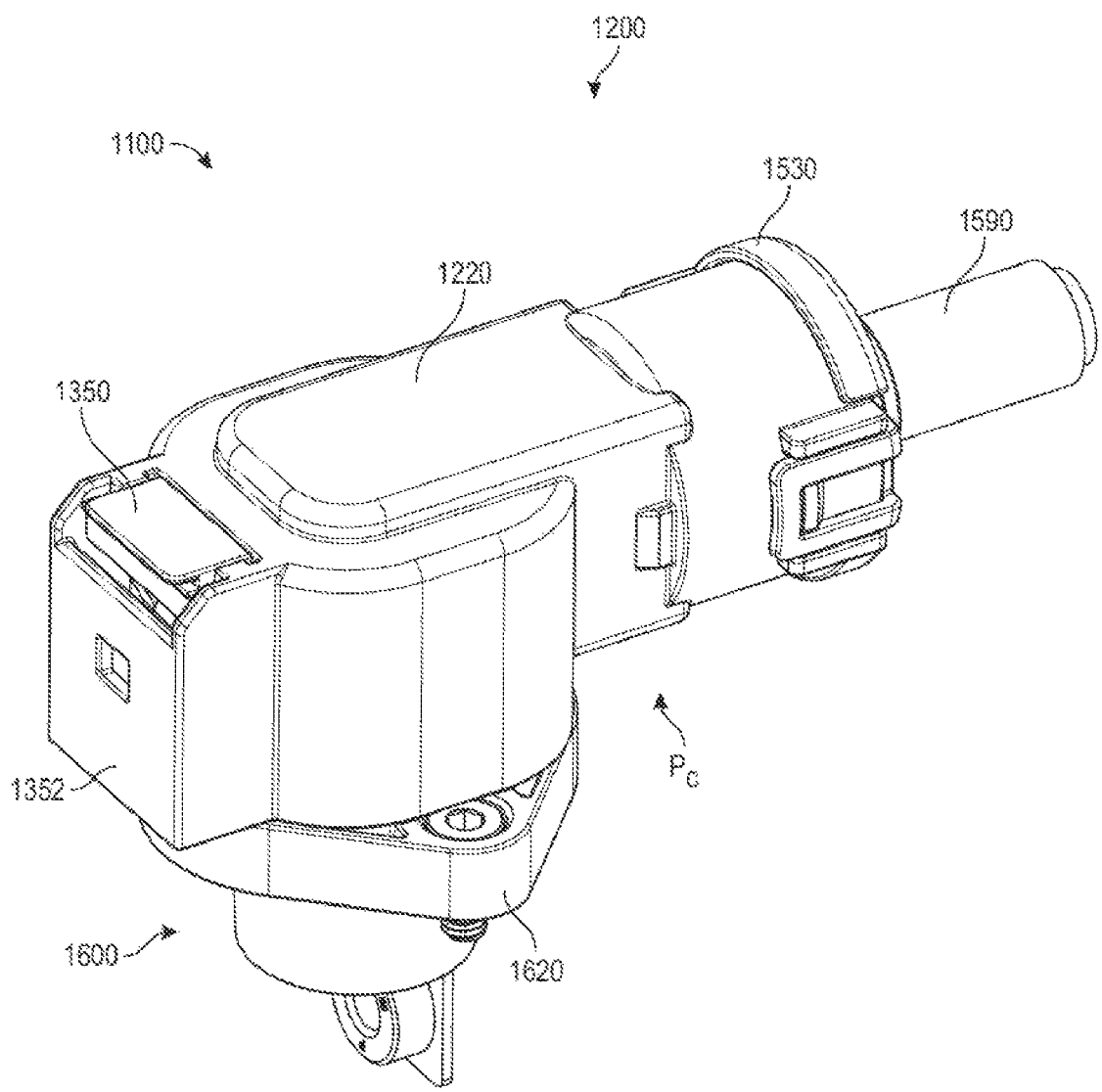
FIG. 64 is an isometric view of a second embodiment of a connector system having a male connector assembly and a female connector assembly.
Figure 65:
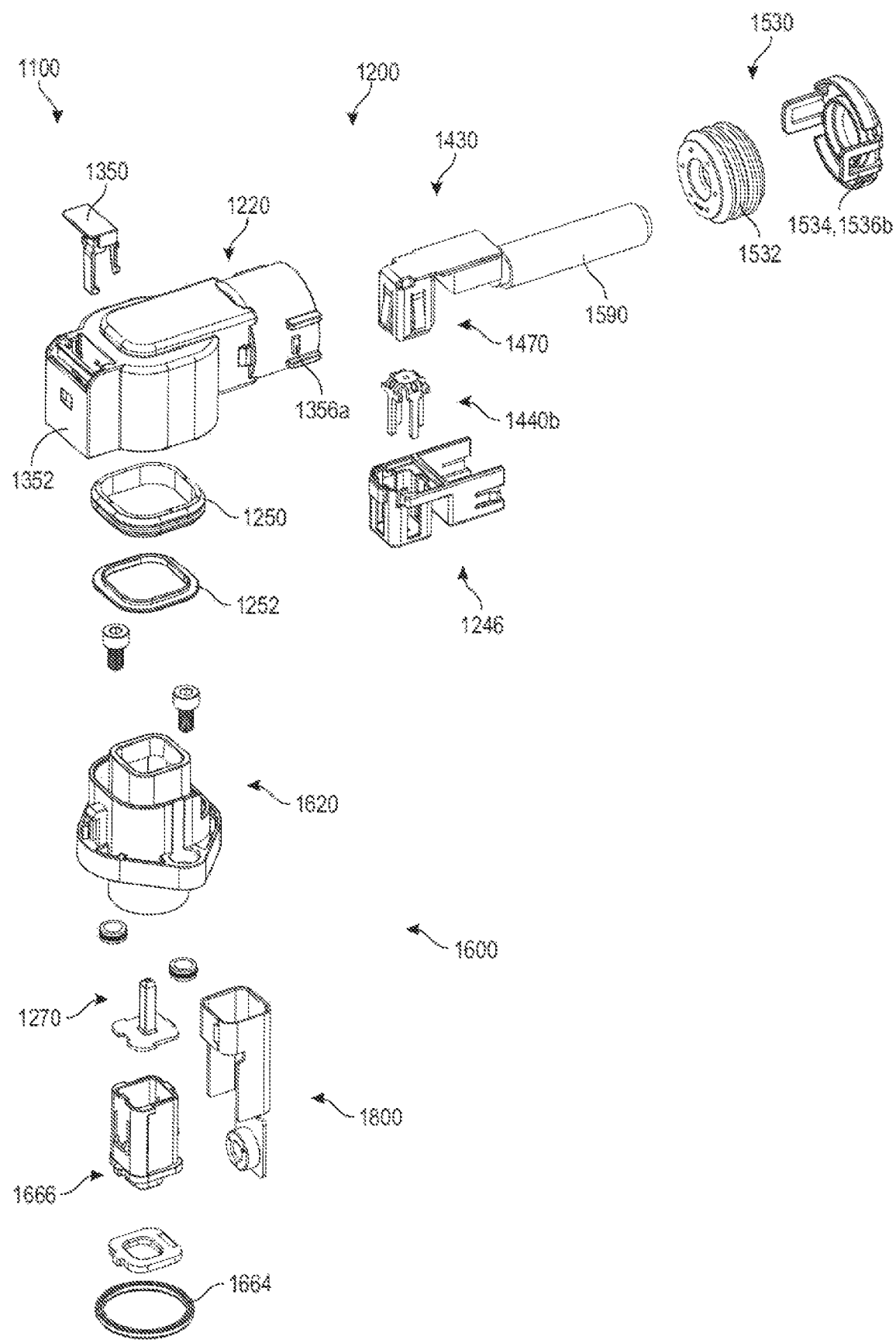
FIG. 65 is an exploded isometric view of the connector system shown in FIG. 64.
Figure 66:
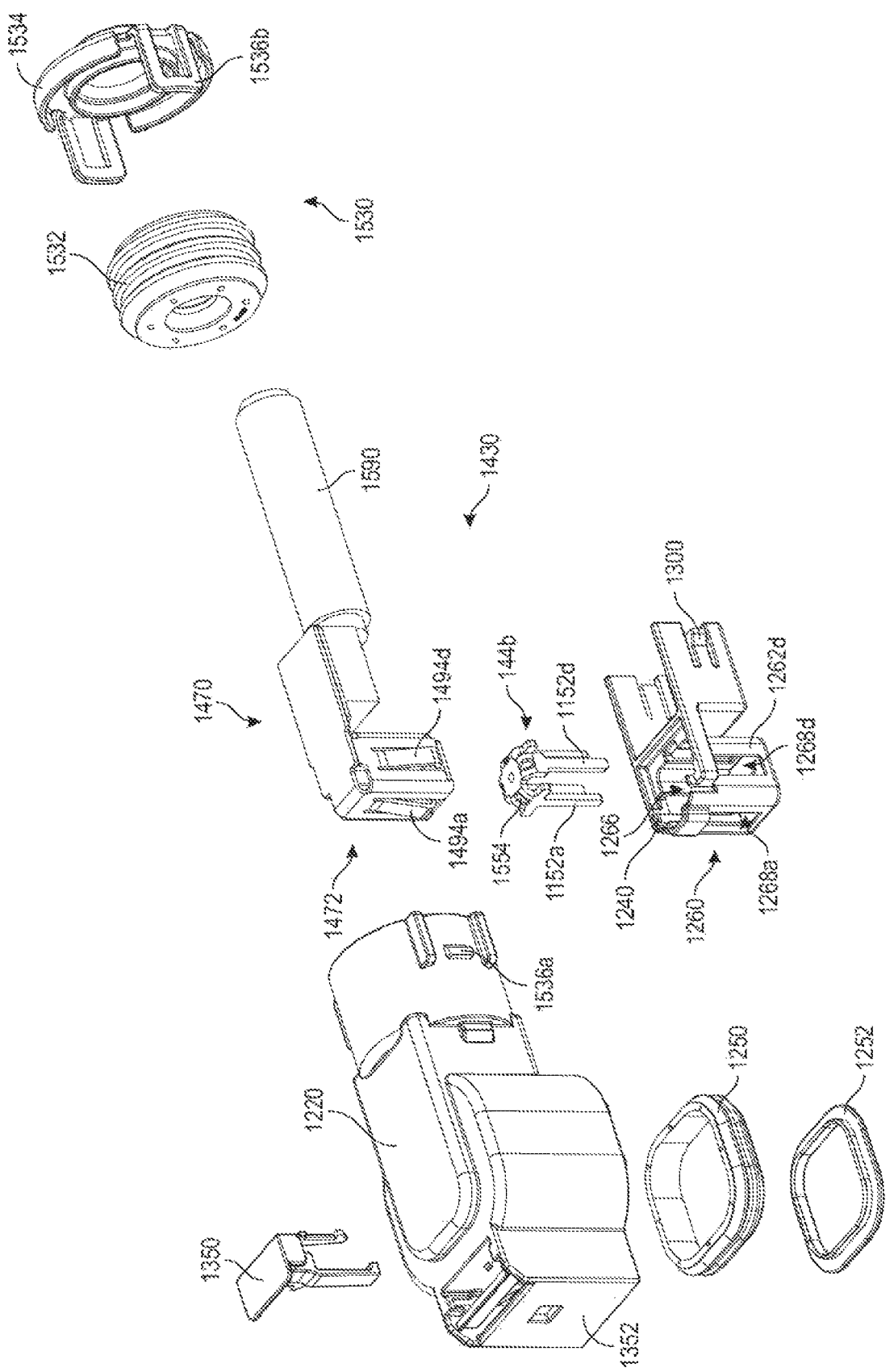
FIG. 66 is an exploded view of the male connector assembly shown in FIG. 65, wherein the male connector assembly has a male housing and a male terminal assembly.
Figure 67:
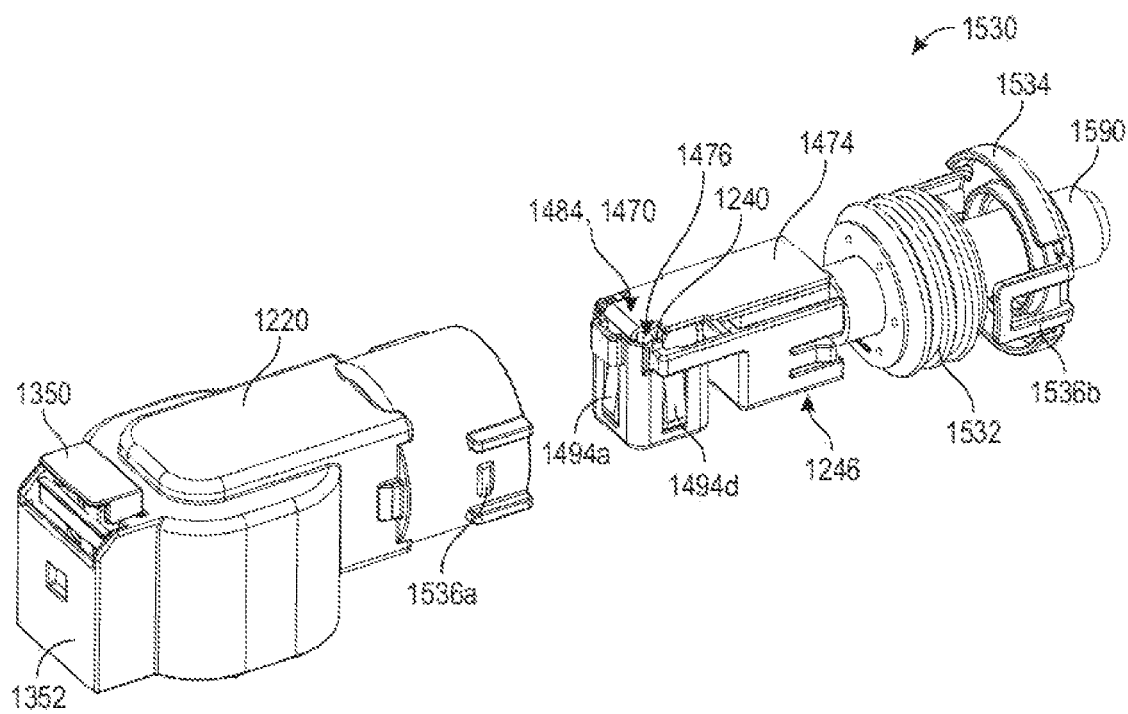
FIG. 67 is a partially exploded view of the male connector assembly shown in FIG. 65, wherein the male terminal retaining member, male terminal assembly, and the cable strain relief assembly are disconnected from the male terminal housing.
Figure 68:
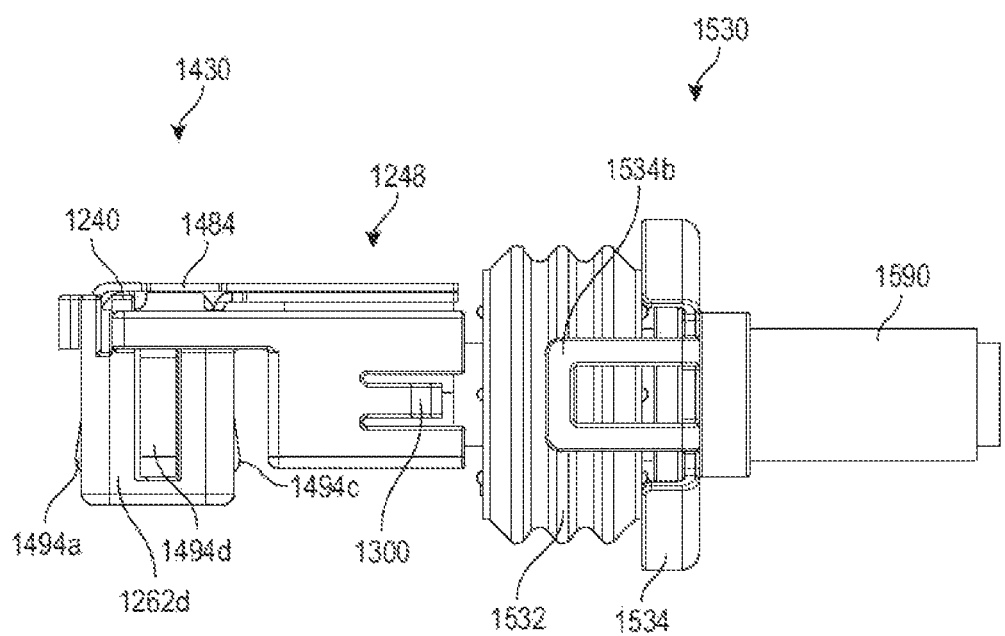
FIG. 68 is a right side view of the male terminal retaining member, male terminal assembly, and the cable strain relief assembly shown in FIG. 67.
Figure 69:
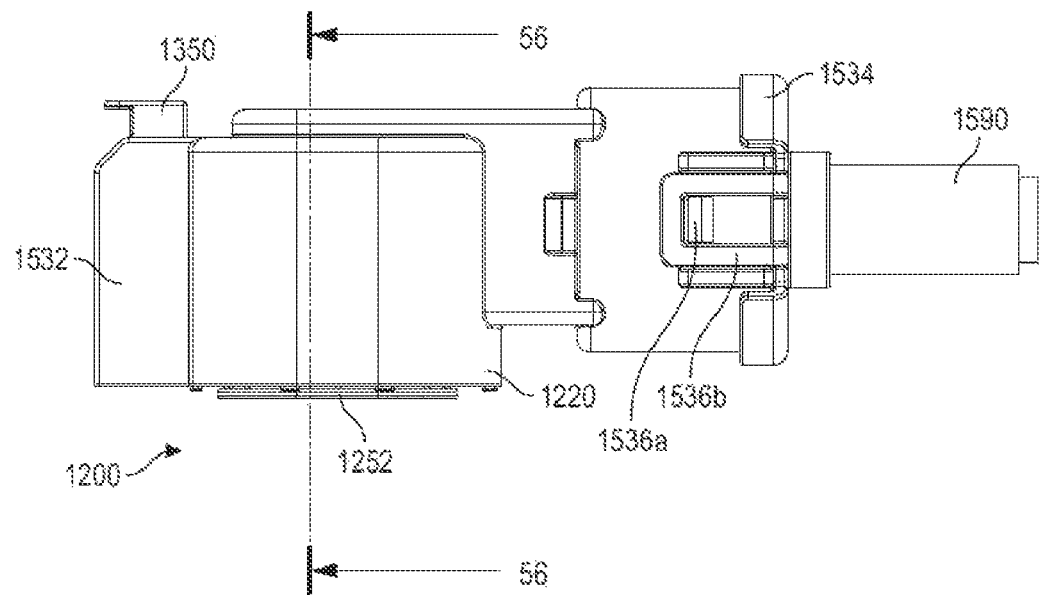
FIG. 69 is a right side view of the male connector assembly shown in FIGS. 64-67.
Figure 70:
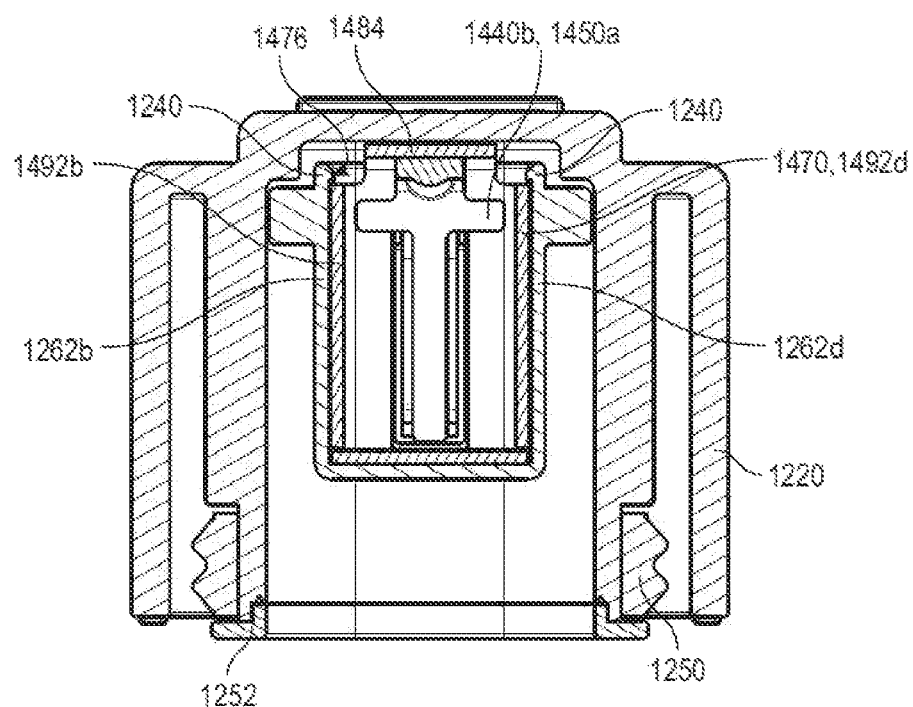
FIG. 70 is a cross-section view of the male connector assembly taken along the 70-70 line shown in FIG. 69.
Figure 71:
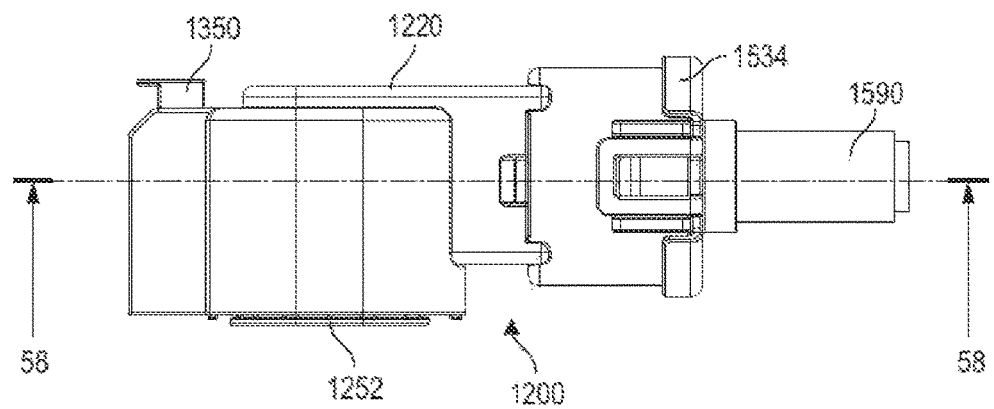
FIG. 71 is a right side view of the male connector assembly shown in FIGS. 64- 67.
Figure 72:
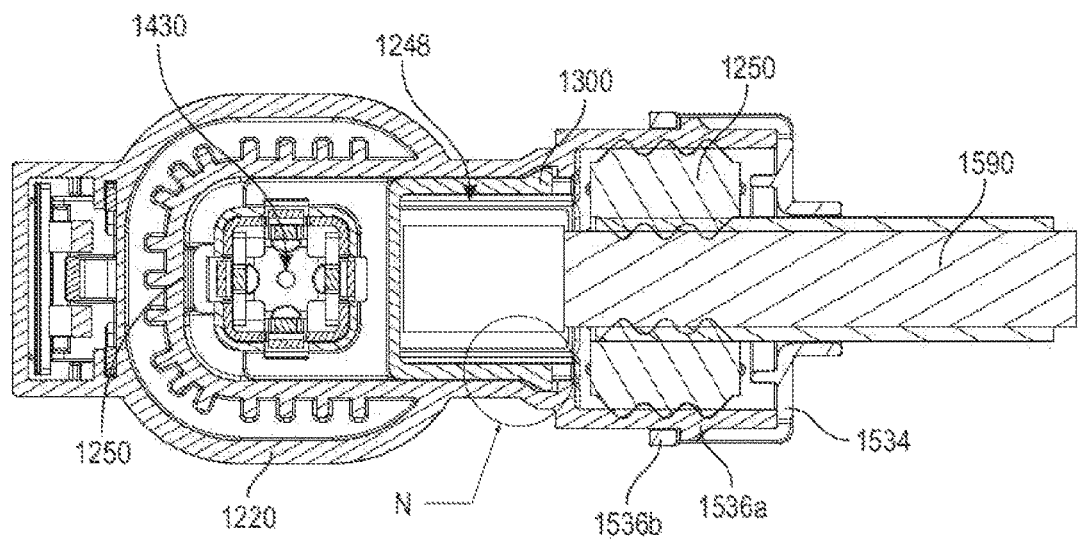
FIG. 72 is a cross-sectional view of the male connector assembly taken along the 72-72 line of FIG. 71.
Figure 73:
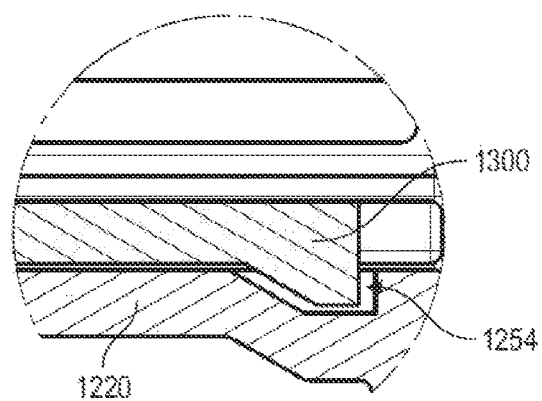
FIG. 73 is a zoomed in view of area N shown in FIG. 72.
Figure 74:
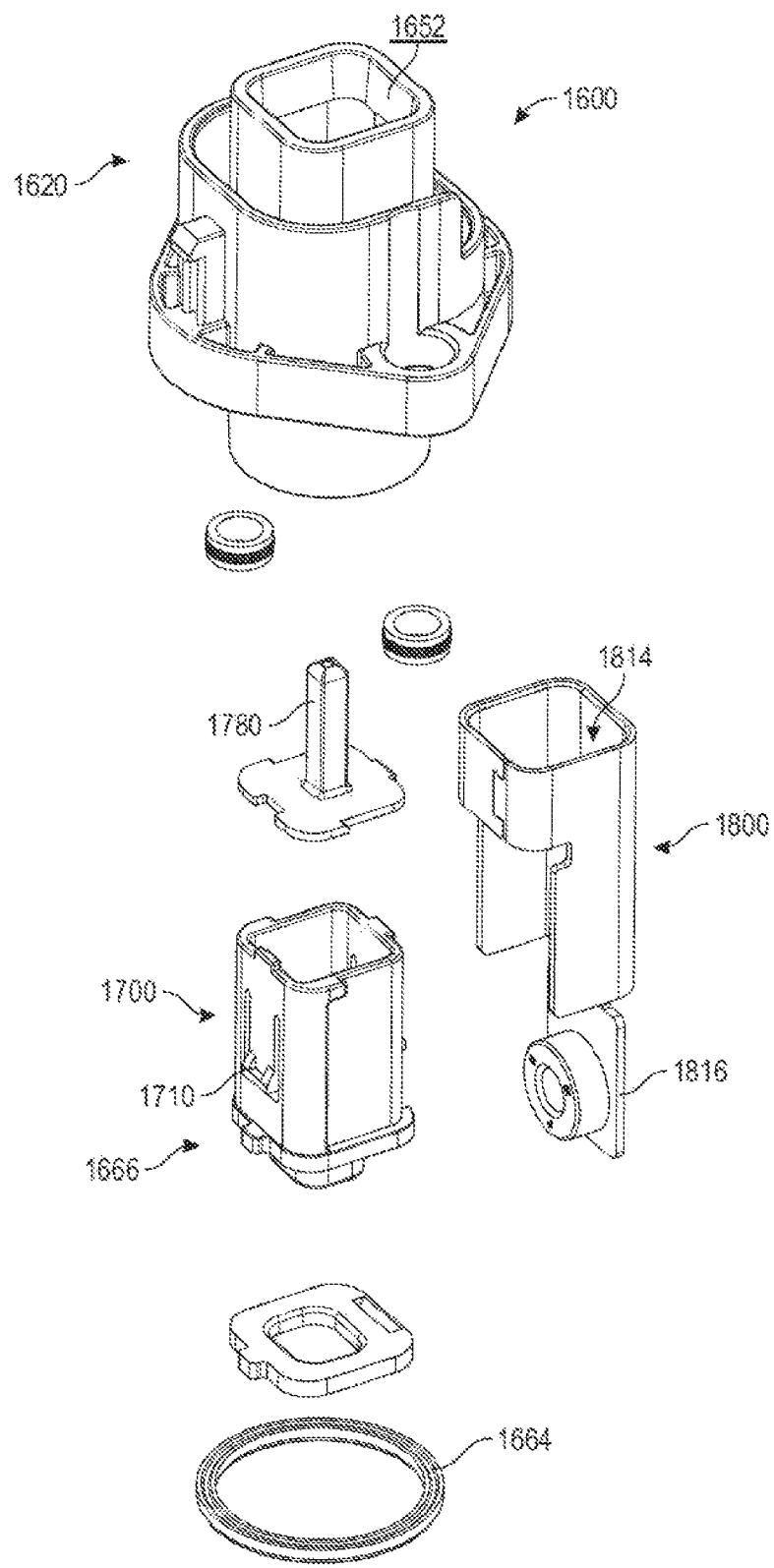
FIG. 74 is an exploded view of the female connector assembly shown in FIGS. 64 and 65.
Figure 75:
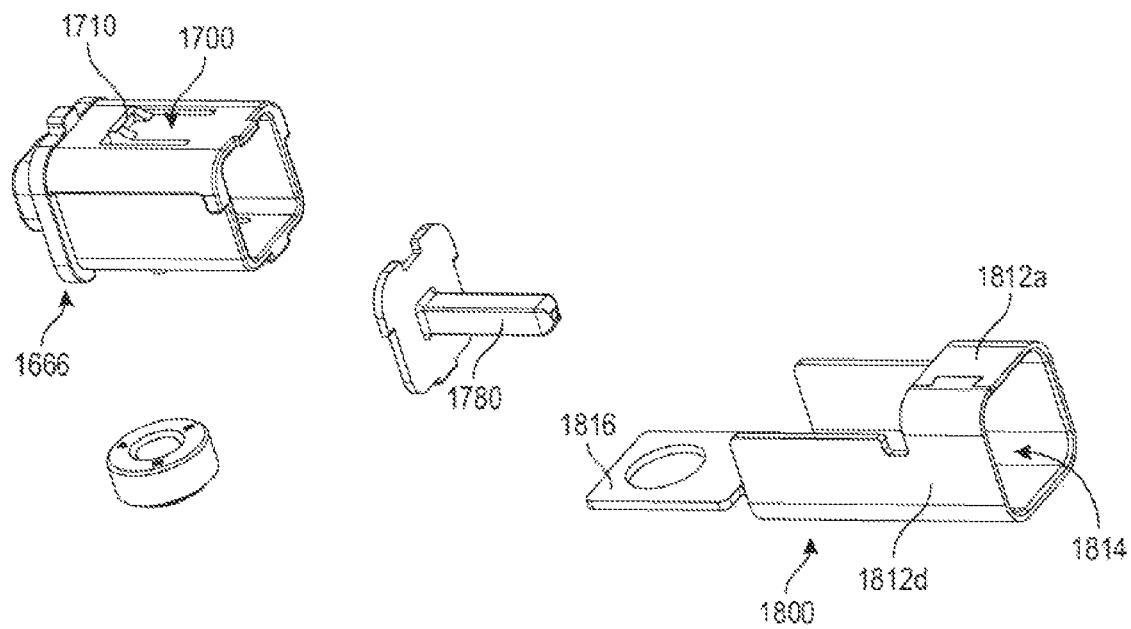
FIG. 75 is an exploded view of the female terminal, female terminal retaining member, and the touch proof post shown in FIG. 74.
Figure 76:
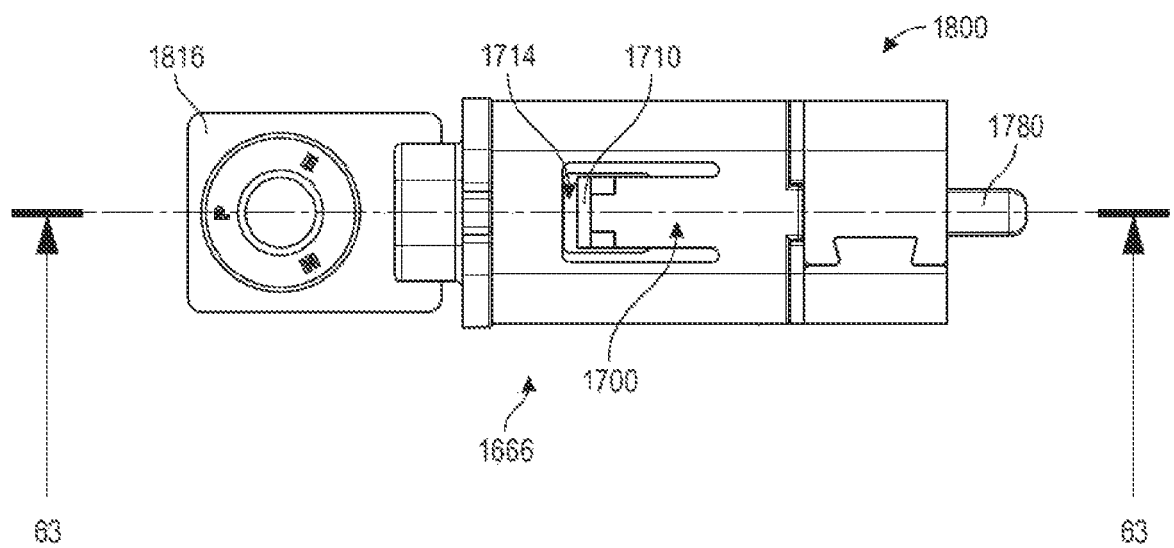
FIG. 76 is a top view of the female terminal, female terminal retaining member, and the touch proof post shown in FIG. 74.
Figure 77:
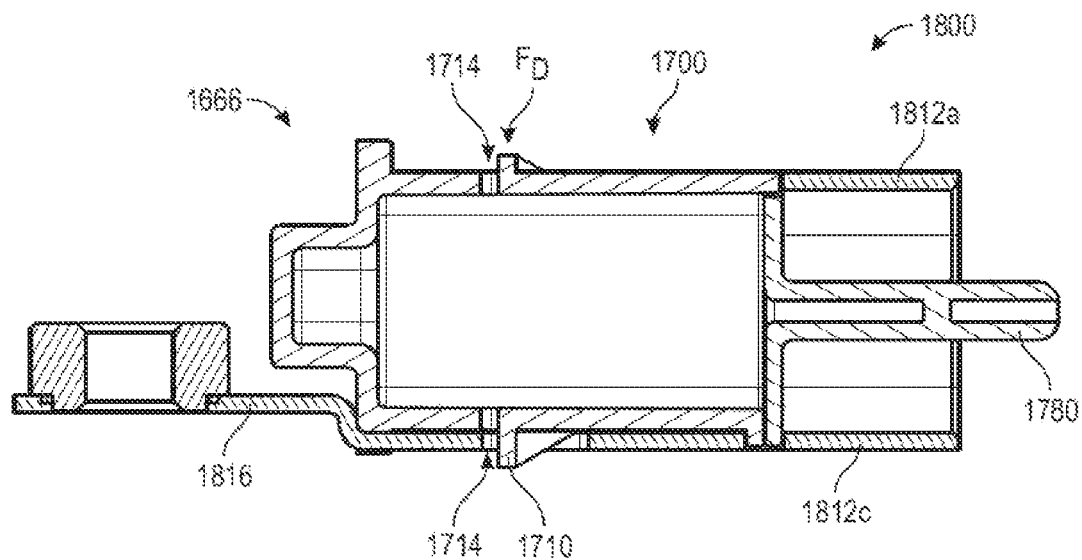
FIG. 77 is a cross-section view of the female terminal, female terminal retaining member, and the touch proof post taken along the 77-77 line of FIG. 76.
Figure 78:
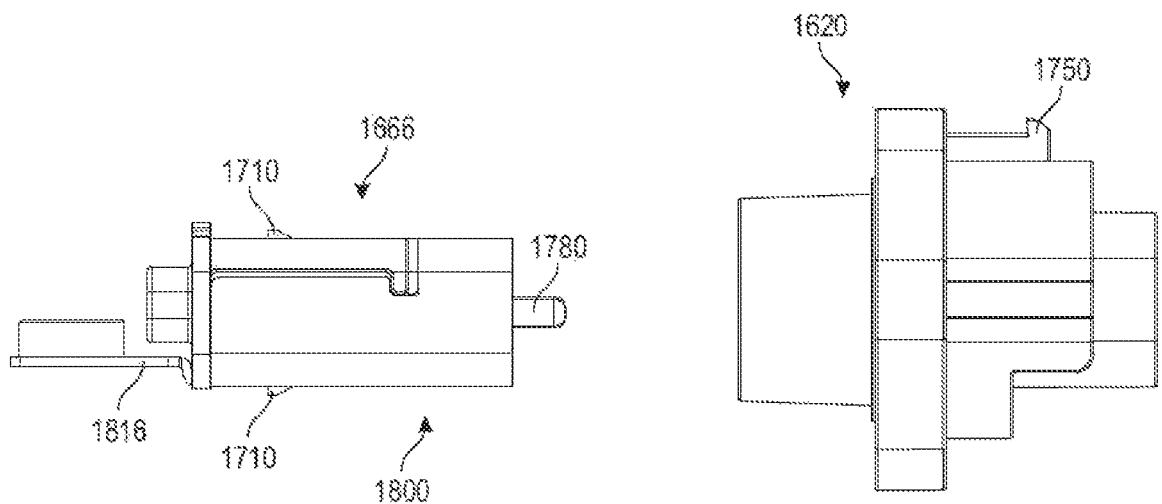
FIG. 78 is an exploded view of the female connector assembly shown in FIGS. 64 and 65.
Figure 79:
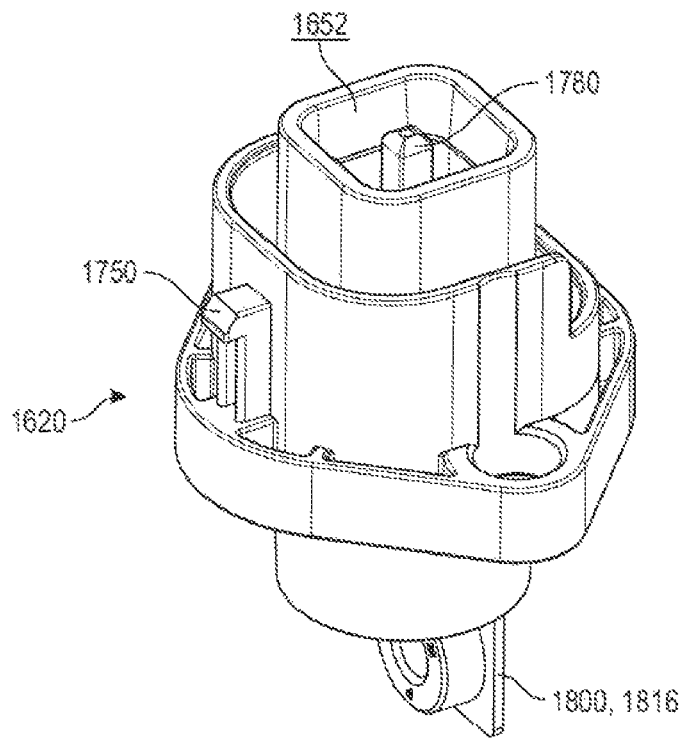
FIG. 79 is an isometric view of the female connector assembly shown in FIGS. 64 and 65.
Figure 80:
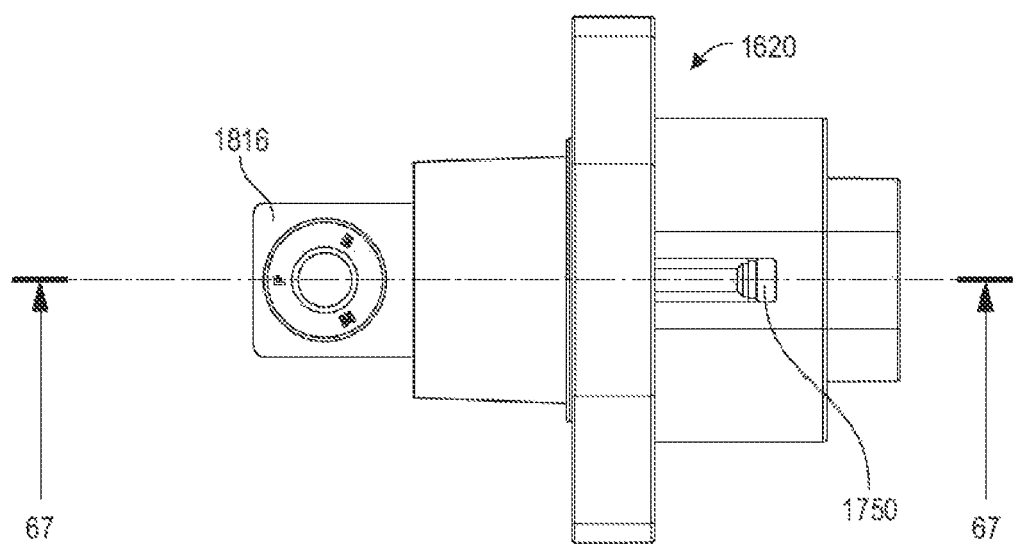
FIG. 80 is a top view of the female connector assembly shown in FIGS. 64 and 65.
Figure 81:
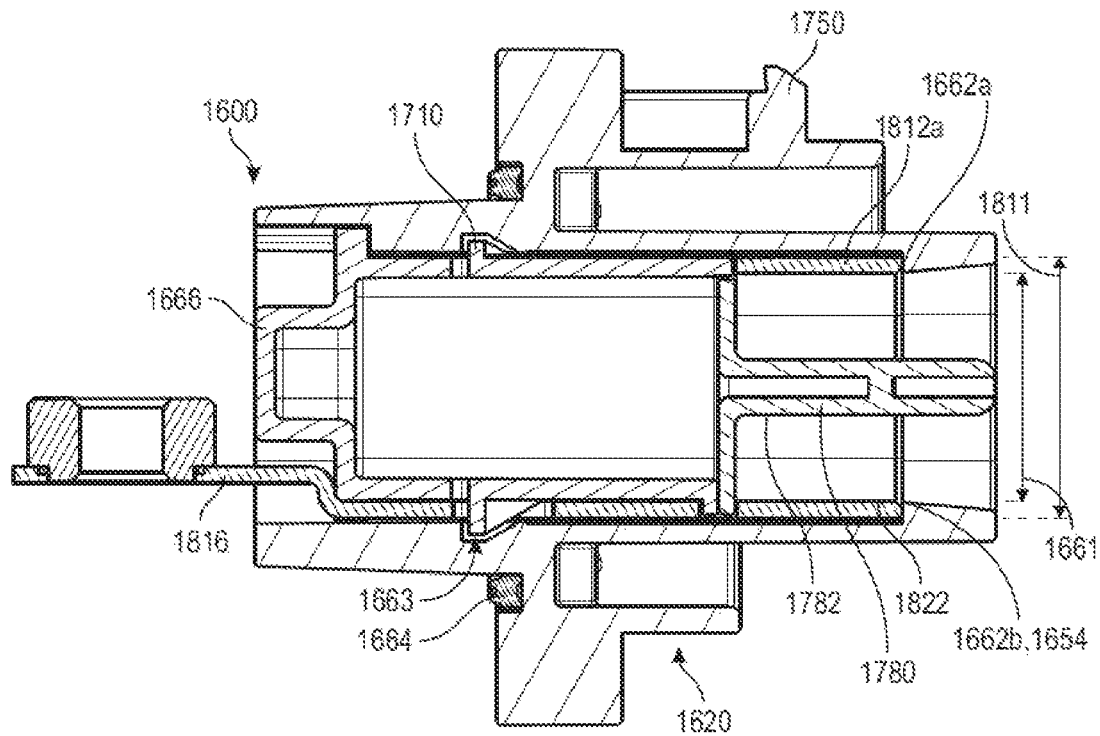
FIG. 81 is a cross-sectional view of the female connector assembly taken along the 81-81 line of FIG. 80.
Figure 82:
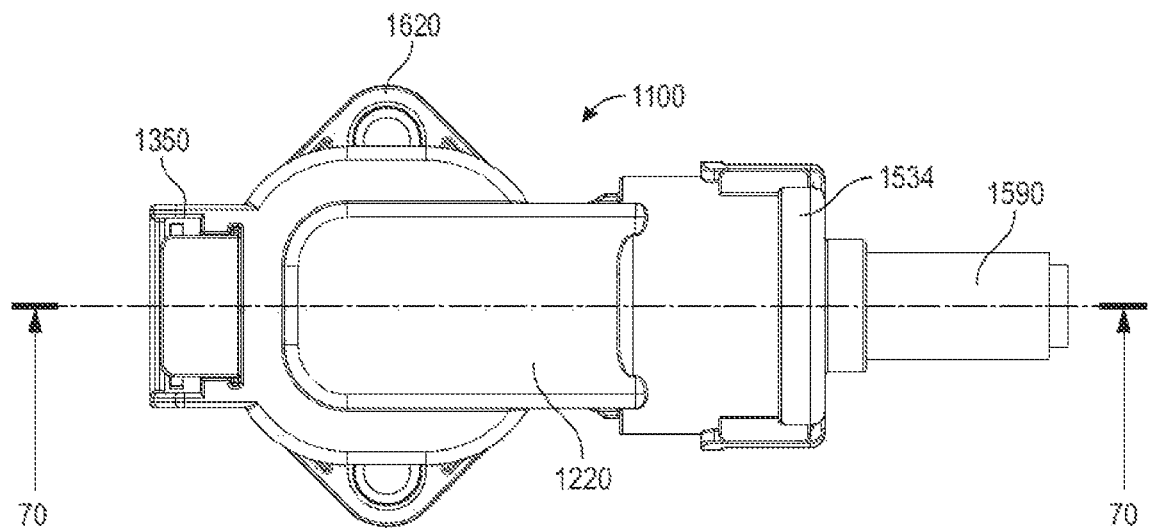
FIG. 82 is a top view of the connector system shown in FIGS. 64 and 65.
Figure 83:
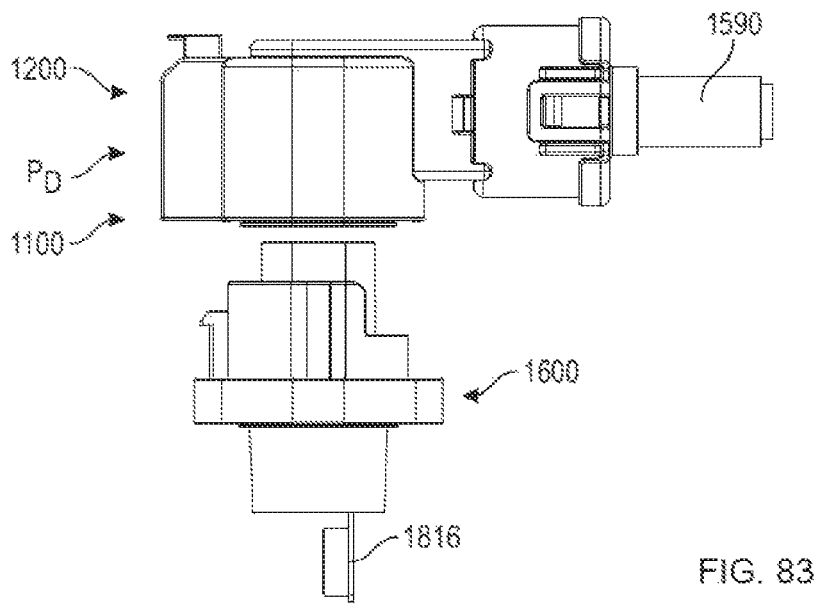
FIG. 83 is a side view of the connector system shown in FIGS. 64 and 65, wherein the male connector assembly is disconnected from the male connector assembly.
Figure 84:
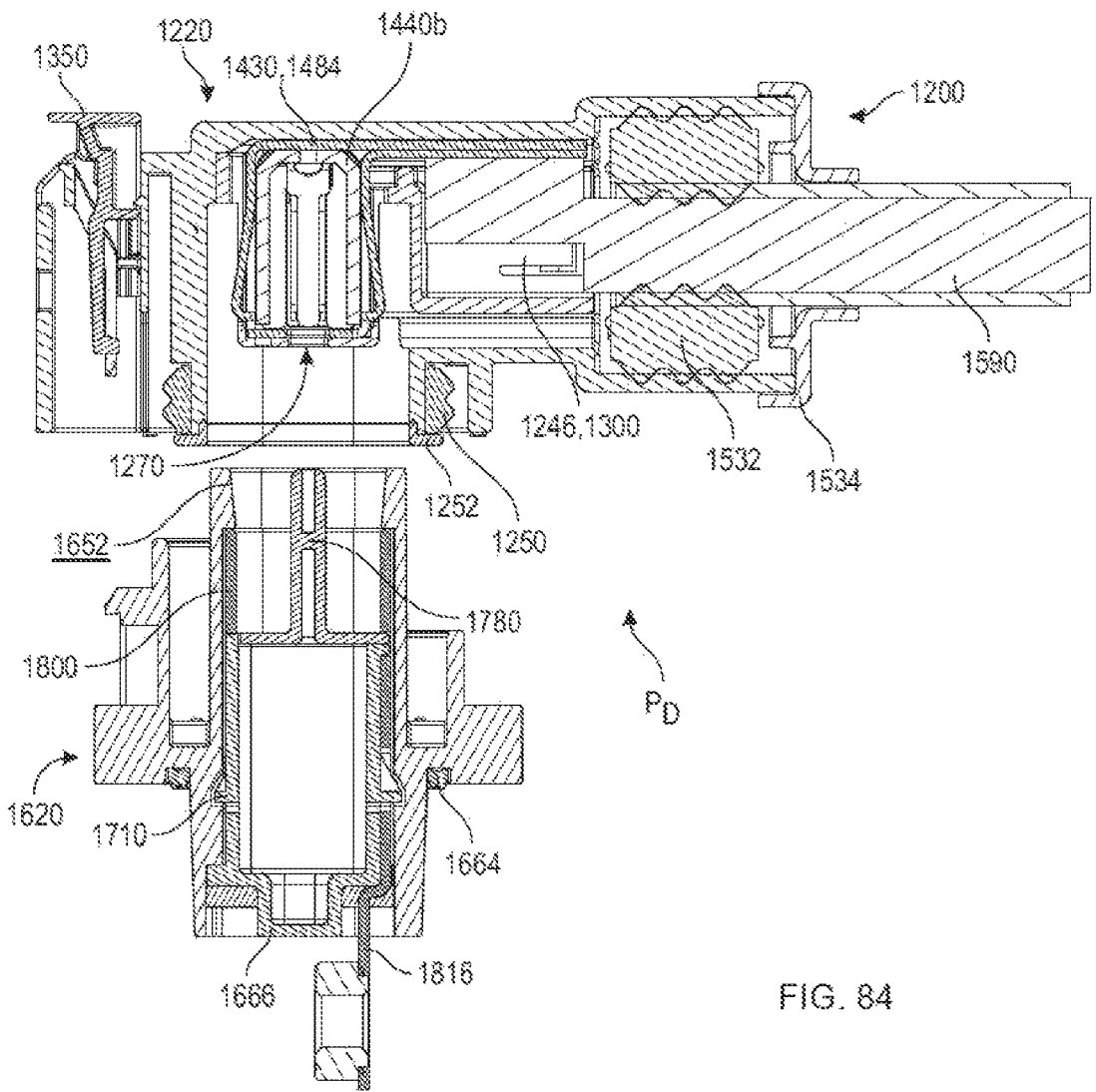
FIG. 84 is a cross-sectional view of the connector assembly shown in FIG. 83, taken along the 84-84 line of FIG. 82.
Figure 88:
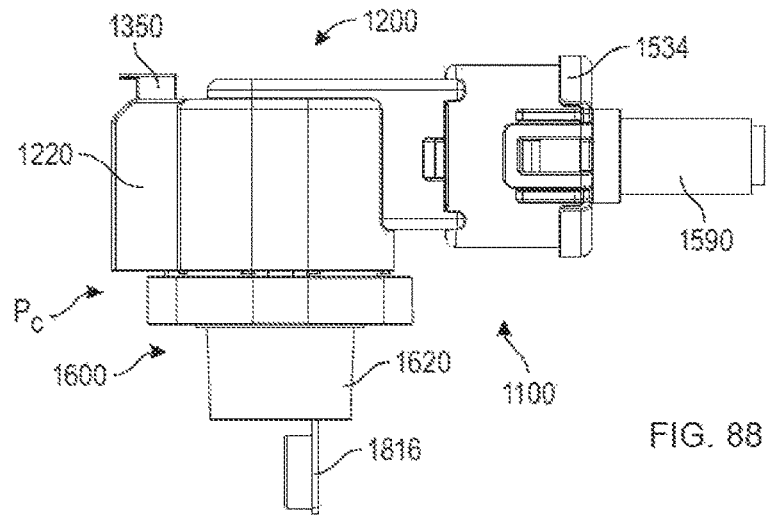
FIG. 88 is a side view of the connector assembly shown in FIGS. 64 and 65, wherein the male connector assembly is connected to the female connector assembly and the CPA is partially engaged with the connector system.
Figure 89:
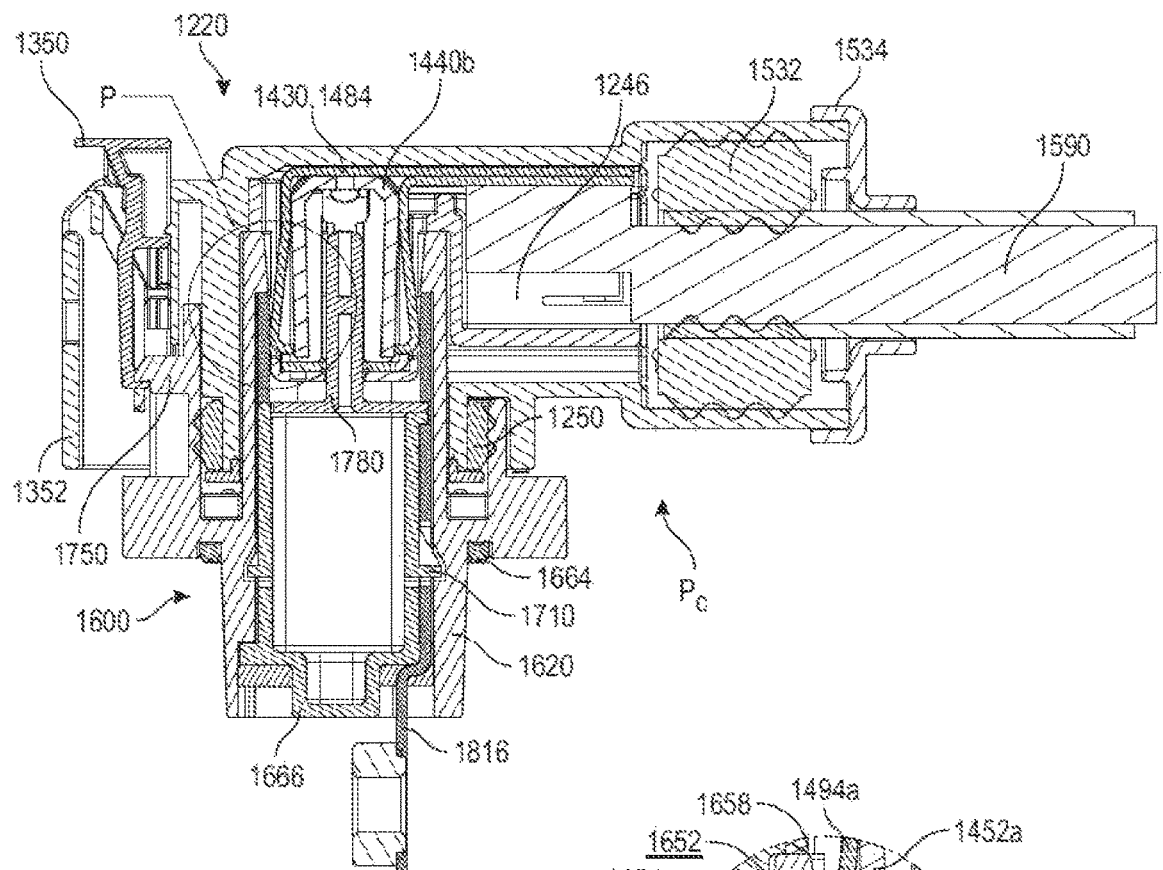
FIG. 89 is a cross-sectional view of the connector assembly shown in FIG. 88, taken along the 84-84 line of FIG. 82.
Figure 90:
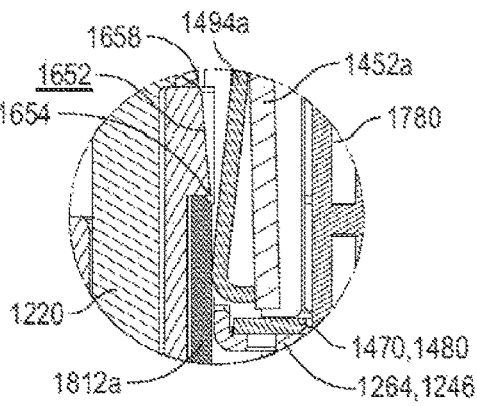
FIG. 90 is a zoomed in view of area P shown in FIG. 89.
Figure 91:
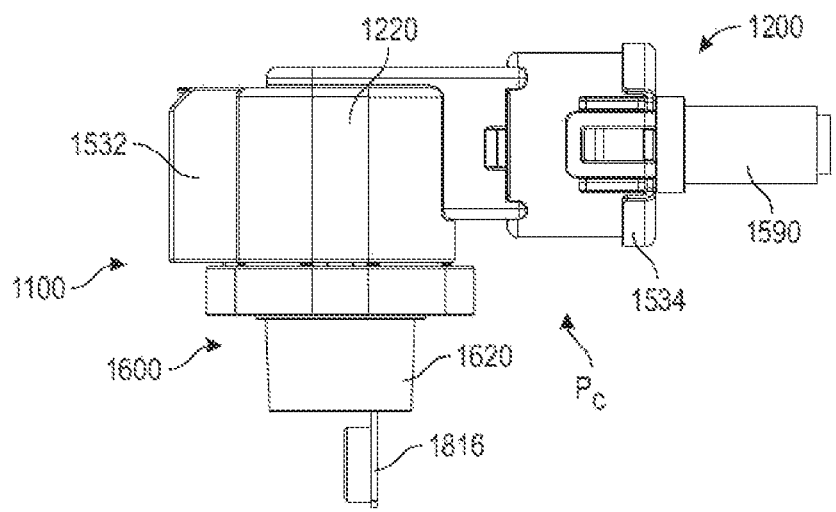
FIG. 91 is a side view of the connector assembly shown in FIGS. 64 and 65, wherein the male connector assembly is connected to the female connector assembly and the CPA is engaged with the connector system.
Figure 92:
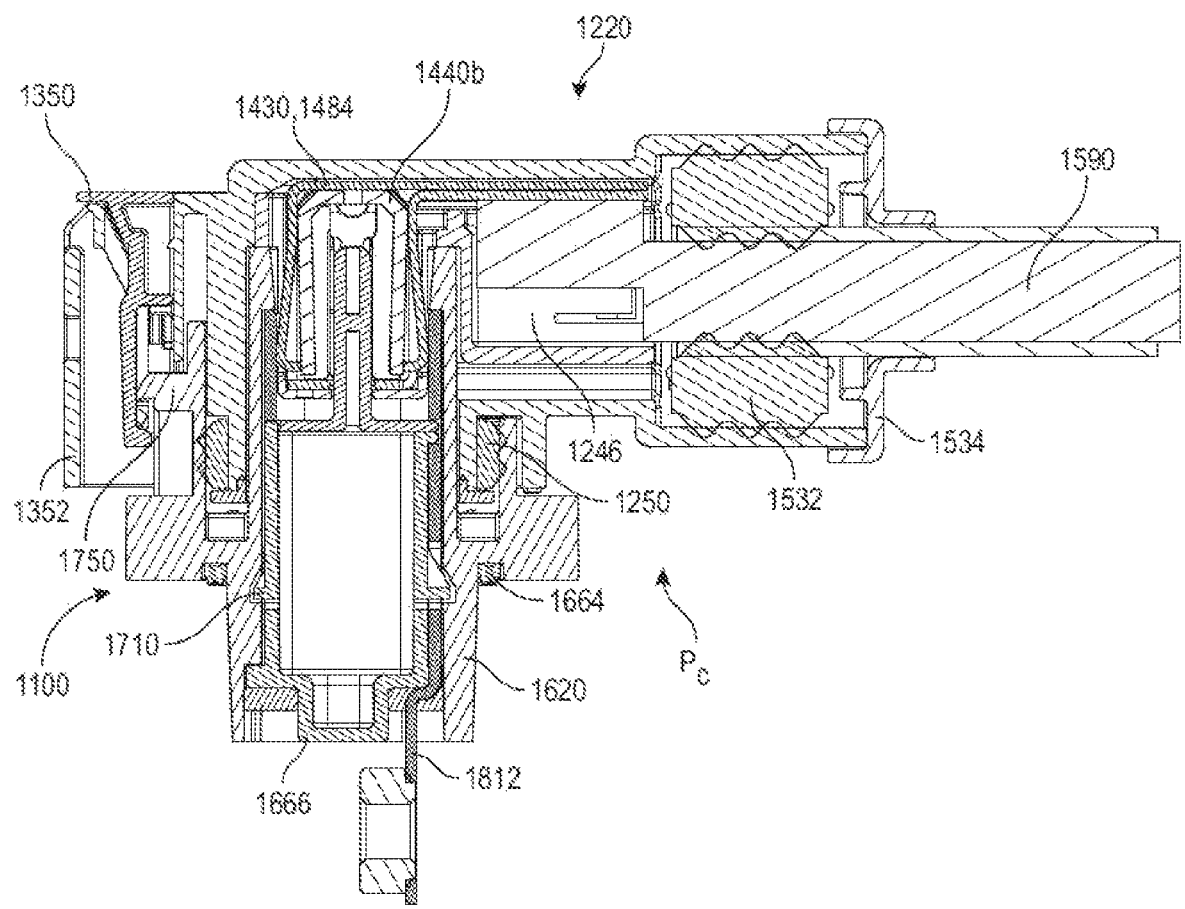
FIG. 92 is a cross-sectional view of the connector assembly shown in FIG. 91, taken along the 84-84 line of FIG. 82.
Figure 93:
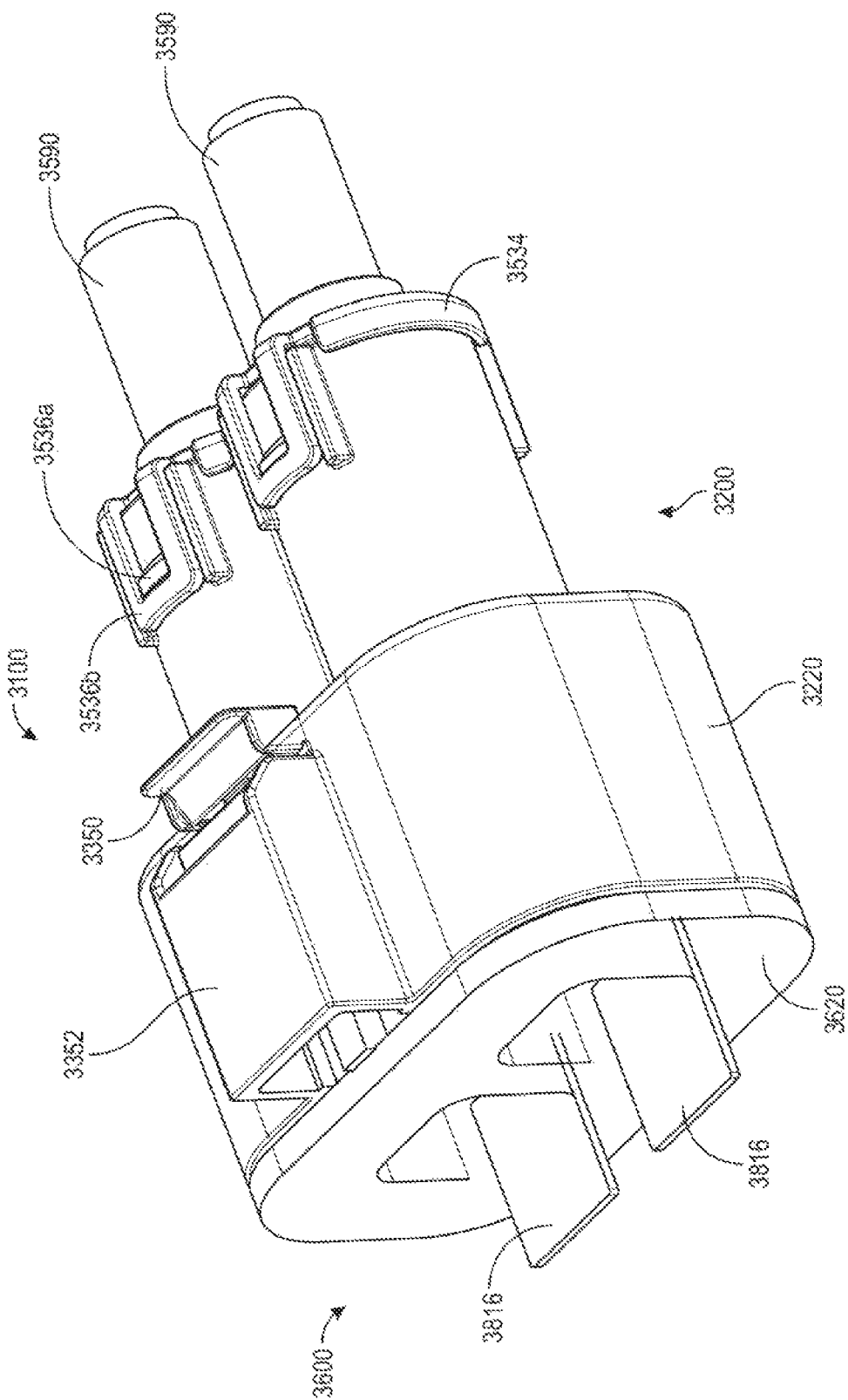
FIG. 93 is an isometric view of a four embodiment of a connector system having a male connector assembly and a female connector assembly.
Figure 94:
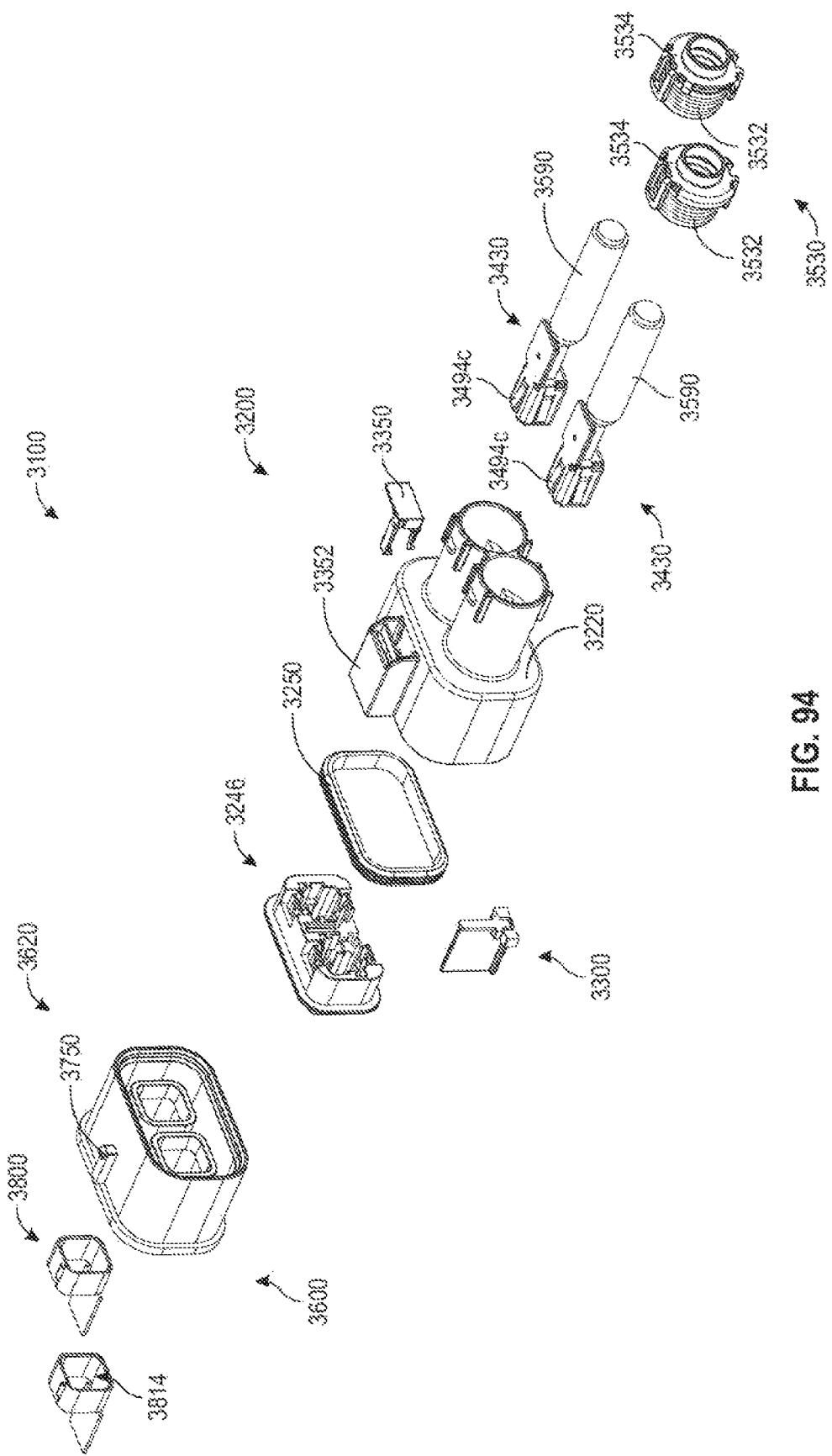
FIG. 94 is an exploded isometric view of the connector system shown in FIG. 93.
Figure 95:
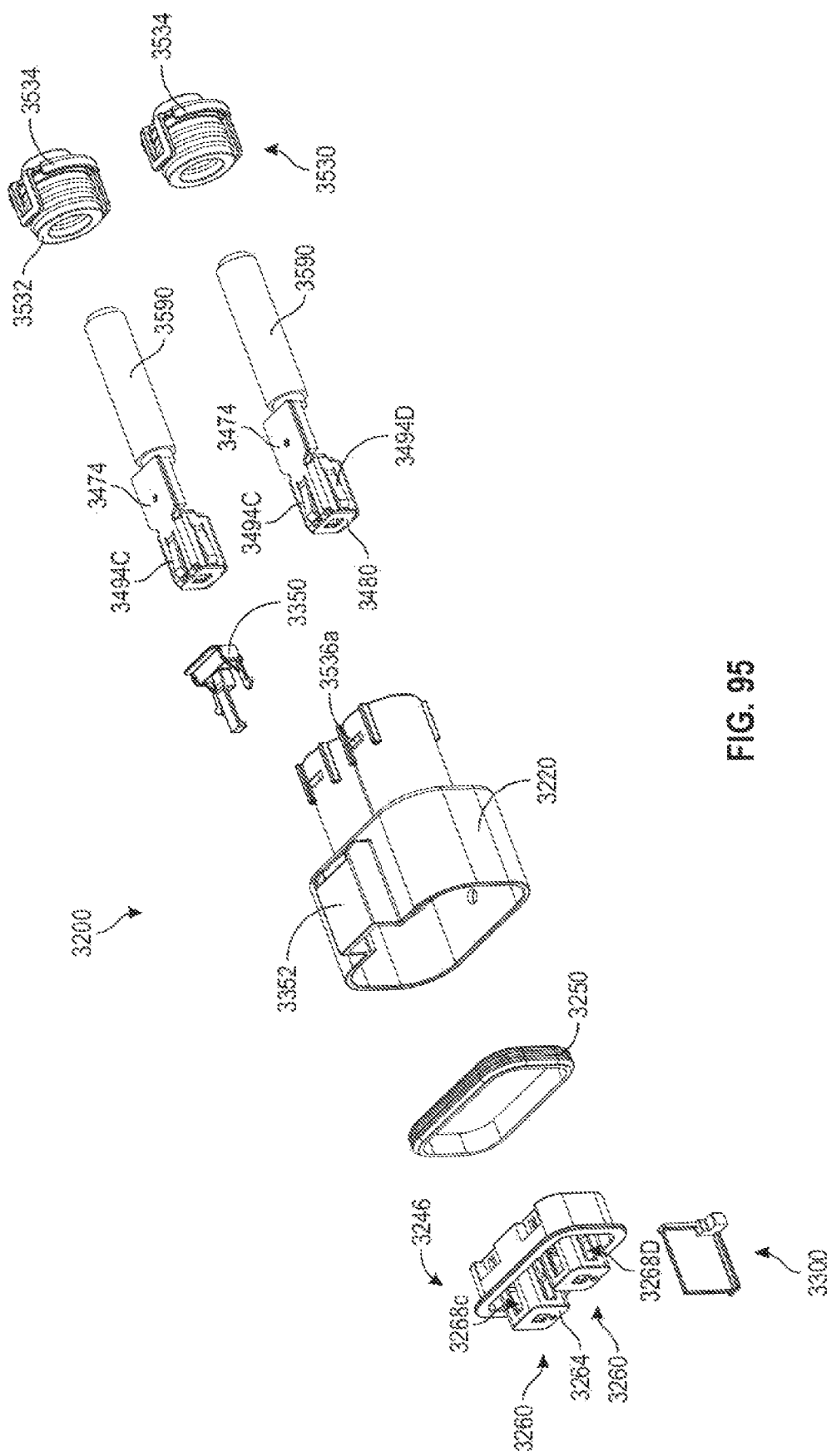
FIG. 95 is an exploded view of the male connector assembly shown in FIG. 93, wherein the male connector assembly has a male housing and a male terminal assembly.
Figure 98:
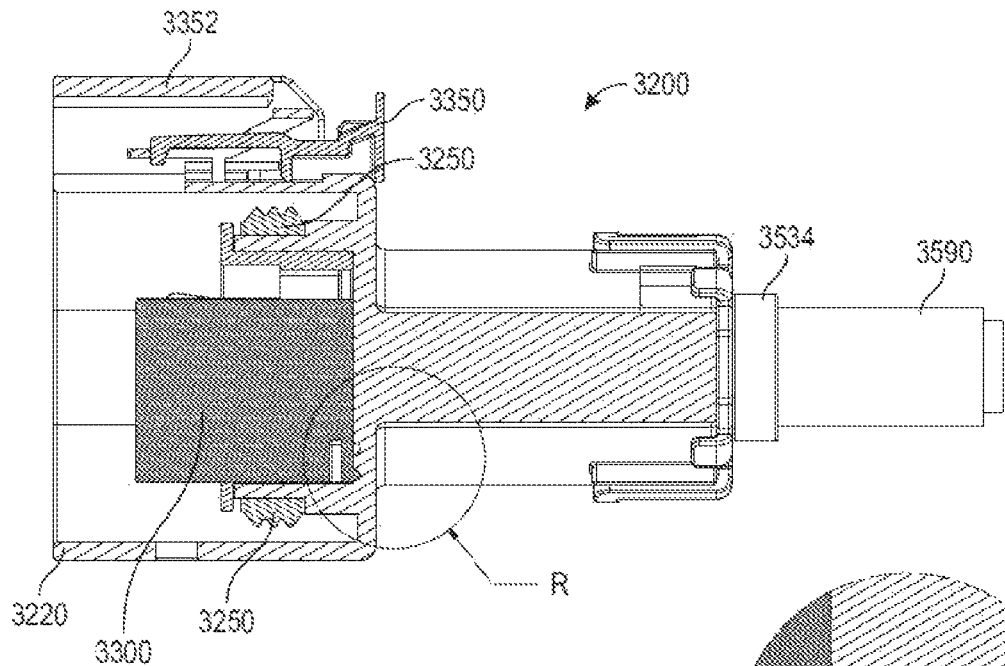
FIG. 98 is a cross-section view of the male connector assembly shown in FIG. 96, taken along the 98-98 line shown in FIG. 96.
Figure 99:
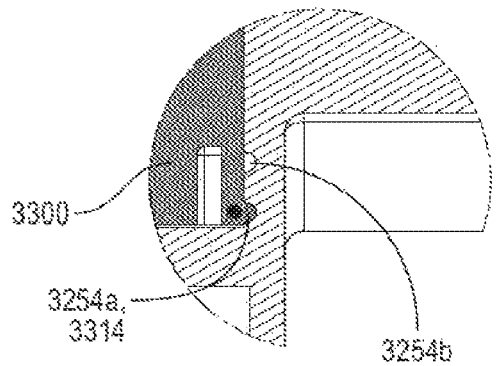
FIG. 99 is a zoomed in view of area R shown in FIG. 98.
Figure 100:
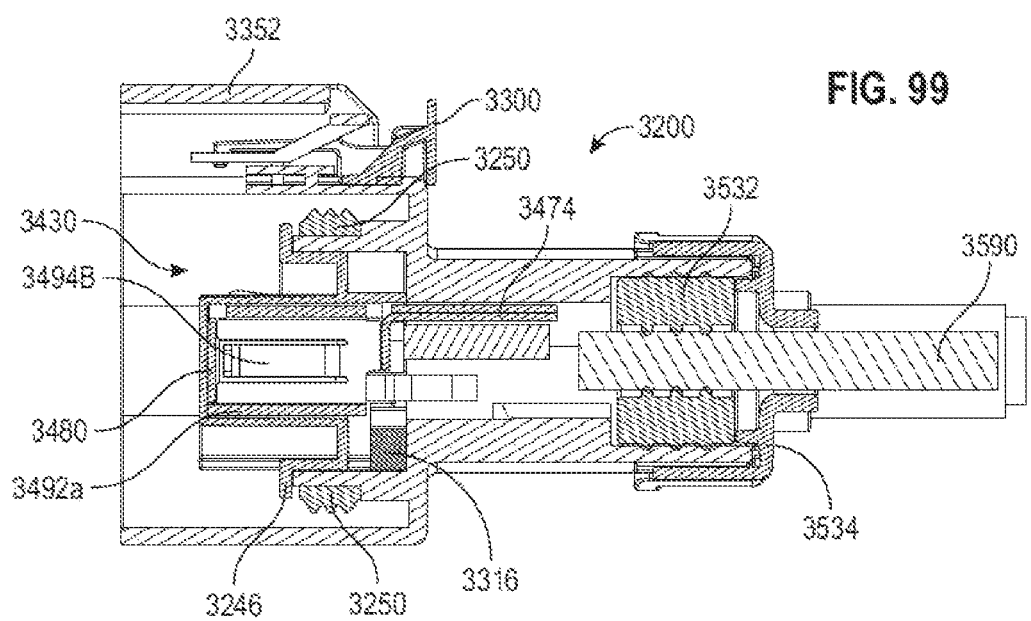
FIG. 100 is a cross-section view of the male connector assembly shown in FIG. 96, taken along the 100-100 line shown in FIG. 96.
Figure 101:
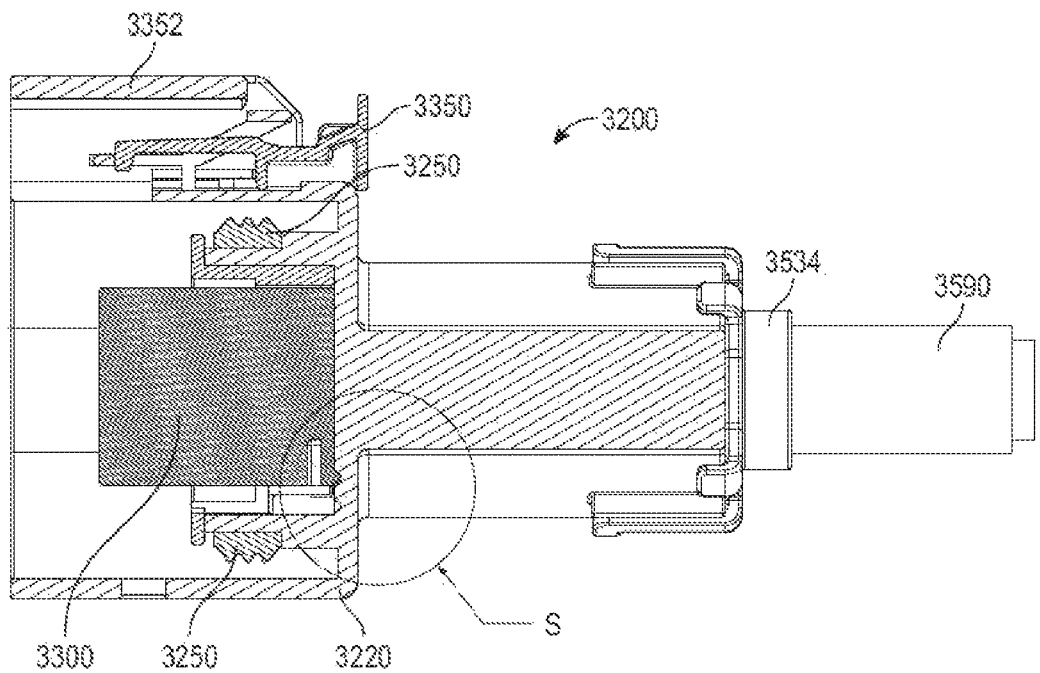
FIG. 101 is a cross-section view of the male connector assembly shown in FIG. 97, taken along the 101-101 line shown in FIG. 97.
Figure 102:
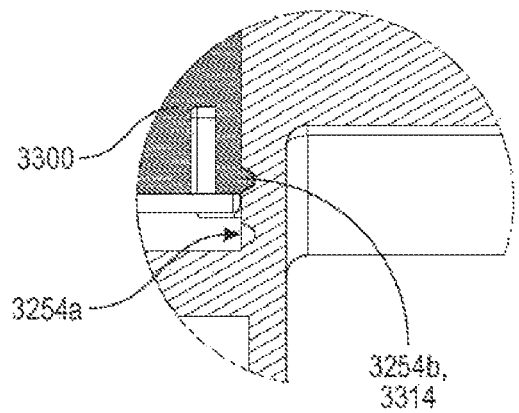
FIG. 102 is a zoomed in view of area S shown in FIG. 101.
Figure 103:
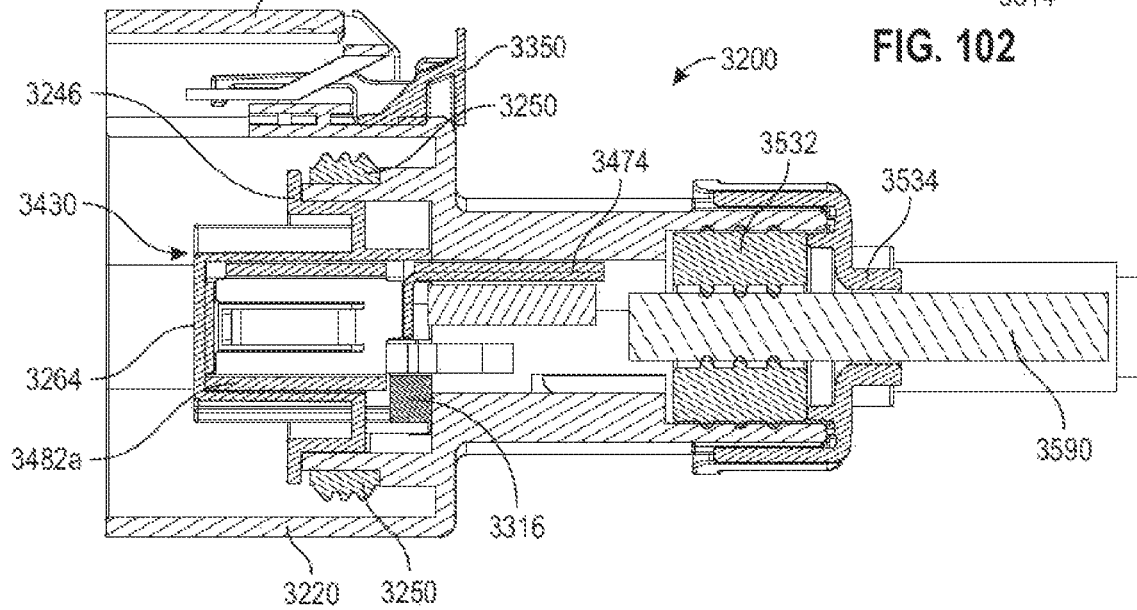
FIG. 103 is a cross-section view of the male connector assembly shown in FIG. 97, taken along the 103-103 line shown in FIG. 97.
Figure 104:
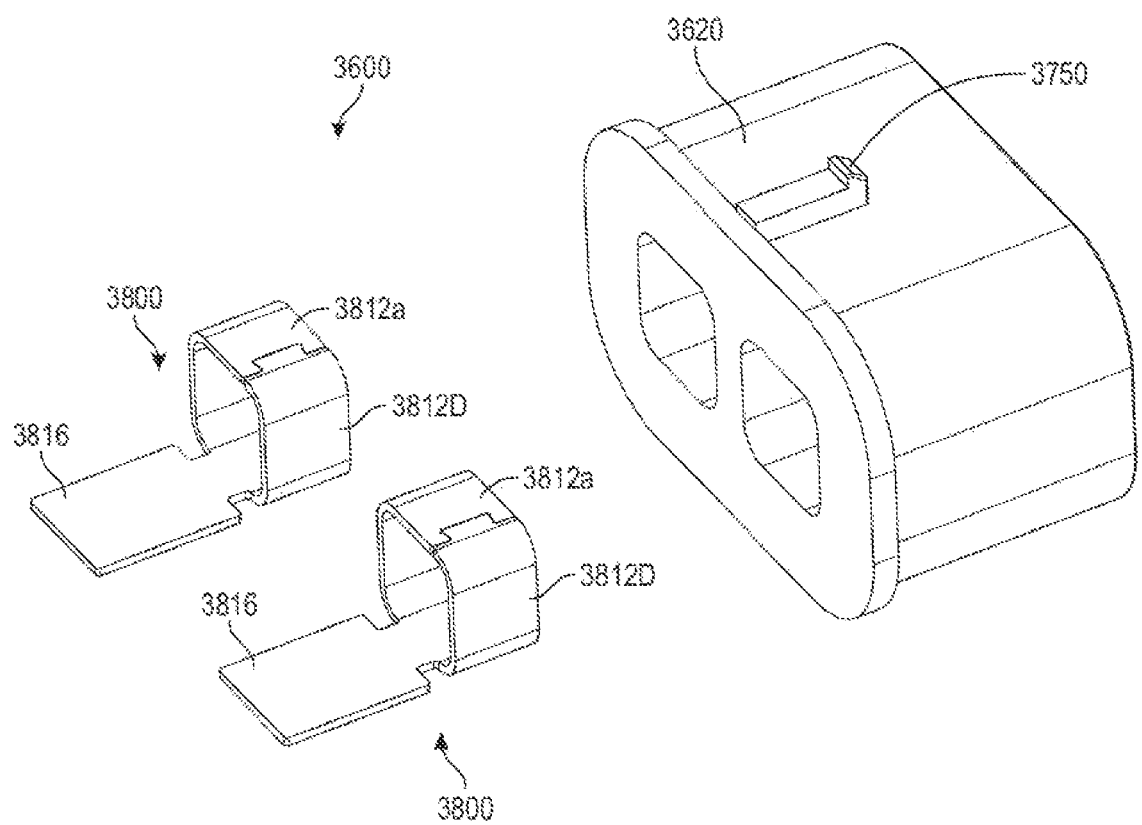
FIG. 104 is an exploded view of the female connector assembly shown in FIG. 93.
Figure 105:
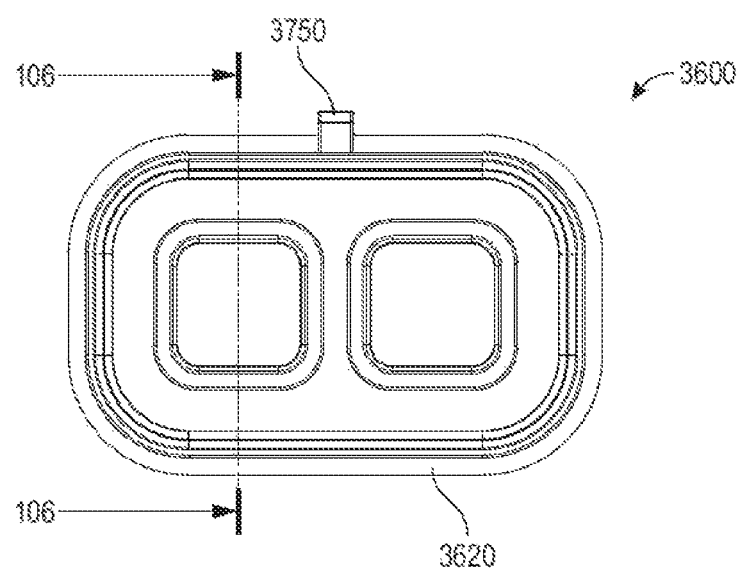
FIG. 105 is a front view of the female connector assembly shown in FIG. 93.
Figure 106:
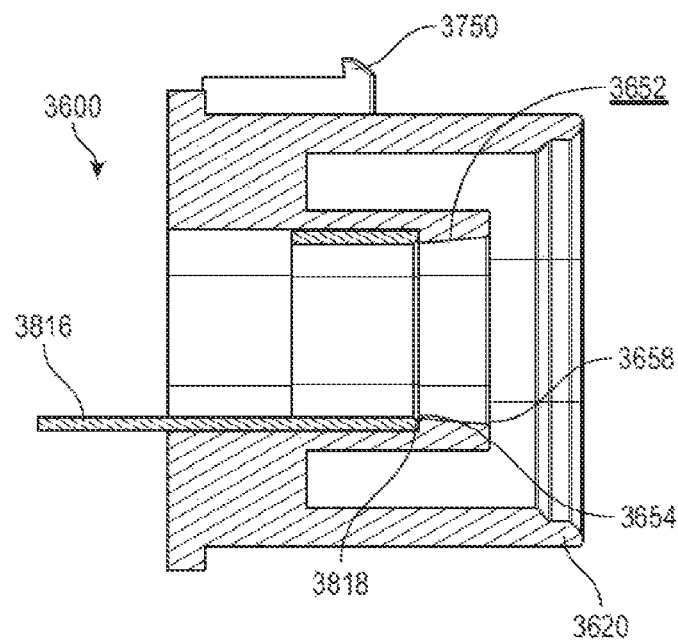
FIG. 106 is a cross-sectional view of the female connector assembly shown in FIG. 105, taken along the 106-106 line shown in FIG. 105.
Figure 107:
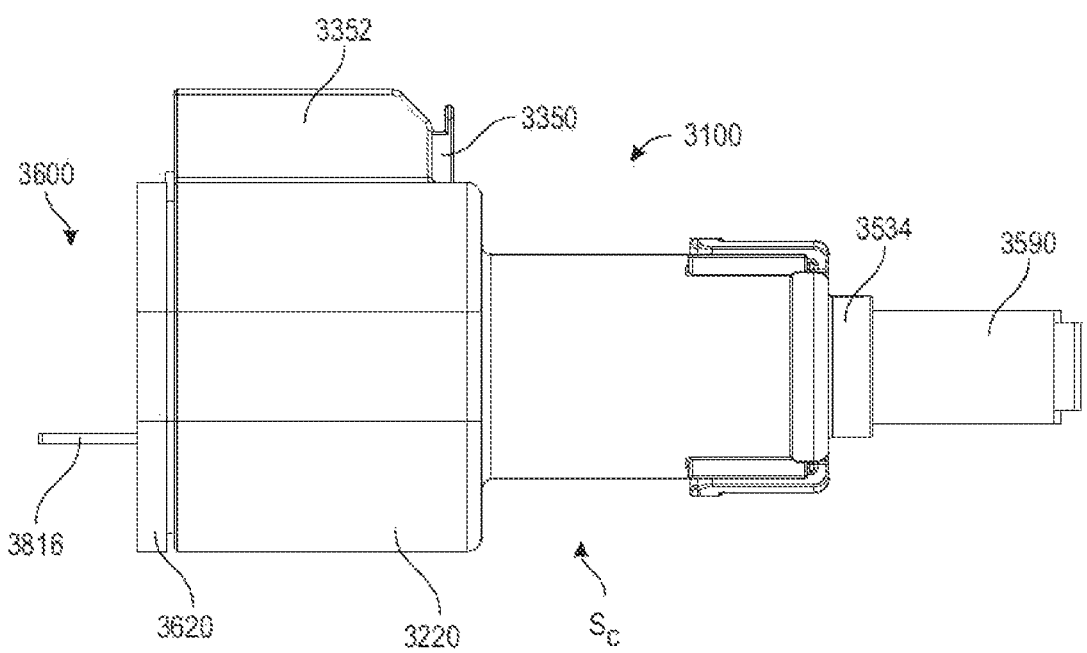
FIG. 107 is a right side view of the connector system shown in FIG. 93.
Figure 108:
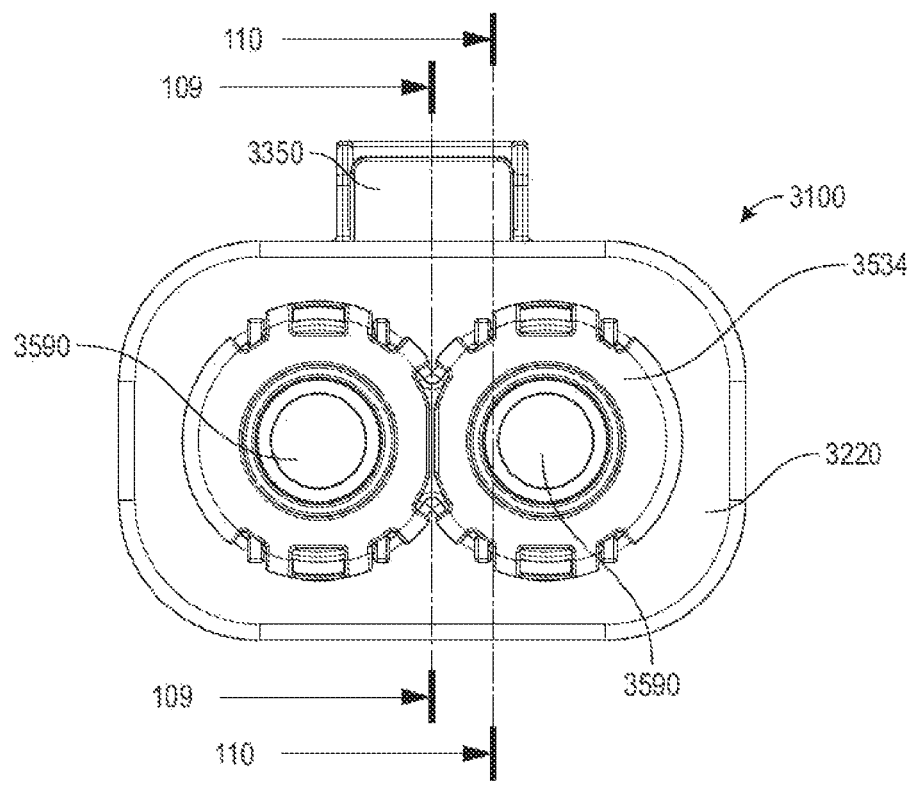
FIG. 108 is a rear view of the connector system shown in FIG. 107.
Figure 109:
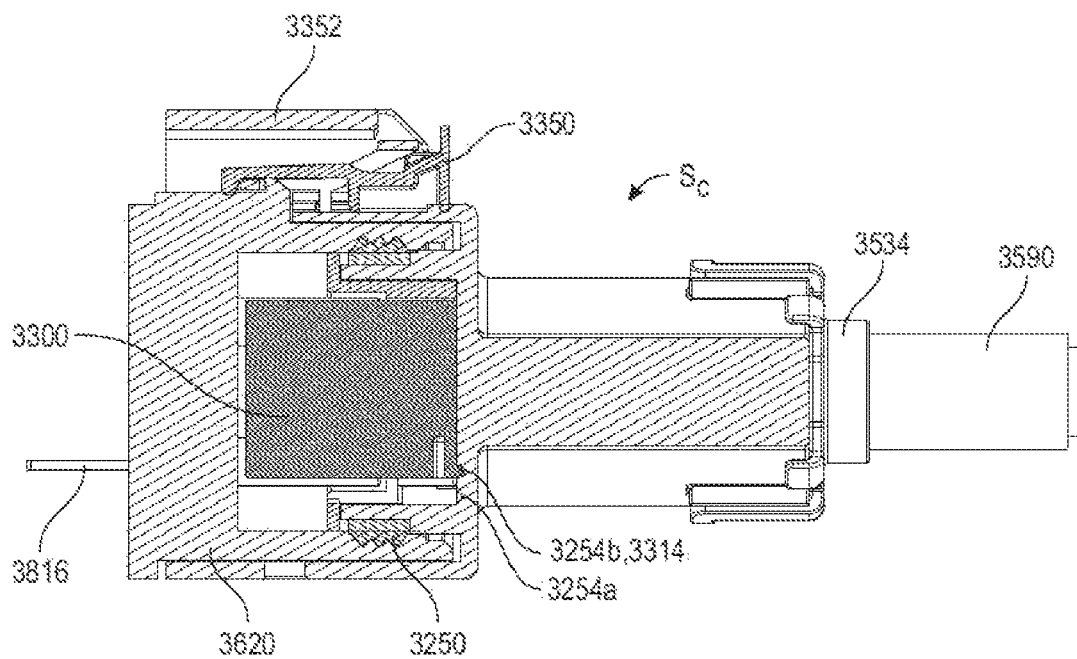
FIG. 109 is a cross-sectional view of the connector system shown in FIG. 93, taken along the 109-109 line shown in FIG. 108.

FIG. 63 provides a simplified electrical diagram of a motor vehicle 500 that includes multiple connector systems. The motor vehicle 5000 includes: (i) a first connector system 5001 that is connected between an AC/DC converter 1 and a second connector system 5003 that is connected to a power distribution box 4, wherein the first and second connector system 5001, 5003 connect the AC/DC converter 1 to the power distribution box 4, (ii) a third connector system 5002 that is connected to the power distribution box 4 and a fourth connector system 5004 that is connected to electrical supercharger 9, wherein the third and fourth connector systems 5003, 5004 connect the power distribution box 4 to the electrical supercharger 9, (iii) a fifth connector system 5005 that is connected to 48 volt battery and a power distribution box 4, (iv) a sixth connector system 5006 that is connected to a second power distribution box 4 and (v) a seventh connector system 5007 that is also connected to the second power distribution box 4.

FIGS. 64-92 show various views of a second embodiment of the connector system 1100. It should be understood that this second embodiment of the connector system 1100 contains structures, features and/or functions that are similar to the structures, features and/or functions disclosed in connection with the first embodiment of the connector system 100. Accordingly, reference numbers that are separated by 1000 will be used in connection with this second embodiment to denote the structures and/or features that are similar to the structures and/or features disclosed in the first embodiment. For example, the contact arms of the first embodiment are labeled 494a-494h, while the contact arms of the second embodiment are labeled 1494a-149d. Therefore, one of ordinary skill in the art shall assume that the contact arms of the first embodiment 494a-494h have similar structures, features and/or functions in comparison to the contact arms of the second embodiment 1494a-1494d. Additionally, one of ordinary skill in the art shall understand that while the structures, features and/or functions are similar that does not mean the structures, features and/or functions are exactly the same. Further, it should be understood that structures and/or features of this second embodiment may be used in connection with any other embodiment contained within this application or its related applications Like the first embodiment of the connector system 100, the second embodiment of the connector system 1100 includes: (i) a male connector assembly 1200 and (ii) a female connector assembly 1600. The male connector assembly 1200 has: (i) a male housing 1220, (ii) male CPA 1352, (iii) male terminal assembly 1430, (iv) a cable strain relief 1530, and (v) wire 1590. Like the second embodiment of the spring member 440b, this third embodiment of the spring member 1440b includes a recess 1554 and an associated strengthening rib. Unlike the second embodiment of the spring member 440b, the width of the base spring section 1450a-1450d is not approximately equal to the width of the spring arms 1452a-1452d. Also, like the first embodiment of the male terminal 470, this second embodiment of the male terminal 1470 includes a plurality of contact arms 1494a-1494d that: (i) are integrally formed with an extent of the male terminal side wall portion 1492a-1492d, (ii) extend away from the connection plate 1474 and towards the front male terminal wall 1480 at an outwardly directed angle, (iii) extend across an extent of the contact arm openings, and (iv) have a terminal end that is configured to contact the planar outer surface of the spring arms 1452a-1452d.

Also, like the first embodiment of the contact arm 494*a*-494*h*, the second embodiment of the contact arm 1494*a*-1494*d* are designed to interact with the internal spring member 1440. Like the disclosure discussed in connection with FIGS. 1, 36-38, 42-46*a*, and 48-49, the contact arms 1494*a*-1494*d* are depressed or displaced inward (i.e., towards the center 1490 of the male terminal 1470), when the male terminal assembly 1430 is inserted within the female terminal receiver 1814. In addition, as discussed above in connection with FIG. 49, the spring member 1440*b* applies both a spring biasing force, SBF, and a spring thermal force, STF, on the contact arms 1494*a*-1494*d* to create a 360 degree mechanical and electrical connection with the female terminal 1800. Further, like the first embodiment of the connector system 100, the second embodiment of the connector system 1100 is beneficial over the connector system disclosed within PCT/US2018/019787 because: (i) the male terminal 1470 is shorter, which utilizes less metal and can be installed in narrower spaces, (ii) has a higher current carrying capacity, (iii) is easier to assemble, and (iv) has other beneficial features that are disclosed herein or can be inferred by one of ordinary skill in the art from this disclosure.

Additionally, like the first embodiment of the female housing 620, the second embodiment of the female housing 1620 includes an internal segment 1651 that has an angled or sloped configuration that gradually compresses the contact arms 1494*a*-1494*d* during the insertion of the male connector assembly 1200 into the female connector assembly 1600. This compression of the contact arms 1494*a*-1494*d* is necessary because the combination of outer surfaces of the contact arms 1494*a*-1494*d* is slightly (e.g., between 0.1% and 15%) larger than the receiver 1814 of the female terminal 1800. Also, as discussed above in connection with the first embodiment and FIGS. 30-47, the configuration of the male housing 1220 and the female housing 1620, including the internal segment 1651, has may benefits over the housings disclosed within PCT/US2018/019787. Some of these benefits include: (i) requires a shorter amount of distance to bring the connector system 1100 from the disconnected position, PD, to the intermediate position, PI, (ii) requires less insertion force, which enables the designer to utilize a spring member 1440*b* that has a larger spring bias while still meeting the USCAR specifications (e.g., USCAR 25), (iii) once the contact arms 1494*a*-1494*d* have passed the rearmost extent 1654 of the internal segment 1651, the required insertion force levels off, (iv) the overall insertion distance is shorter to bring the connector system 1100 from the disconnected position, PD, to the connected position, PC, (v) the configuration of the housings 1220, 1620, may provide multiple audible sounds when components are properly connected to one another, (vi) the inclusion of a CPA, which meets industry standards and/or requirements (e.g., USCAR 2), and (vii) other beneficial features that are disclosed herein or can be inferred by one of ordinary skill in the art from this disclosure.

One difference between the first embodiment of the connector system 100 and the second embodiment of the connector system 1100 is the fact that the second embodiment of the female terminal 1800 is designed to be directly coupled to a device (e.g., battery), while the first embodiment of the female terminal 800 is designed to be directly coupled to a wire 890 (as shown in FIG. 2). In particular, this change to the second embodiment is shown by the configuration of the connection plate 1816. Another difference between the first embodiment of the connector system 100 and the second embodiment of the connector system 1100 is the configuration of the housing 1220 and the components that are associated with the male housing 1220. While the specific configuration of the housings 220, 1220 and their associated components are different, the functionality of the housings 220, 1220 and their associated components are similar. For example, the housing 220 of the first embodiment is capable of being disassembled to allow the assembler to weld the wire 590 to the male terminal assembly 430. While the housing 1220 of the second embodiment cannot be disassembled, the second embodiment of the connector system 1100 includes a terminal holder 1246 that removably couples the male terminal assembly 1430 to the housing 1220. The ability to removably couple the male terminal assembly 1430 to the housing 1220 enables the assembler to remove the male terminal assembly 1430 from the housing 1220 to weld the wire 1590 to the male terminal assembly 1430. Thus, both embodiments of the connector system 100, 1100 contain features that allow for the welding of the wire to the male terminal assembly 430, 1430 without possibly damaging the housing 220, 1220.

The male terminal holder 1246 includes: (i) a terminal receiver 1260, (ii) securing arms 1240, and (iii) male locking member 1300. Unlike the first embodiment of the terminal receiver 260, the second embodiment of the terminal receiver 1260 is integrally formed with the male terminal holder 1246 that is designed to be removably coupled to the male housing assembly 1220. Nevertheless, like the first embodiment of the terminal receiver 260, the second embodiment of the terminal receiver 1260 includes: (i) an arrangement of side walls 1262*a*-1262*d*, (ii) front wall 1264, and (iii) a rectangular bow 1266, which is formed from the arrangement of side walls 1262*a*-1262*d* and the front wall 1264. Also, like the first embodiment, the side walls 1262*a*-1262*d* have male terminal openings 1268*a*-1268*d* and the front wall 1264 has a touch proof post opening 1270. Like the first embodiment of the terminal receiver 260, the configuration the features and/or structures of the terminal receiver 1260 provides additional rigidity to the male terminal assembly 1430 and limits the exposed amount of the male terminal assembly 1430.

Unlike the first embodiment of the securing arms 240, the second embodiment of the securing arms 1240 are integrally formed with the male terminal holder 1246 that is designed to be removably coupled to the male housing assembly 1220. Nevertheless, like the first embodiment of the securing arms 240, the second embodiment of the securing arms 1240 are designed to elastically deform outwardly (i.e., away from the interior of the bowl 1266) based on an interaction with the front male terminal wall 1480 upon the application of a first insertion force, FI. After applying the second insertion force, FI, on the male terminal assembly 1430, the securing arms 1240 can return to their original or non-deformed state due to the fact the locking arm 1240 can fit into a securing arm receiver 1476 that is formed in the rear male terminal wall 1484 of the male terminal 1470. Also, like the first embodiment, the return of the securing arms 1240 to a non-deformed state may cause an audible sound (e.g., click), which inform the assembler that the male terminal assembly 430 is properly seated within the male terminal holder 1246; thus meeting industry standards and/or requirements (e.g., USCAR). Like the first embodiment of the securing arms 240, the configuration the features and/or structures of the securing arms 1240 provide a way to releasable coupled the male terminal assembly 430, 1430 within the terminal receiver 260, 1260.

Unlike the first embodiment of the male locking member 300, the second embodiment of the male locking member 1300 is designed to interact with a locking member recess 1248 that is formed within the male housing assembly 1220. In particular, a first insertion force, FI, will cause the male locking member 1300 to interact with an inner surface 1330 of the male housing assembly 220. This interaction will cause the male locking member 1300 to elastically deform towards the male terminal assembly 1430 and will position an extent of the male locking member 1300 within the locking member gap 1248. Positioning an extent of the male locking member 1300 within the locking member gap 1248 will allow the male terminal holder 1246 to be inserted into the housing 1220. The application of a second insertion force, FI, will place: (i) the side wall 1262a of the terminal receiver 1260 into a forward interior extent of the male housing 1220 and (ii) an extent of the male locking member 1300 within the locking member recess 1254 that are formed within the male housing assembly 1220. The return of the male locking member 1300 to an original or non-deformed state may cause an audible sound (e.g., click), which inform the assembler that the male terminal holder 1246 is properly seated within the male housing 1220; thus meeting industry standards and/or requirements (e.g., USCAR). In this position, the male terminal holder 1246 is properly seated and secured within the male housing 1220. Like the first embodiment of the male locking member 300, the configuration the features and/or structures of the male locking member 1300 releasable locks the male terminal assembly 430, 1430 into the housing 220, 1220.

Another difference between the first embodiment of the connector system 100 and the second embodiment of the connector system 1100 is the inclusion of a touch proof post 1270 in the second embodiment. In particular, FIGS. 84, 86, 89, and 92 show a touch proof post opening 1270 that is formed in the front male terminal wall 1480 of the male terminal body 1472, while FIGS. 65, 74-79, 81, 84, 87, 89, and 92 show a touch proof post 1780. The touch proof post opening 1270 is configured to receive a touch proof post 1780. The touch proof post 1780 is designed and configured to reduce the chance that a foreign object (e.g., human finger) is placed in contact with the female terminal 1800. Thus, the distance between the forwardmost extent 1658 of the internal segment 1651 and an outermost edge 1782 of the touch proof post is smaller than 10 mm and preferably less than 6 mm. The shape of the touch proof post opening 1270 is configured to substantially match the shape of the touch proof post 1780. The matching of these shapes helps ensure proper insertion of the touch proof post 1780 with the touch proof post opening 1270. In addition, matching and dimensioning the touch proof post 1780 and 1270 may provide a reduction in the vibration between the male connector assembly 200 and the female connector assembly 600. This reduction in the vibration between these components may help reduce failures of the connector system 100.

In the exemplary embodiment, the touch proof post opening 1270 has a substantially rectangular shape and more specifically a substantially square shape. It should be understood that other configurations for the touch proof post 1780 are contemplated by this disclosure. The touch proof post 1270 is typically formed from the same material as the female housing 620, which is a non-conductive material (e.g., plastic or nylon). In other embodiments, the touch proof post may be formed for other materials. However, for the touch proof post 1270 to operate as intended the material should not be highly conductive because such a material would transfer the current from the female terminal 800 to the post 1270; thus, removing one of the purposes of the touch proof post 1270. As discussed above in connection with the CPA 350, the touch proof post 1780 and the touch proof post opening 1270 are optional components that may be added to or omitted from any connector system 100, 1100, 2100, and 3100 disclosed herein.

Another difference between the first embodiment of the connector system 100 and the second embodiment of the connector system 1100 is that the second embodiment of the connector system 1100 include a female terminal holder 1666. The female terminal holder 1666 is configured to couple the female terminal 1800 to the female housing 1620. The female terminal holder 1666 does this by utilizing the female locking member 1700 that are connected thereto. In particular, a first insertion force, FI, will cause the female locking member 1700 to interact with an inner surface 1656 of the female housing 1620. This interaction will cause the female locking member 1700 and more specifically a first extent of the female locking member 1710 to elastically deform inward. This inward deformation force, FD, is shown in FIG. 63 and it facilitated by the gap 1714 formed near the rear of the female locking member 1700. Specifically, deforming the female locking arm 1700 will allow the female terminal 1800 and the touch proof post assembly to be inserted into the housing 1620. The application of a second insertion force, FI, will: (i) place the forwardmost extent 1818 of the female terminal 1800 into contact with the rearmost extent 1654 of the internal segment 1651 and (ii) an extent 1710 of the locking member 1700 within the locking member recess 1663 that are formed within the side walls 1642a, 1642c. The return of the female locking member 1700 to its original state or non-deformed state may cause an audible sound (e.g., click), which inform the assembler that the female terminal 800 is properly seated within the female housing 1620; thus meeting industry standards and/or requirements (e.g., USCAR).

Another difference between the first embodiment of the connector system 100 and the second embodiment of the connector system 1100 is the fact that the second embodiment of the connector system 1100 includes cable strain reliefs 1530. In particular, the cable strain reliefs 1530 include two components: (i) the cable seal 1532 and (ii) the retainer 1534. The cable seal 1532 is configured to fit over the wire 590 and is typically made from a material (e.g., silicon) that is pliable. The retainer 1534 is also configured to fit over the wire and is designed to be coupled to the housings 1220, 1620. The coupler 1536a, 1536b that is depicted within the exemplary embodiment functions in a similar manner to the connection means 1222 that is described above in connection with the first embodiment of the male housing 1220. Also, like the first embodiment of the male housing 1220, other methods of coupling the retainer 1534 to the housings 1220, 1620 is contemplated by this disclosure. For example, springs, magnets, partial rotational forces, full rotational forces, other combinations of projections and recesses, or a combination of these may be utilized to couple the retainer 1534 each on of the housings 1220, 1620. As discussed above in connection with the CPA 350 and the touch proof post 1780, cable strain reliefs 1530 are optional components that may be added to or omitted from any connector system 100, 1100, 2100, and 3100 disclosed herein.

Another difference between the first embodiment of the connector system 100 and the second embodiment of the connector system 1100 is the fact the second embodiment of the connector system 1100 includes gaskets or sealing members 1250, 1664. Specifically, the sealing member 1250 is positioned near a lower extent of the male terminal housing 1220 and configured to seal the connector system 100 when the male connector assembly 1200 is connected to the female connector assembly (see FIGS. 89 and 92). The sealing member 1250 is held in place and protected by a sealing member retainer 1534. The sealing member retainer 1534 is positioned below the sealing member 1250 and is coupled (e.g., ultrasonic welded) to the male housing 1220. The sealing member retainer 1534 is designed to protect the sealing member 1250. Like the cable seal 1532, the sealing member 1250 is typically made from a material (e.g., silicon) that is pliable. In addition, the gasket 1664 is designed to be positioned below an extent of the female housing 1620 and interact with the device (e.g., battery pack) that is connected to the female terminal 1800.

Another difference between the first embodiment of the connector system 100 and the second embodiment of the connector system 1100 is the fact that the male terminal side walls 1482a-1482d that are associated with the second embodiment each have one contact arm 1494a-1494d, while the male terminal side walls 482a-482d that are associated with the first embodiment each have two contact arms 494a-494h. In other words, the second embodiment of the connector system 1100 has a total of 4 contact arms 1494a-1494d, while the first embodiment of the connector system 100 has a total of 8 contact arms 494a-494h. The subtraction of the four contact arms 1494a-1494d decreases the height and width of the male terminal assembly between 10% and 15%. This decrease in size allows the first embodiment of the connector system 100 to carry between 15% and 25% more current than the second embodiment of the connector system 1100, while staying within the industry specifications, including DIN EN 60512-5-2. In particular, while meeting the industry specifications, the first embodiment of the connector system 100 is capable of carrying up to 280 amps and the second embodiment of the connector system 1100 is capable of carrying up to 220 amps.

FIGS. 93-110 show various views of a fourth embodiment of the connector system 3100. It should be understood that this fourth embodiment of the connector system 3100 contains structures, features and/or functions that are similar to the structures, features and/or functions disclosed in connection with the first and second embodiment of the connector system 100, 1100. Overall, the fourth embodiment contains structures, features and/or functions that have a closer resemblance to the structures, features and/or functions second embodiment of the connector system 1100 in comparison to the first embodiment of the connector system 100. Accordingly, reference numbers that are separated from the first embodiment by 2000 will be used in connection with this fourth embodiment to denote the structures and/or features that are similar to the structures and/or features disclosed in the second embodiment 1100. For example, the contact arms of the second embodiment are labeled 1494a-1494h, while the contact arms of the fourth embodiment are labeled 3494a-349d. Therefore, one of ordinary skill in the art shall assume that the contact arms of the second embodiment 1494a-1494h have similar structures, features and/or functions in comparison to the contact arms of the fourth embodiment 3494a-3494d. Additionally, one of ordinary skill in the art shall understand that while the structures, features and/or functions are similar that does not mean the structures, features and/or functions are exactly the same. Further, it should be understood that structures and/or features of this fourth embodiment may be used in connection with any other embodiment contained within this application or its related applications.

Like the second embodiment of the connector system 1100, the fourth embodiment of the connector system 3100 includes: (i) a male connector assembly 3200 and (ii) a female connector assembly 3600. The male connector assembly 3200 has: (i) a male housing 3220, (ii) male CPA 3352, (iii) male terminal assembly 3430, (iv) a cable strain relief 3530, and (v) wire 3590. Like the third embodiment of the spring member 1440b, this fifth embodiment of the spring member 3440b includes: (i) a recess 3554 and an associated strengthening rib 3556 and (ii) the width of the base spring section 3450a-3450d is not approximately equal to the width of the spring arms 3452a-3452d. Also, like the second embodiment of the male terminal 1470, this fourth embodiment of the male terminal 3470 includes a plurality of contact arms 3494a-3494d that: (i) are integrally formed with an extent of the male terminal side wall portion 3492a-3492d, (ii) extend away from the connection plate 3474 and towards the front male terminal wall 3480 at an outwardly directed angle, (iii) extend across an extent of the contact arm openings, and (iv) have a terminal end that is configured to contact the planar outer surface of the spring arms 3452a-3452d.

Also, like the second embodiment of the contact arm 1494a-1494h, the fourth embodiment of the contact arm 3494a-3494d are designed to interact with the internal spring member 3440b. Like the disclosure discussed in connection with FIGS. 1, 36-38, 42-46a, and 48-49, the contact arms 3494a-3494d are depressed or displaced inward (i.e., towards the center 3490 of the male terminal 3470), when the male terminal assembly 3430 is inserted within the female terminal receiver 3814. In addition, as discussed above in connection with FIG. 49, the spring member 3440b applies both a spring biasing force, SBF, and a spring thermal force, STF, on the contact arms 3494a-3494d to create a 360 degree mechanical and electrical connection with the female terminal 3800. Further, like the second embodiment of the connector system 1100, the fourth embodiment of the connector system 3100 is beneficial over the connector system disclosed within PCT/US2018/019787 because: (i) the male terminal 3470 is shorter, which utilizes less metal and can be installed in narrower spaces, (ii) has a higher current carrying capacity, (iii) is easier to assemble, and (iv) has other beneficial features that are disclosed herein or can be inferred by one of ordinary skill in the art from this disclosure.

Additionally, like the fourth embodiment of the female housing 1620, the second embodiment of the female housing 3620 includes an internal segment 651 that has a sloped configuration that gradually compresses the contact arms 3494a-3494d during the insertion of the male connector assembly 3200 into the female connector assembly 3600. This compression of the contact arms 3494a-3494d is necessary because the combination of outer surfaces of the contact arms 3494a-3494d is slightly (e.g., between 1% and 15%) larger than the receiver 3814 of the female terminal 3800. Also, as discussed above in connection with the first and second embodiments and FIGS. 30-47, the configuration of the male housing 3220 and the female housing 3620, including the internal segment 3651, has may benefits over the housings disclosed within PCT/US2018/019787. Some of these benefits include: (i) requires a shorter amount of distance to bring the connector system 3100 from the disconnected position, PD, to the intermediate position, PI, (ii) requires less insertion force, which enables the designer to utilize a spring member 3440b that has a larger spring bias while still meeting the USCAR specifications (e.g., USCAR 25), (iii) once the contact arms 3494a-3494d have passed the rearmost extent 3654 of the internal segment 3651, the required insertion force levels off, (iv) the overall insertion distance is shorter to bring the connector system 3100 from the disconnected position, PD, to the connected position, PC, (v) the configuration of the housings 3220, 3620, may provide multiple audible sounds when components are properly connected to one another, (vi) the inclusion of a CPA, which meets industry standards and/or requirements (e.g., USCAR 2), and (vii) other beneficial features that are disclosed herein or can be inferred by one of ordinary skill in the art from this disclosure.

One difference between the second embodiment of the connector system 1100 and the fourth embodiment of the connector system 3100 is the fact that the fourth embodiment of the female terminal 3800 has two male terminal assemblies 3430 that are designed to interact with two female terminals 3800. To facilitate the combination of two male terminal assemblies 3430 and two female terminal 3800, the male and female housings 3220, 3620 were expanded and the method of coupling the male terminal assembles with the male housing 3220 was slightly altered. Specifically, the locking member 3300 that is designed to function with this fourth embodiment is shown in FIGS. 94-100, 103, and 109-110. As shown in this figures, the locking member 3300 can be accessed from the front of the male connector assembly 3200 in order to move the locking member from a disengaged state to an engaged state. When the male locking member 3300 is in the disengaged state (see FIGS. 96, 98-100) when a male locking member projection 314 is positioned within the first locking member recess 3254a and a lateral male locking member 316 is positioned below the male terminal assembly 3430. To move the male locking member 3300 from this disengaged state to an engaged state, the assembler applies an upwardly directed force on the male locking member. The force must be sufficient to cause the male locking member projection 314 to move from the first locking member recess 3254a to the second locking member recess 3254b. Once the male locking member 3300 is in the engaged state, the lateral male locking member 316 is positioned behind the male terminal assembly 3430. In this position, the male terminal assembly 3430 is properly coupled to the male housing 3220.

Materials and Disclosure That are Incorporated by Reference

PCT Patent Application No. PCT/US2019/036010, filed on Jun. 7, 2019, PCT Patent Application No. PCT/US2019/036070, filed on Jun. 7, 2019, and PCT Patent Application No. PCT/US2018/019787, filed on Feb. 26, 2018, each of which are fully incorporated herein by reference and made a part hereof.

SAE Specifications, including J1742_201003 entitled, "Connections for High Voltage On-Board Vehicle Electrical Wiring Harnesses—Test Methods and General Performance Requirements," last revised in March 2010 and which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), which is fully incorporated herein by reference and made a part hereof.

USCAR Specifications, including: (i) SAE/USCAR-2, Revision 6, which was least revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

INDUSTRIAL APPLICABILITY AND DEFINITIONS

The above disclosure may represent an improvement in the art because it improves the mechanical and electrical connection between a male connector assembly and a female connector assembly. Such a connector assembly may be used in high-power and/or high-voltage conditions that may be found in the automotive industry or other applications (e.g., military equipment, space flight, electric vehicles, industrial machinery, etc.). It should be understood that the following terms used herein shall generally mean the following. "High power" shall mean: (i) between 20 volts to 600 volts regardless of the current or (ii) at any current greater than or equal to 80 amps regardless of the voltage. "High current" shall mean current greater than or equal to 80 amps regardless of the voltage. "High voltage" shall mean between 20 volts to 600 volts regardless of the current. "Substantially" shall mean essentially or without material deviation, which is in some instances is less than a 10 percent deviation from normal.

While some implementations have been illustrated and described, numerous modifications come to mind without significantly departing from the spirit of the disclosure; and the scope of protection is only limited by the scope of the accompanying claims. For example, the overall shape of the connector assembly 100 may be changed to: a triangular prism, a pentagonal prism, a hexagonal prism, octagonal prism, sphere, a cone, a tetrahedron, a cuboid, a dodecahedron, a icosahedron, a octahedron, a ellipsoid, or any other similar shape. While the overall shape of the connector assembly 100 may be altered, the shape of the male terminal assembly 430 and the female terminal 800 may not be altered to match the shape of the overall connector assembly 100. For example, the shape of the connector assembly 10 may be a hexagonal prism, while the male terminal assembly 430 and the female terminal 800 may be substantially cubic. In other embodiments, the shape of the male terminal assembly 430 may be changed to: a triangular prism, a pentagonal prism, a hexagonal prism, octagonal prism, sphere, a cone, a tetrahedron, a dodecahedron, a icosahedron, a octahedron, a ellipsoid, or any other similar shape. If the shape of the male terminal assembly 430 is altered to be any one of the above shapes, then it should be understood that the female terminal 800 may be altered to facilitate insertion, electrical connection, and extraction of the male terminal assembly 430 from the female terminal 800. Additionally, as described above, while the shape of the male terminal assembly 430 and the female terminal 800 may be altered, the overall shape of the connector assembly 10 may not be altered to match the shape of the male terminal assembly 430.

In other embodiments, one or both of the rear spring wall 444 may be omitted. The spring member 440a, 440b may have a different configuration, such as: (i) having curvilinear shoulder disposed near the free end 446, (ii) having a wall that is positioned opposite of the rear wall and is connected to an extent of one of the spring fingers in order to limit movement of the free end 446, (iii) the width of the spring arms may be greater than the width of the middle sections, (iv) the width of the spring fingers may not match the width of the contact arms (e.g., spring fingers may be wider or narrower than the contact arms), (v) or any combination of these features.

In other embodiments, the male terminal body 472 may have a different configuration, such as: (i) the contact openings may not be linear (e.g. curvilinear), may be different lengths, may have different widths, may extend past where the contact arms intersect the side walls or may not span the entire length of each contact arm, (ii) the contact arms may not extent from the side walls at an outward angle, (iii) not gap may not be formed between the spring member and the contact arms, (iv) may be comprised of different materials (e.g., c151 is plated with (a) silver, (b) tin, (c) ss301, (d) other similar materials, or (e) a combination of a plurality of these materials).

Headings and subheadings, if any, are used for convenience only and are not limiting. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions. It should be understood that the term substantially shall mean essentially or without material deviation, which is typically less than a 10° deviation.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An electrical connector assembly comprising:
a conductive male terminal body with a contact arm;
an internal spring member positioned within the conductive male terminal body;
a conductive female terminal body having: (i) a leading edge, and (ii) a female terminal receiver dimensioned to receive an extent of the conductive male terminal body, and; and
a female housing having a first wall and a receptacle dimensioned to receive the conductive male terminal body, the internal spring member and the conductive female terminal body, wherein the first wall includes:
an outer surface, and
an internal segment with: (i) a trailing extent that is positioned adjacent to the leading edge of the conductive female terminal body and (ii) an inner surface that is angled with respect to the outer surface of the first wall; and
wherein during insertion of the conductive male terminal body in the female terminal receiver: (a) the inner surface of the internal segment of the female housing internally displaces an extent of both the contact arm and an extent of the internal spring member, and (b) said internal displacement of the contact arm and internal spring member creates a spring biasing force which keeps the contact arm engaged with an inner surface of the female terminal receiver during the operation of the electrical connector assembly.

2. The electrical connector assembly of claim 1, wherein an interior angle between the inner surface of the internal segment and the outer surface of the first wall is between 1% and 15%.

3. The electrical connector assembly of claim 1, wherein the female housing has:
a first forward edge, a second forward edge opposed to the first forward edge, and a forward edge width defined by the first and second forward edges;
a first rearward edge, a second rearward edge opposed to the first rearward edge, and a rear edge width defined by the first and second rearward edges;
wherein the first and second rearward edges are positioned proximate to a forward edge of the female terminal receiver; and
wherein said rear edge width is at least 1% less than the forward edge width.

4. The electrical connector assembly of claim 3, wherein the female terminal receiver has a receiver width that is greater than or equal to the rear edge width of the female housing.

5. The electrical connector assembly of claim 3, wherein the female terminal receiver has a receiver width that is less than the forward edge width of the female housing.

6. The electrical connector assembly of claim 1, wherein the female housing further includes a female locking means that is configured to secure the conductive female terminal body within the female housing.

7. The electrical connector assembly of claim 1, further comprising a male housing having a male locking means that is configured to secure the conductive male terminal body within the male housing.

8. The electrical connector assembly of claim 1, further comprising a non-conductive touch-proof element with an elongated post;
wherein the conductive male terminal body further includes a front wall with a frontal opening formed therein; and
wherein when the conductive male terminal body is inserted into the female terminal receiver, the frontal opening of the conductive male terminal body receives a portion of the elongated post.

9. The electrical connector assembly of claim 1, further comprising a touch-proof element with an elongated post; and
wherein when the touch-proof element is coupled to the conductive female terminal body within the female housing, an extent of the elongated post is positioned within both the female terminal receiver and the female housing to prevent a foreign object from contacting the conductive female terminal body.

10. The electrical connector assembly of claim 1, further comprising a connector position assurance (CPA) assembly, wherein the CPA assembly prevents the conductive male terminal body from being removed from the female terminal receiver without disengagement of the CPA assembly.

11. The electrical connector assembly of claim 1, wherein a first force is required to move the conductive male terminal body when the contact arm is engaged with the internal segment and a second force is required to move the conductive male terminal body when the contact arm is in positioned in the female terminal receiver; and
wherein the second force is less than the first force.

12. The electrical connector assembly of claim 1, wherein the electrical connector assembly provides tactile feedback to a user to indicate that the contact arm has been inserted past the internal segment and is positioned in the female terminal receiver.

13. The electrical connector assembly of claim 1, wherein inserting the conductive male terminal body into the female terminal receiver requires an insertion force that is less than an insertion force requirement in the USCAR 25 specification.

14. The electrical connector assembly of claim 1, wherein the electrical connector assembly is 360 degree compliant due to a configuration and positional relationship of the conductive male terminal body and the conductive female terminal body.

15. The electrical connector assembly of claim 1, wherein the conductive male terminal body has a rear wall and an arrangement of side walls defining a receiver with a frontal opening, wherein a first side wall of the arrangement of side walls includes:
a first opening formed in the first side wall;
an intermediate segment positioned between the first opening and the rear wall of the conductive male terminal body;
an end segment extending forwardly (i) from the intermediate segment, and (ii) along the first opening; and
wherein the contact arm of the male terminal body forwardly extends at an outward angle from the intermediate segment and along an extent of the first opening.

16. An electrical connector assembly comprising:
a female terminal body having: (i) a side wall arrangement and, (ii) a female terminal receiver with a length, wherein a receiver width is defined between a pair of opposed side walls of the side wall arrangement, and wherein said receiver width is substantially constant along the length of the female receiver;
a female housing having a receptacle that receives the female terminal body, the female housing having:
a first forward edge portion, a second forward edge portion opposed to the first forward edge portion, and a forward edge width defined by the first and second forward edge portions,
a first rearward edge portion, a second rearward edge portion opposed to the first rearward edge portion, and a rear edge width defined by the first and second rearward edge portions;
wherein the first and second rearward edge portions are positioned proximate to a forward edge of the female terminal receiver; and
wherein said rear edge width: (i) is equal to or less than the receiver width and (ii) is at least 1% less than the forward edge width.

17. The electrical connector assembly of claim 16, wherein the female housing includes a first wall having an internal segment that:
(i) extends between the first forward edge portion and the first rearward edge portion and (ii) is substantially linear.

18. The electrical connector assembly of claim 17, wherein the inner surface is configured to inwardly displace an extent of a male terminal body during insertion of the male terminal body in the female terminal receiver.

19. The electrical connector assembly of claim 16, further comprising a male terminal body with a contact arm; and
wherein the female housing includes means for inwardly displacing the contact arm of the male terminal body during insertion of the male terminal body in the female terminal receiver.

20. The electrical connector assembly of claim 19, wherein the means for inwardly displacing the contact arm of the male terminal body is a planer surface that extends rearward from the first and second forward edges of the female housing receptacle.

21. The electrical connector assembly of claim 19, wherein the means for inwardly displacing the contact arm of the male terminal body is an internal segment with: (i) a trailing extent that is positioned adjacent to a leading edge of the female terminal body and (ii) an inner surface that is angled with respect to an outer surface of the female housing.

22. The electrical connector assembly of claim 16, wherein the female housing further includes: (a) a first wall and (b) an elastically deformable securing arm that resides inward of an extent of the first wall; and
wherein when the female terminal body is disconnected from the receptacle of the female housing, the elastically deformable securing arm is in an initial position whereby a gap is defined between an extent of the first wall and the elastically deformable securing arm.

23. The electrical connector assembly of claim 16, further comprising: (i) a non-conductive touch-proof element with an elongated post positioned in the female terminal body, and (ii) a male terminal body having a front wall with a frontal opening formed therein; and
wherein when the male terminal body is inserted into the female terminal receiver to define a connected state, an extent of the male terminal body is positioned between the elongated post and an extent of the female housing.

24. The electrical connector assembly of claim 16, further comprising a male terminal body with a contact arm; and
wherein the electrical connector assembly provides tactile tactical feedback to a user to indicate that the contact arm has been inserted past the first and second rearward edge portions and is positioned in the female terminal receiver.

25. The electrical connector assembly of claim 16, further comprising: (i) a male terminal body with a contact arm, and (ii) an internal spring member positioned within the male terminal body; and
wherein inserting the male terminal body into the female terminal receiver causes an extent of both the contact arm and an extent of the internal spring member to deform inward thereby creating a spring biasing force acting upon the contact arm which keeps the contact arm engaged with an inner surface of the female terminal receiver during use of the electrical connector assembly.

26. The electrical connector assembly of claim 16, further comprising a male terminal body; and wherein inserting the male terminal body into the female terminal receiver requires a force that is less than an insertion force requirement in the USCAR 25 specification.

27. The electrical connector assembly of claim 16, further comprising a male terminal body having a side wall arrangement with an outer perimeter; and wherein said outer perimeter has: (a) a first uncompressed dimension when the male terminal body is not inserted within the female terminal body, and (b) a second compressed dimension when the male terminal body is inserted within the female terminal body, and wherein the second compressed dimension is less than the first uncompressed dimension.

28. The electrical connector assembly of claim 16, wherein the electrical connector assembly is 360 degree compliant due to a positional relationship of a male terminal body and the female terminal body.

29. The electrical connector assembly of claim 1, wherein the female terminal receiver has a length, wherein a receiver width is defined between a pair of opposed side walls of the side wall arrangement, and wherein said receiver width is substantially constant along the length of the female receiver.

30. The electrical connector assembly of claim 1, wherein the male terminal body includes a side wall arrangement with an outer perimeter; and wherein said outer perimeter has: (a) a first uncompressed dimension when the male terminal body is not inserted within the female terminal body, and (b) a second compressed dimension when the male terminal body is inserted within the female terminal body, and wherein the second compressed dimension is less than the first uncompressed dimension.

31. The electrical connector assembly of claim 16, wherein the female housing includes an internal segment that extends between the first forward edge portion and the first rearward edge portion; and wherein an inner surface of a side wall of the female terminal body is not co- planar with the entirety of an inner surface of the internal segment.

32. The electrical connector assembly of claim 16, further comprising an elongated post: (i) positioned within both the female terminal receiver and the female housing, and (ii) having an outermost edge that is positioned less than 10 mm away from the first forward edge portion of the female housing.

33. The electrical connector assembly of claim 16, wherein the female housing includes a receiver: (i) formed between a first extent of the female housing and a second extent of the female housing, and (ii) is positioned external to the receptacle that receives the female terminal body.

34. The electrical connector assembly of claim 32, further comprising a male housing having a sealing member, wherein the sealing member is configured to be positioned in the receiver of the female housing to seal the connector system when the male connector assembly is connected to the female connector assembly.

* * * * *